United States Patent
Jang et al.

(10) Patent No.: US 11,782,305 B1
(45) Date of Patent: Oct. 10, 2023

(54) COMPLEX WAVEFRONT MODULATOR WITH REDUCED THICKNESS AND FABRICATION METHOD THEREOF

(71) Applicant: Meta Platforms Technologies, LLC, Menlo Park, CA (US)

(72) Inventors: Changwon Jang, Seattle, WA (US); Afsoon Jamali, Issaquah, WA (US); Zhimin Shi, Bellevue, WA (US); Arman Boromand, Issaquah, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/878,442

(22) Filed: Aug. 1, 2022

Related U.S. Application Data

(60) Provisional application No. 63/306,999, filed on Feb. 4, 2022, provisional application No. 63/243,500, filed on Sep. 13, 2021.

(51) Int. Cl.
| | | |
|---|---|---|
| *G02F 1/1335* | (2006.01) | |
| *G02F 1/1334* | (2006.01) | |
| *G02F 1/1343* | (2006.01) | |
| *G02F 1/1341* | (2006.01) | |
| *G02B 27/01* | (2006.01) | |
| *G02F 1/1337* | (2006.01) | |

(52) U.S. Cl.
CPC ... *G02F 1/133548* (2021.01); *G02B 27/0172* (2013.01); *G02F 1/1334* (2013.01); *G02F 1/1341* (2013.01); *G02F 1/133711* (2013.01); *G02F 1/134309* (2013.01); *G02B 2027/0178* (2013.01)

(58) Field of Classification Search
CPC ................................................ G02F 1/133548
See application file for complete search history.

(56) References Cited

U.S. PATENT DOCUMENTS

2021/0080759 A1* 3/2021 Zhao ..................... G02F 1/0136

OTHER PUBLICATIONS

Dhen H.S., et al., "A Polarizer-Free Liquid Crystal Lens Exploiting an Embedded-Multilayered Structure," IEEE Photonics Technology Letters, Apr. 15, 2015, vol. 27 (8), pp. 899-902, 4 pages.
Co-pending U.S. Appl. No. 17/162,060, inventor Jang; Changwon, titled "Techniques for Complex Wavefront Modulation," filed on Jan. 29, 2021.
Co-pending U.S. Appl. No. 17/381,891, inventors Shi; Zhimin et al., titled "Techniques for Multi-Layer Liquid Crystal Active Light Modulation," filed on Jul. 21, 2021.
McCarthy J.E., et al., "Fabrication of Highly Transparent and Conducting PEDOT: PSS films using a Formic Acid Treatment," Journal of Materials Chemistry C, 2014, vol. 2, pp. 764-770, 7 pages.

* cited by examiner

*Primary Examiner* — Edmond C Lau
(74) *Attorney, Agent, or Firm* — MILLBURN IP PLLC

(57) ABSTRACT

A device is provided. The device includes a first liquid crystal ("LC") cell configured to modulate an amplitude of a light beam. The device also includes a second LC cell stacked with the first LC cell and configured to modulate a phase of the light beam. The device includes a sandwiched electrode layer disposed between the first LC cell and the second LC cell. The sandwiched electrode layer includes a conductive polymer film configured to function as a common electrode layer for driving at least one of the first LC cell or the second LC cell.

12 Claims, 32 Drawing Sheets

US 11,782,305 B1

COMPLEX WAVEFRONT MODULATOR WITH REDUCED THICKNESS AND FABRICATION METHOD THEREOF

CROSS REFERENCE TO RELATED APPLICATIONS

This application claims the benefit of priority to U.S. Provisional Application No. 63/243,500, filed on Sep. 13, 2021, and to U.S. Provisional Patent Application No. 63/306,999, filed on Feb. 4, 2022. The contents of the above-referenced applications are incorporated by reference in their entirety.

TECHNICAL FIELD

The present disclosure generally relates to optical devices and fabrication methods, more specifically, to a complex wavefront modulator with a reduced thickness and a fabrication method thereof.

BACKGROUND

Holography uses light interference patterns to form three-dimensional ("3D") images. A traditional hologram is a holographic interference pattern of a signal light beam from a real object and a reference light beam from a coherent light source. Computer-generated holography applies various algorithms to simulate the holographic interference patterns generated by traditional holography. A computer-generated hologram may be presented by using a spatial light modulator ("SLM") to encode a pattern output by such an algorithm into a light beam emitted from a light source.

An SLM imposes a spatially varying modulation on a light beam. A conventional SLM may impose a spatially varying modulation of either the amplitude or the phase on a light beam. Computer-generated holography may impose modulations on multiple degrees of freedom ("DOFs") of a light beam, such as both of the amplitude and the phase. One conventional approach for modulating multiple DOFs of a light beam may involve using an optical relay-imaging assembly, which may image the plane of a first SLM that modulates a first DOF of a light beam to the plane of a second SLM that modulates a second DOF of the light beam. Another conventional approach for modulating multiple DOFs of a light beam may involve laminating together multiple SLMs that modulate different DOFs.

SUMMARY OF THE DISCLOSURE

Consistent with an aspect of the present disclosure, a device is provided. The device includes a first liquid crystal ("LC") cell configured to modulate an amplitude of a light beam. The device also includes a second LC cell stacked with the first LC cell and configured to modulate a phase of the light beam. The device includes a sandwiched electrode layer disposed between the first LC cell and the second LC cell. The sandwiched electrode layer includes a conductive polymer film configured to function as a common electrode layer for driving at least one of the first LC cell or the second LC cell.

Consistent with another aspect of the present disclosure, a method is provided. The method includes disposing a first assembly over a first backplane, the first assembly including a first conductive polymer layer disposed on a first protection layer. The method also includes filling a first liquid crystal ("LC") material into a first space formed between the first assembly and the first backplane to form a first LC cell. The method also includes disposing a second assembly over a second backplane, the second assembly including a second conductive polymer layer disposed on a second protection layer. The method also includes filling a second LC material into a second space formed between the second assembly and the second backplane to form a second LC cell. The method also includes disposing the first assembly of the first LC cell over the second assembly of the second LC cell.

Consistent with another aspect of the present disclosure, a method is provided. The method includes disposing a first assembly over a first backplane, the first assembly including a first conductive polymer layer disposed on a protection layer. The method also includes filling a first liquid crystal ("LC") material into a first space formed between the first assembly and the first backplane to form a first LC cell. The method also includes forming a second assembly including a second conductive polymer layer over the first assembly of the first LC cell. The method also includes disposing a second backplane over the second assembly. The method also includes filling a second LC material into a second space formed between the second backplane and the second assembly to form a second LC cell.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
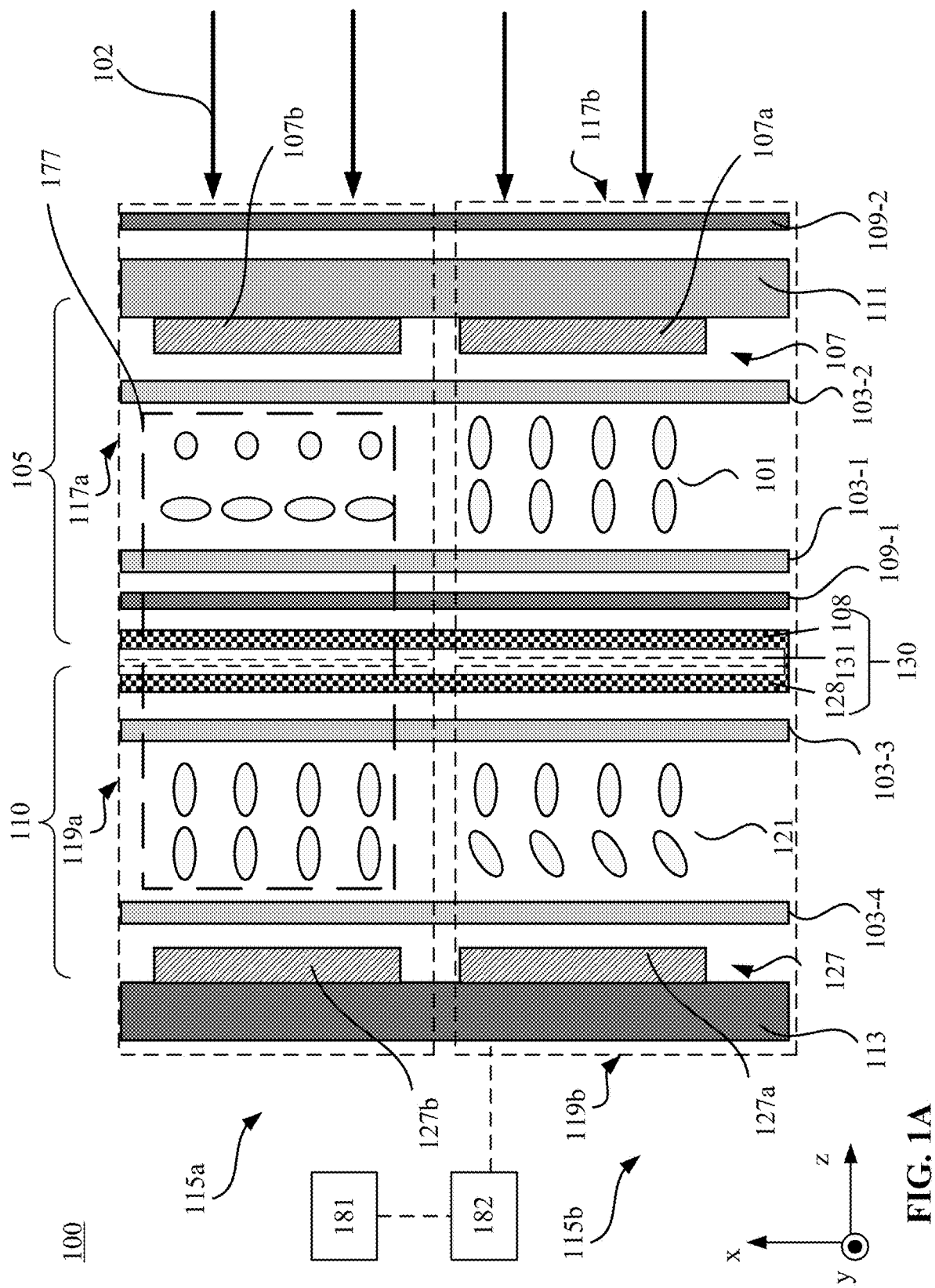
FIGS. 1A-1D illustrate schematic diagrams of complex wavefront modulators, according to various embodiments of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a major portion, including all, of a light is transmitted, reflected, diffracted, or blocked, etc. The major portion may be a predetermined percentage (greater than 50%) of the entire light, such as 100%, 98%, 90%, 85%, 80%, etc., which may be determined based on specific application needs.

A conventional complex wavefront modulator for modulating multiple degrees of freedom ("DOFs") of a light beam may include multiple SLMs stacked or laminated together, for modulating different DOFs of the light. Each SLM may include two substrates respectively disposed with a common electrode layer and a pixel (or pixelated) electrode layer, and a liquid crystal ("LC") layer disposed between the two substates. The term "common" in the phrase "common electrode layer" means that a single voltage (including 0 V, or ground) is applied to the entire electrode layer, and does not indicate the electrode layer is shared by any neighboring cells. The substrates are often made from, e.g., silicon or glass, providing the rigidity of the SLM. The common electrode layer and the pixel electrode layer are often indium tin oxide ("ITO") electrode layers. Thus, two electrode layers (e.g., ITO electrode layers) and one or two substrates (e.g., one or more cover glasses) may be disposed between two neighboring LC layers in the two neighboring SLMs. The cover glass may be relatively thick compared to the LC layer. For example, the combination of the ITO electrode layer and the cover glass may have a thickness of about 100 μm to about 300 The cover glass may be significantly thicker than the ITO electrode layer (the ITO electrode layer may have a thickness at the submicron level (i.e., less than 1 μm), e.g., at the level of hundred nanometers). Thus, the conventional complex wavefront modulators may be bulky and heavy. In addition, the pitch of the pixel may be less than 10 μm (e.g., 8 μm). Thus, the conventional complex wavefront modulator may have a substantially low aspect ratio of the pixel, which may be defined as the ratio between the pixel pitch and the thickness of the pixel (the thicknesses of the LC layer and ITO electrode layer may be negligible as compared to the thickness of the cover glass). For example, the aspect ratio may be 8 μm in pitch:300 μm in thickness, which is substantially low. The low aspect ratio may result in a substantially narrow acceptance angle, which limits the applications. The conventional complex wavefront modulator may be physically bulky, and difficult to mitigate a diffraction effect caused by a light propagating inside the pixel, thereby degrading the optical performance.

In view of these, the present disclosure provides a complex wavefront modulator with a reduced thickness and weight, and an improved optical performance. In the following, various complex wavefront modulators with reduced thicknesses and weights will be explained. In the following, complex wavefront modulators providing spatially varying modulations of the amplitude and the phase of an input light beam are used as examples to explain the design principles for reducing the thickness and the weight, and for improving the optical performance. The disclosed design principles may be applied to any suitable complex wavefront modulators that provide spatially varying modulations of multiple DOFs of a light beam. The DOFs of the input light beam may include the amplitude, the phase, the polarization, etc., or a combination thereof.

FIG. 1A illustrates an x-z sectional view of a complex wavefront modulator 100, according to an embodiment of the present disclosure. As shown in FIG. 1A, the complex wavefront modulator 100 may include a first LC cell 105, a sandwiched electrode layer 130, and a second LC cell 110 arranged in a stacked configuration, with the sandwiched electrode layer 130 disposed (i.e., sandwiched) between the first LC cell 105 and the second LC cell 110. The first LC cell 105 and the second LC cell 110 may be active LC cells configured to modulate two different DOFs of an input light beam 102, e.g., modulating an amplitude and a phase of the input light beam 102, respectively. The complex wavefront modulator 100 may be a reflective device, a transmissive device, or a transflective device (which provides both transmission and reflection to the input light beam 102). In some embodiments, one of the first LC cell 105 and the second LC cell 110 may include a liquid crystal on silicon ("LCoS"), and the other one may include a thin-film transistor ("TFT")-liquid crystal display ("LCD") panel. In some embodiments, each of the first LC cell 105 and the second LC cell 110 may include a TFT-LCD panel.

The complex wavefront modulator 100 may include a first substate 111 and a second substrate 113 disposed in parallel with one another with a gap. The first substrate 111 may be included in the first LC cell 105, and the second substrate 113 may be included in the second LC cell 110. When the first LC cell 105 or the second LC cell 110 includes an LCoS, the first substate 111 or the second substrate 113 may be a silicon backplane that includes electric circuitry for driving the LCoS. When the first LC cell 105 or the second LC cell 110 includes a TFT-LCD panel, the first substate 111 or the second substrate 113 may be a TFT substate that includes electric circuitry for driving the TFT-LCD panel.

The first LC cell 105 may include two alignment layers, a first alignment layer 103-1 and a second alignment layer 103-2. The first LC cell 105 may also include a first LC layer 101 disposed between the first alignment layer 103-1 and the second alignment layer 103-2. The first LC layer 101 may include nematic LCs, twist-bend LCs, chiral nematic LCs, smectic LCs, ferroelectric LCs, etc., or a combination thereof. The first LC layer 101 may have a first side facing the second LC cell 110 (or the first alignment layer 103-1), and a second side facing the first substate 111 (or the second alignment layer 103-2). The first and second alignment layers 103-1 and 103-2 may be disposed at the first side and the second side of the first LC layer 101, respectively. In some embodiments, as shown in FIG. 1A, the first and second alignment layers 103-1 and 103-2 may be configured to provide a twisted nematic alignment to LC molecules in the first LC layer 101. In some embodiments, the twisted nematic alignments provided by the first and second alignment layers 103-1 and 103-2 may be configured with orthogonal alignment directions, through which the LC molecules in the first LC layer 101 may be twisted by about 90° from one surface of the first LC layer 101 to the other surface of the first LC layer 101 at a non-activation state. A non-activation state refers to a state of a LC layer when no electric field is supplied to the electrodes associated with the LC layer.

In the configuration shown in FIG. 1A, different portions of the first LC layer 101 may be applied with different electric fields (e.g., different voltages) or no electric field (e.g., zero voltage). When no electric field is supplied to the portion of the first LC layer 101, that portion of the first LC layer 101 is referred to as in a non-activation state. When an electric field is supplied to that portion of the first LC layer 101, that portion of the first LC layer 101 is referred to as in an activation state. Each individually controlled portion of the first LC layer 101 may correspond to a pixel. For discussion purposes, a portion of the first LC layer 101 enclosed by the dashed line 177 is presumed to be in the non-activation state. In the non-activation state, within the portion of the first LC cell 105 enclosed by the dashed line 177, the LC molecules of the first LC layer 101 located in close proximity to or at the first alignment layer 103-1 are substantially aligned in the x-axis direction, and the LC molecules of the first LC layer 101 located in close proximity to or at the second alignment layer 103-2 are substantially aligned in the y-axis direction. In some embodiments, the first and second alignment layers 103-1 and 103-2 may be configured to provide other suitable alignments to the LC molecules in the first LC layer 101 for amplitude modulation.

The first LC cell 105 may include a first pixel electrode layer 107 and a first common electrode layer 108 disposed at opposite sides (e.g., first side and second side) of the first LC layer 101. As noted above, the term "common" in "common electrode layer" means that a single voltage is applied across the electrode layer. The common electrode layer 108 may be a continuous, planar electrode layer. In some embodiments, the common electrode layer 108 may be a patterned electrode. The first pixel electrode layer 107 may be disposed at the first substrate 111, between the first substrate 111 and the second alignment layer 103-2. In some embodiments, the first pixel electrode layer 107 may be an indium tin oxide ("ITO") electrode layer. The first pixel electrode layer 107 may include a plurality of separated, individual first pixel electrodes 107a, 107b. Although two first pixel electrodes are shown for illustrative purposes, any suitable number of first pixel electrodes may be included in the first pixel electrode layer 107. Each of the first pixel electrodes 107a, 107b included in the first pixel electrode layer 107 may be individually and independently controlled by a controller 181. For example, the controller 181 may control a power source 182 to individually supply different or the same voltages to the plurality of first pixel electrodes 107a, 107b. The first common electrode layer 108 may be included in the sandwiched electrode layer 130 disposed between the first LC cell 105 and the second LC cell 110. The first alignment layer 103-1 may be disposed between the first continuous electrode layer 108 (or the sandwiched electrode layer 130) and the first LC layer 101. The second alignment layer 103-2 may be disposed between the first pixel electrode layer 107 and the first LC layer 101. The first pixel electrode layer 107 may include a plurality of discrete electrodes for a plurality of pixels.

The controller 181 may control other active or controllable elements included in the complex wavefront modulator 100. The controller 181 may be any suitable controller, and may include a processor, a memory for storing processor-executable instructions. The controller 181 may include physical circuits and/or software components. The power source 182 may be electrically connected to other components included in the complex wavefront modulator 100, such as the sandwiched electrode layer 130.

The second LC cell 110 may include two alignment layers, a third alignment layer 103-3 and a fourth alignment layer 103-4. The second LC cell 110 may include a second LC layer 121 disposed between the two alignment layers 103-3 and 103-4. The second LC layer 121 may include nematic LCs, twist-bend LCs, chiral nematic LCs, smectic LCs, ferroelectric LCs, etc., or a combination thereof. The second LC layer 121 may have a first side facing the first LC cell 105 (or the third alignment layer 103-3), and a second side facing the second substrate 113 (or the fourth alignment layer 103-4). The alignment layers 103-3 and 103-4 may be disposed at the first side and the second side of the second LC layer 121, respectively. As shown in FIG. 1A, a portion of the second LC layer 121 enclosed by the dashed line 177 is presumed to be in the non-activation state. As shown in FIG. 1A, the third and fourth alignment layers 103-3 and 103-4 may be configured to provide the same vertical alignments to LC molecules in the second LC layer 121 at the non-activation state. For example, FIG. 1A shows that at the non-activation state, the LC molecules in the second LC layer 121 (those enclosed in the dashed line 177) are substantially aligned in the z-axis direction. In some embodiments, the third and fourth alignment layers 103-3 and 103-4 may be configured to provide other suitable alignments to the LC molecules in the second LC layer 121 for phase modulation.

The second LC cell 110 may include a second pixel electrode layer 127, and a second continuous electrode layer 128. The second pixel electrode layer 127 and the second continuous electrode layer 128 may be disposed at opposite sides (e.g., the second side and the first side) of the second LC layer 121, respectively. For example, the second pixel electrode layer 127 may be disposed at the second substrate 113 of the second LC cell 110. The second pixel electrode layer 127 may be disposed between the second substrate 113 and the fourth alignment layer 103-4. In some embodiments, the second pixel electrode layer 127 may be an ITO electrode layer. The second pixel electrode layer 127 may include a plurality of separated, individual second pixel electrodes 127a, 127b. Each of the second pixel electrodes 127a, 127b may be individually and independently controlled by the controller 181. For example, the controller 181 may control the power source 182 to supply different or the same voltages to the second pixel electrodes 127a, 127b. Although two second pixel electrodes are shown for illustrative purposes, any suitable number of second pixel electrodes may be included in the second pixel electrode layer 127.

In some embodiments, each of the second pixel electrodes 127a, 127b may be aligned with each of the first pixel electrodes 107a, 107b included in the first pixel electrode layer 107. In some embodiments, the first pixel electrodes 107a, 107b may not be aligned with the second pixel electrodes 127a, 127b. The second continuous electrode layer 128 may be included in the sandwiched electrode layer 130 disposed between the first LC cell 105 and the second LC cell 110. The third alignment layer 103-3 may be disposed between the second continuous electrode layer 128 and the second LC layer 121. The fourth alignment layer 103-4 may be disposed between the second pixel electrode layer 127 and the second LC layer 121.

The first substate 111 and the second substate 113 of the complex wavefront modulator 100 may provide support and protection to various layers, films, and/or structures formed thereon. In some embodiments, the first substate 111 or the second substate 113 may be a wafer, a glass, a plastic, a sapphire, or a combination thereof, etc. In some embodiments, the first substate 111 or the second substate 113 may be rigid, semi-rigid, flexible, or semi-flexible. In some embodiments, the first substate 111 or the second substate 113 may include a flat surface or a curved surface, on which the various layers, films, and/or structures may be formed. In some embodiments, the first substate 111 or the second substate 113 may be a part of another element or device (e.g., another opto-electrical element or device, another electrical element or device). For example, the first substate 111 or the second substate 113 may be a solid optical lens, a part of a solid optical lens, or a light guide, etc.

Each of the first continuous electrode layer 108 and the second continuous electrode layer 128 may be a single continuous electrode layer, rather than being formed by a plurality of separate, individual electrodes. In some embodiments, the first continuous electrode layer 108 and the second continuous electrode layer 128 may be integral portions of the sandwiched electrode layer 130. For example, the first continuous electrode layer 108 and the second continuous electrode layer 128 may be two opposite portions of the same continuous electrode layer that forms the sandwiched electrode layer 130, may be electrically coupled, and may have the same electrical and material properties. In some embodiments, the first continuous electrode layer 108 and the second continuous electrode layer 128 may be separate elements that form different individual parts of the sandwiched electrode layer 130. For example, the first continuous electrode layer 108 and the second continuous electrode layer 128 may be individual elements, having different or the same electrical and/or material properties. In some embodiments, when the first continuous electrode layer 108 and the second continuous electrode layer 128 are separate individual elements, a supporting layer or protection layer 131 may be disposed between the first continuous electrode layer 108 and the second continuous electrode layer 128. It is understood that in some embodiments, when the first continuous electrode layer 108 and the second continuous electrode layer 128 are two opposite portions of the same continuous electrode layer that forms the sandwiched electrode layer 130, the protection layer 131 may still be included between the two opposite portions. In some embodiments, the protection layer 131 may be omitted.

The sandwiched electrode layer 130 disclosed herein may be a non-metal electrode layer. In some embodiments, each of the first continuous electrode layer 108 and the second continuous electrode layer 128 (which form the sandwiched electrode layer 130) may not include or may not be an ITO electrode layer. In some embodiments, at least one (e.g., each) of the first continuous electrode layer 108 and the second continuous electrode layer 128 may include a conductive polymer film (or layer), which includes a conductive polymer that is electrically conductive and optically transparent in an operation wavelength range of the complex wavefront modulator 100. In some embodiments, the conductive polymer film may include a poly(3,4-ethylenedioxythiophene) polystyrene sulfonate (referred to as "PEDOT:PSS") film. The PEDOT:PSS film may be configured with a thickness at the submicron level (i.e., less than 1 µm), e.g., at the level of hundred nanometers (e.g., about 500-900 nm). In some embodiments, at least one (e.g., each) of the first continuous electrode layer 108 and the second continuous electrode layer 128 may include other suitable film that is electrically conductive and optically transparent in an operation wavelength range of the complex wavefront modulator 100, e.g., a graphene film, or a graphene composite film, etc., with a thickness at the submicron level (e.g., less than 1 µm, such as 0.5 µm, 0.6 µm, 0.7 µm, 0.8 µm, 0.9 µm, etc.). In some embodiments, at least one (e.g., each) of the first continuous electrode layer 108 and the second continuous electrode layer 128 may include both of a conductive polymer and graphene or graphene composite. In some embodiments, the first continuous electrode layer 108 and the second continuous electrode layer 128 may be disposed at two opposite sides of the protection layer 131. The protection layer 131 may protect and support the first continuous electrode layer 108 and the second continuous electrode layer 128 disposed thereon. In some embodiments, the protection layer 131 may include a polymer layer.

In some embodiments, the protection layer 131 may be optically transparent in an operation wavelength range of the complex wavefront modulator 100. In some embodiments, the protection layer 131 may be an electrically insulating layer configured to electrically insulate the first continuous electrode layer 108 from the second continuous electrode layer 128. For example, the protection layer 131 may be an electrically insulated polymer layer. As the first continuous electrode layer 108 is electrically insulated from the second continuous electrode layer 128, the first LC layer 101 and the second LC layer 121 may not share the ground (e.g., 0 V). In some embodiments, the protection layer 131 may be an electrically conductive layer to electrically connect the first continuous electrode layer 108 and the second continuous electrode layer 128. Thus, the first LC layer 101 and the second LC layer 121 may share the ground (e.g., 0 V). For example, the protection layer 131 may be an electrically conductive polymer layer.

In some embodiments, the protection layer 131 may also function as a cover layer shared by the first LC cell 105 and the second LC cell 110, for protection purposes. In some embodiments, the protection layer 131 may be omitted, and the first continuous electrode layer 108 may be in direct contact with the second continuous electrode layer 128. In some embodiments, the first continuous electrode layer 108, the protection layer 131, and the second continuous electrode layer 128 may be individual parts (or elements) of the sandwiched electrode layer 130. In some embodiments, when the protection layer 131 is omitted, the first continuous electrode layer 108 and the second continuous electrode layer 128 may be integral portions of a same continuous layer that forms the sandwiched electrode layer 130.

In a conventional complex wavefront modulator, two common ITO electrode layers and one or two substrates (e.g., one or more cover glasses) may be disposed between two LC cells. The two common ITO electrode layers may be disposed at opposite surfaces of the one or two substrates. Such a configuration in the conventional complex wavefront modulator is thick and bulky. In the embodiment shown in FIG. 1A, the thin, sandwiched electrode layer 130 replaces the two common ITO electrode layers and associated substrates (e.g., cover glasses). The thin, sandwiched electrode layer 130 may have a thickness of less than 50 for example, less than 45 µm, less than 40 µm, less than 30 µm, less than 20 µm, 10 µm-20 µm, 10 µm-30 µm, 10 µm-40 µm, 10 µm-50 µm, 20 µm-30 µm, 20 µm-40 µm, 20 µm-50 µm, 30 µm-40 µm, 3 0 µm-50 µm, 40 µm-50 µm, 10 µm, 15 µm, 20 µm, 25 µm, 30 µm, 35 µm, or less than 10 µm, such as 8 µm, 5 µm, etc. Compared to the conventional complex wavefront modulator, the thickness and the weight of the disclosed complex wavefront modulator 100 are reduced. Thus, the aspect ratio of the pixel (i.e., the ratio between the pixel pitch and the thickness of the pixel of the complex wavefront modulator 100 may be increased, thereby broadening the acceptance angle and enhancing the optical performance of the complex wavefront modulator 100.

In some embodiments, the first LC cell 105 configured for amplitude modulation may also include two polarizers 109-1 and 109-2 disposed at opposite sides of the first LC layer 101. For example, the polarizer 109-2 may be disposed in front of the first substrate 111 in the light propagation direction of the input light beam 102, such that the input light beam 102 propagates through the polarizer 109-2 before arriving at the first substrate 111. In other words, the first substrate 111 may be disposed between the polarizer 109-2 and the first pixel electrode layer 107. The polarizer 109-1 may be disposed between the first alignment layer 103-1 and the sandwiched electrode layer 130. For example, as shown in FIG. 1A, the polarizer 109-1 may be disposed between the first continuous electrode layer 108 and the first alignment layer 103-1. The polarizer 109-1 is also disposed between the first LC layer 101 and the second LC layer 121. In some embodiments, the polarizer 109-1 may be omitted. The polarizer 109-1 or 109-2 may include any suitable polarizer. In some embodiments, the polarizer 109-1 or 109-2 may include a metal wire grid polarizer. The polarizer 109-1 may be included in the sandwiched electrode layer 130, or may be a separate element from the sandwiched electrode layer 130.

Figure 1B:
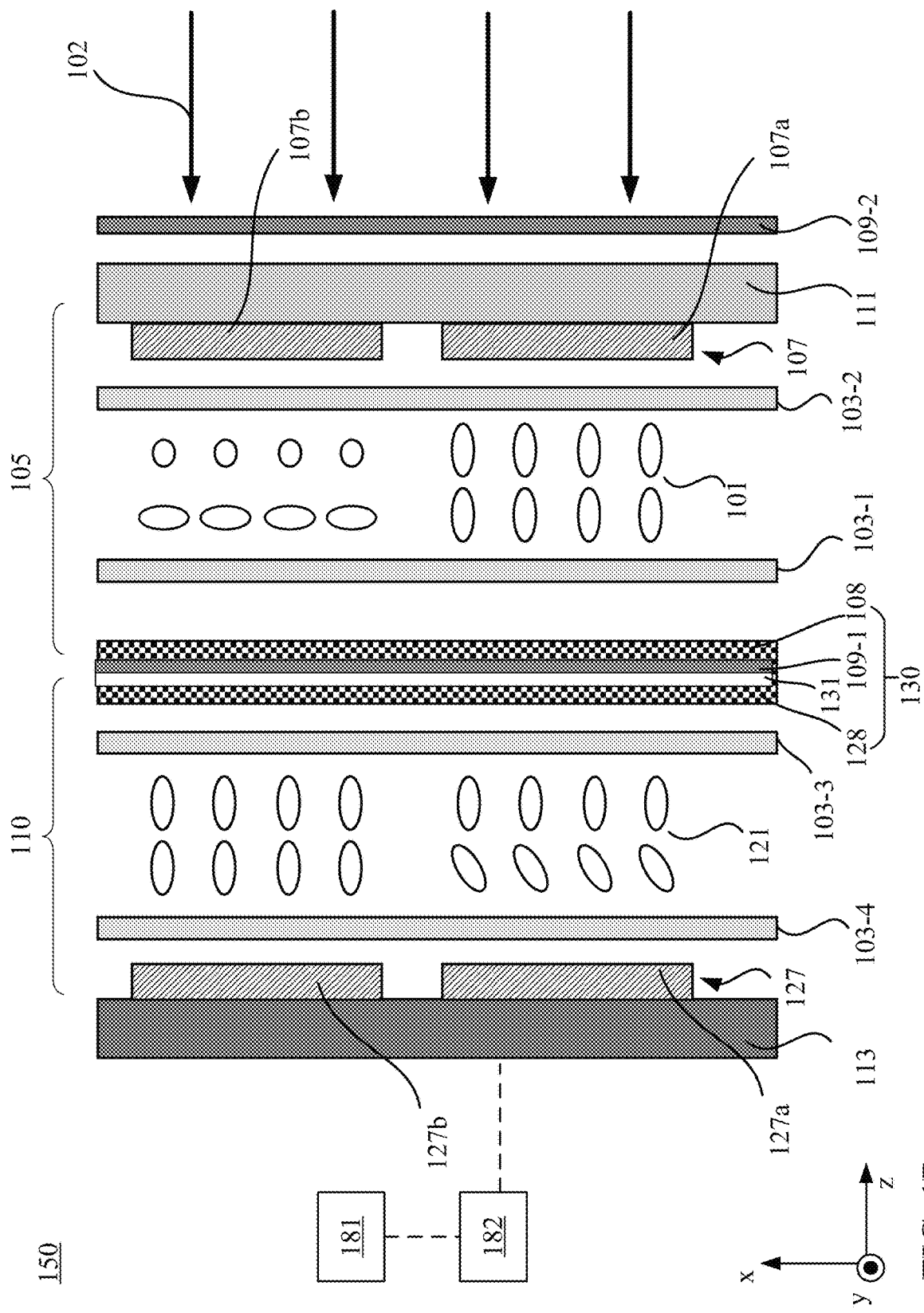

FIG. 1B illustrates an x-z sectional view of a complex wavefront modulator 150, according to an embodiment of the present disclosure. The complex wavefront modulator 150 shown in FIG. 1B may include elements, structures, and/or functions that are the same as or similar to those included in the complex wavefront modulator 100 shown in FIG. 1A. Detailed descriptions of the same or similar elements, structures, and/or functions may refer to the above descriptions rendered in connection with FIG. 1A.

As shown in FIG. 1B, the complex wavefront modulator 150 may include the first LC cell 105, the sandwiched electrode layer 130, and the second LC cell 110 arranged in a stacked configuration, with the sandwiched electrode layer 130 disposed between the first LC cell 105 and the second LC cell 110. As shown in FIG. 1B, the polarizer 109-1 is included in the sandwiched electrode layer 130. The polarizer 109-1 may be disposed between the first continuous electrode layer 108 and the second continuous electrode layer 128. FIG. 1B shows that the polarizer 109-1 is disposed between the first continuous electrode layer 108 and the protection layer 131 (when the protection layer 131 is included). The positions of the polarizer 109-1 and the protection layer 131 shown in FIG. 1B may be exchanged. For example, in some embodiments, the polarizer 109-1 may be included in the sandwiched electrode layer 130, and disposed between the second continuous electrode layer 128 and the protection layer 131 (when the protection layer 131 is included).

Figure 1C:
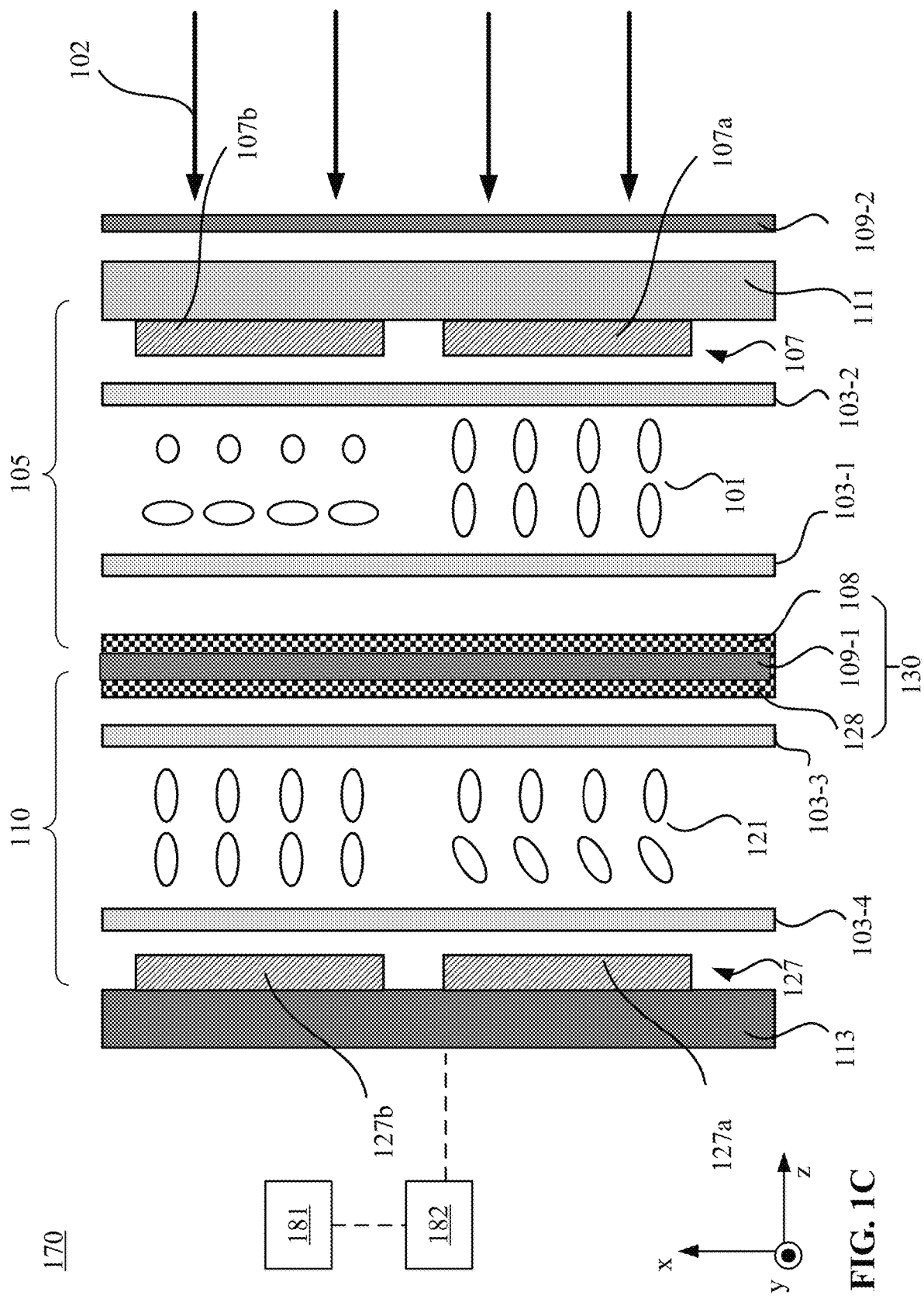

FIG. 1C illustrates an x-z sectional view of a complex wavefront modulator 170, according to an embodiment of the present disclosure. The complex wavefront modulator 170 shown in FIG. 1C may include elements, structures, and/or functions that are the same as or similar to those included in the complex wavefront modulator 100 shown in FIG. 1A or the complex wavefront modulator 150 shown in FIG. 1B. Detailed descriptions of the same or similar elements, structures, and/or functions may refer to the above descriptions rendered in connection with FIG. 1A or FIG. 1B.

As shown in FIG. 1C, the complex wavefront modulator 170 may include the first LC cell 105, the sandwiched electrode layer 130, and the second LC cell 110 arranged in a stacked configuration, with the sandwiched electrode layer 130 disposed between the first LC cell 105 and the second LC cell 110. In the embodiment shown in FIG. 1C, the polarizer 109-1 is included in the sandwiched electrode layer 130, and the protection layer 131 is omitted. The polarizer 109-1 may be disposed between the first continuous electrode layer 108 and the second continuous electrode layer 128. The polarizer 109-1 may also function as the protection layer 131.

Referring back to FIG. 1A, the complex wavefront modulator 100 may include an array of pixels 115a, 115b. Each of the pixels 115a, 115b may include a first sub-pixel 117a or 117b and a second sub-pixel 119a or 119b. Each first sub-pixel 117a or 117b may be aligned with each second sub-pixel 119a or 119b. The first sub-pixels 117a, 117b may be included in the first LC cell 105, the second sub-pixels 119a, 119b may be included in the second LC cell 110. As shown in FIG. 1A, the first sub-pixels 117a, 117b are arranged along the x-axis direction, and the second sub-pixels 119a, 119b are also arranged along the x-axis direction. The numbers of pixels and sub-pixels shown in FIG. 1A are for illustrative purposes. The complex wavefront modulator 100 may include any suitable numbers of pixels and sub-pixels. Each first sub-pixel 117a, 117b may include a first pixel electrode (e.g., 107a, 107b), a portion of the first LC layer 101, and the associated portions of the alignment layers 103-1, 103-2, polarizer 109-1, polarizer 109-2, substrate 111, and sandwiched electrode layer 130. The power source 182 may provide driving voltages to the respective first sub-pixels 117a, 117b independently, via the sandwiched electrode layer 130 (e.g., the first continuous electrode layer 108) and the respective first pixel electrodes 107a, 107b. In some embodiments, individual power sources 182 may be electrically coupled to each sub-pixel 117a, 117b. For example, individual power sources 182 may be coupled to the sandwiched electrode layer 130 (e.g., the first continuous electrode layer 108) and the respective first pixel electrodes 107a, 107b, to provide driving voltages to the respective first sub-pixels 117a, 117b, independently. During an operation of the first LC cell 105, the first continuous electrode layer 108 may be applied with a uniform voltage, and voltages applied to the respective first pixel electrodes 107a, 107b may be individually (or independently) configured, such that the light transmittances of the respective first sub-pixels 117a, 117b may be individually (or independently) configurable to modulate the local amplitudes of the input light beam 102.

Each second sub-pixel 119a, 119b may include a second pixel electrode (127a, 127b), and a portion of the second LC layer 121, and the associated portions of the sandwiched electrode layer 130 (e.g., the second continuous electrode layer 128), the substrate 113, and the alignment layers 103-3 and 103-4. Under the control of the controller 181, the power source 182 may drive the second sub-pixels 119a, 119b independently, through supplying driving voltages to the second continuous electrode layer 128 and the second pixel electrode layer 127. In some embodiments, individual powers sources may be electrically coupled to the second continuous electrode layer 128 and the respective second pixel electrodes 127a, 127b to providing driving voltages to the respective second sub-pixels 119a, 119b independently.

During an operation of the second LC cell 110, the second continuous electrode layer 128 may be applied with a uniform voltage, and the voltages applied to the respective second pixel electrodes 127a, 127b may be individually (or independently) configured, such that the phase retardances provided by the respective second sub-pixels 119a, 119b may be individually (or independently) controllable to modulate the local phases of the input light beam 102.

During an operation of the complex wavefront modulator 100, by individually driving the respective first sub-pixels 117a, 117b, and individually driving the respective second sub-pixels 119a, 119b, the light transmittances of the respective pixels 115a, 115b and the phase retardances provided by the respective pixels 115a, 115b may be individually controlled to modulate the local amplitudes and local phases of the input light beam 102. For discussion purposes, FIG. 1A shows two pixels 115a, 115b of the complex wavefront modulator 100, in which the upper pixel 115a operates at the non-activating state (e.g., a voltage-off state), and the lower pixel 115b operates at the activating state (e.g., a voltage-on state).

In some embodiments, the complex wavefront modulator 100 may function as a reflective device. For example, the first LC cell 105 may include a transmissive TFT-LCD panel for amplitude modulation (functioning as an amplitude SLM), and the second LC cell 110 may include a reflective LCoS for phase modulation (functioning as a phase SLM). The second substrate 113 of the second LC cell 110 may include a silicon backplane that includes electric circuitry for driving the second sub-pixels 119a, 119b. The first substate 111 of the first LC cell 105 may include a TFT substate that includes electric circuitry for driving the first sub-pixels 117a, 117b. In some embodiments, although not shown, the first LC cell 105 may include a transmissive TFT-LCD panel for amplitude modulation, and the second LC cell 110 may include a transmissive or reflective TFT-LCD panel for phase modulation. In some embodiments, although not shown, the first LC cell 105 may include a reflective LCoS for amplitude modulation, and the second LC cell 110 may include a transmissive TFT-LCD panel for phase modulation.

For discussion purposes, FIGS. 1A-1C show that the disclosed complex wavefront modulator 100, 150, or 170 includes two LC cells (e.g., the first LC cell 105 and the second LC cell 110) configured to provide the spatially varying modulations of the amplitude and phase of the input light beam 102, and the sandwiched electrode layer 130 is disposed between two active LC layers (e.g., the first LC layer 101 and the second LC layer 121) included in the two LC cells. In some embodiments, the complex wavefront modulator 100 may include one or more additional LC cells stacked with the first and second LC cells, each of which may be configured to provide a spatially varying modulation of the phase, the amplitude, or the polarization, etc. of the input light beam 102, and one or more additional sandwiched electrode layer 130.

Figure 1D:
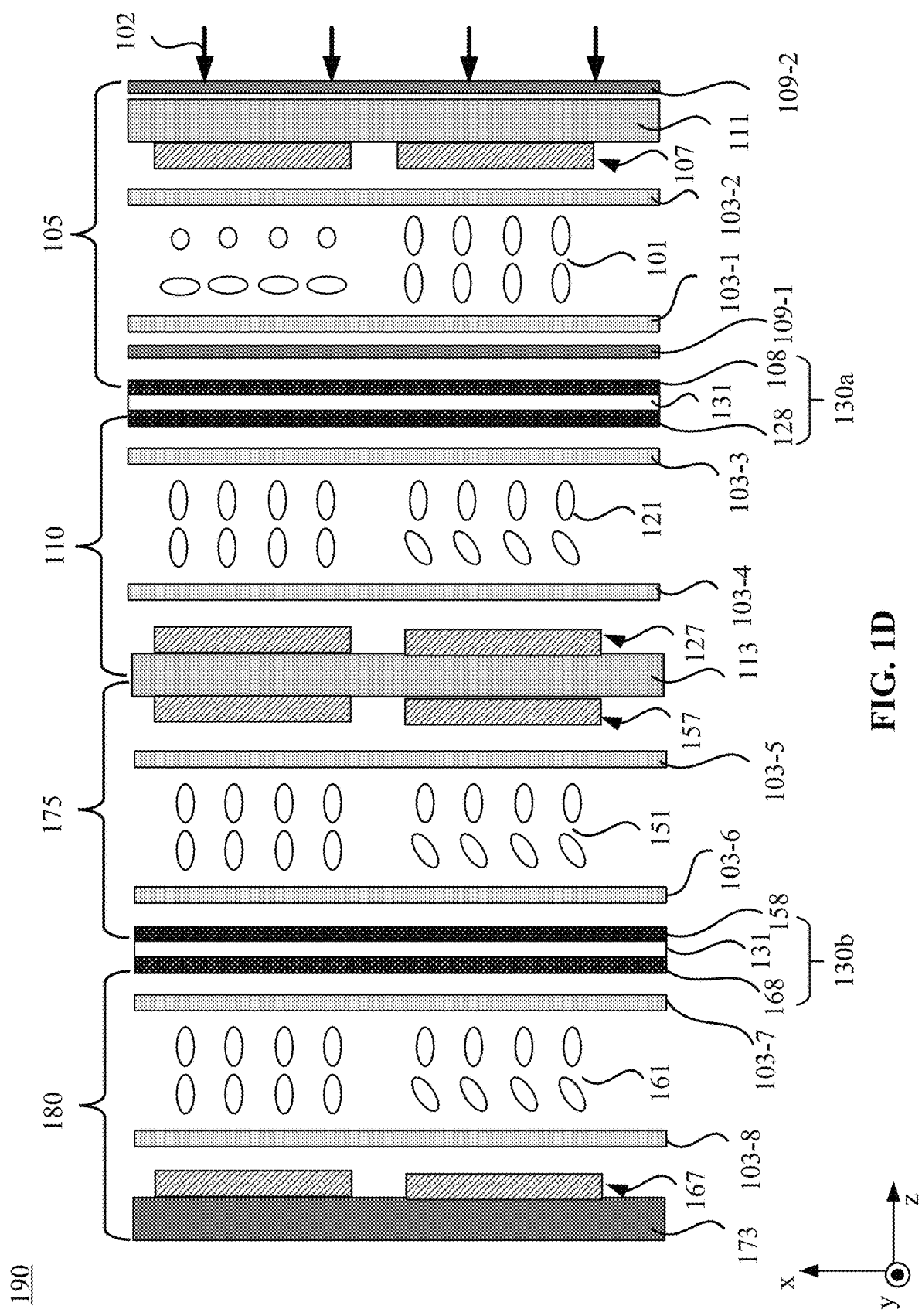

For example, FIG. 1D illustrates an x-z sectional view of a complex wavefront modulator 190, according to an embodiment of the present disclosure. The complex wavefront modulator 190 shown in FIG. 1D may include elements, structures, and/or functions that are the same as or similar to those included in the complex wavefront modulator 100 shown in FIG. 1A, the complex wavefront modulator 150 shown in FIG. 1B, or the complex wavefront modulator 170 shown in FIG. 1C. Detailed descriptions of the same or similar elements, structures, and/or functions may refer to the above descriptions rendered in connection with FIG. 1A, FIG. 1B, or FIG. 1C.

As shown in FIG. 1D, the complex wavefront modulator 190 may include four LC cells 105, 110, 175, and 180 arranged in a stack configuration, each of which may be configured to provide a spatially varying modulation of the phase, the amplitude, or the polarization, etc. of the input light beam 102. The respective LC cell 105, 110, 175, or 180 may include an active LC layer 101, 121, 151, or 161 that is coupled to a pixel electrode layer 107, 127, 157, or 167, a continuous electrode layer 108, 128, 158, or 168, and two alignment layers 103-1 and 103-2, 103-3 and 103-4, 103-5 and 103-6, or 103-7 and 103-8. In some embodiments, the active LC layer 101, 121, 151, or 161 in at least one of the LC cells 105, 110, 175, and 180 may also be coupled to one or two polarizers, e.g., 109-1 and 109-2.

In some embodiments, the complex wavefront modulator 190 may also include two sandwiched electrode layers 130a and 130b disposed between neighboring active LC cells 105 and 110, and between neighboring active LC cells 175 and 180. The configurations of the sandwiched electrode layers 130a and 130b are for illustrative purposes. Any embodiment of the sandwiched electrode layer 130 shown in FIGS. 1A-1C may be implemented as the shared common electrode layer 130a or 130b. The sandwiched electrode layer 130a may include the continuous electrode layers 108 and 128, and the protection layer 131 (which may be omitted in some embodiments). The sandwiched electrode layer 130b may include the continuous electrode layers 158 and 168, and the protection layer 131 (which may be omitted in some embodiments). In some embodiments, each of the continuous electrode layers 108, 128, 158, and 168 may include a polymer film that is electrically conductive and optically transparent in an operation wavelength range of the complex wavefront modulator 190, such as a PEDOT:PSS film with a thickness of less than 1 micron (e.g., 600-900 nm). In some embodiments, each of the continuous electrode layers 108, 128, 158, and 168 may include other suitable film that is electrically conductive and optically transparent in an operation wavelength range of the complex wavefront modulator 190, such as a graphene film.

In some embodiments, the complex wavefront modulator 190 may include three substrates 111, 113, and 173 that include the electric circuitries for driving the complex wavefront modulator 190. For example, the substate 111 may include a silicon backplane or a TFT substate that includes the electric circuitry for driving the LC cell 105. The substate 113 may include a TFT substate that includes the respective electric circuitry for driving the LC cell 110 and the LC cell 175. The substate 173 may include a silicon backplane or a TFT substate that includes the electric circuitry for driving the LC cell 180. In some embodiments, the pixel electrode layer 107 may be disposed at a surface of the substate 111 facing the LC layer 101. In some embodiments, the pixel electrode layer 167 may be disposed at a surface of the substate 173 facing the LC layer 161. In some embodiments, the pixel electrode layer 127 and the pixel electrode layer 157 may be disposed at two different surfaces of the substate 113, e.g., the pixel electrode layer 127 may be disposed at a surface of the substate 113 facing the LC layer 121, and the pixel electrode layer 157 may be disposed at a surface of the substate 113 facing the LC layer 151.

Figure 2A:
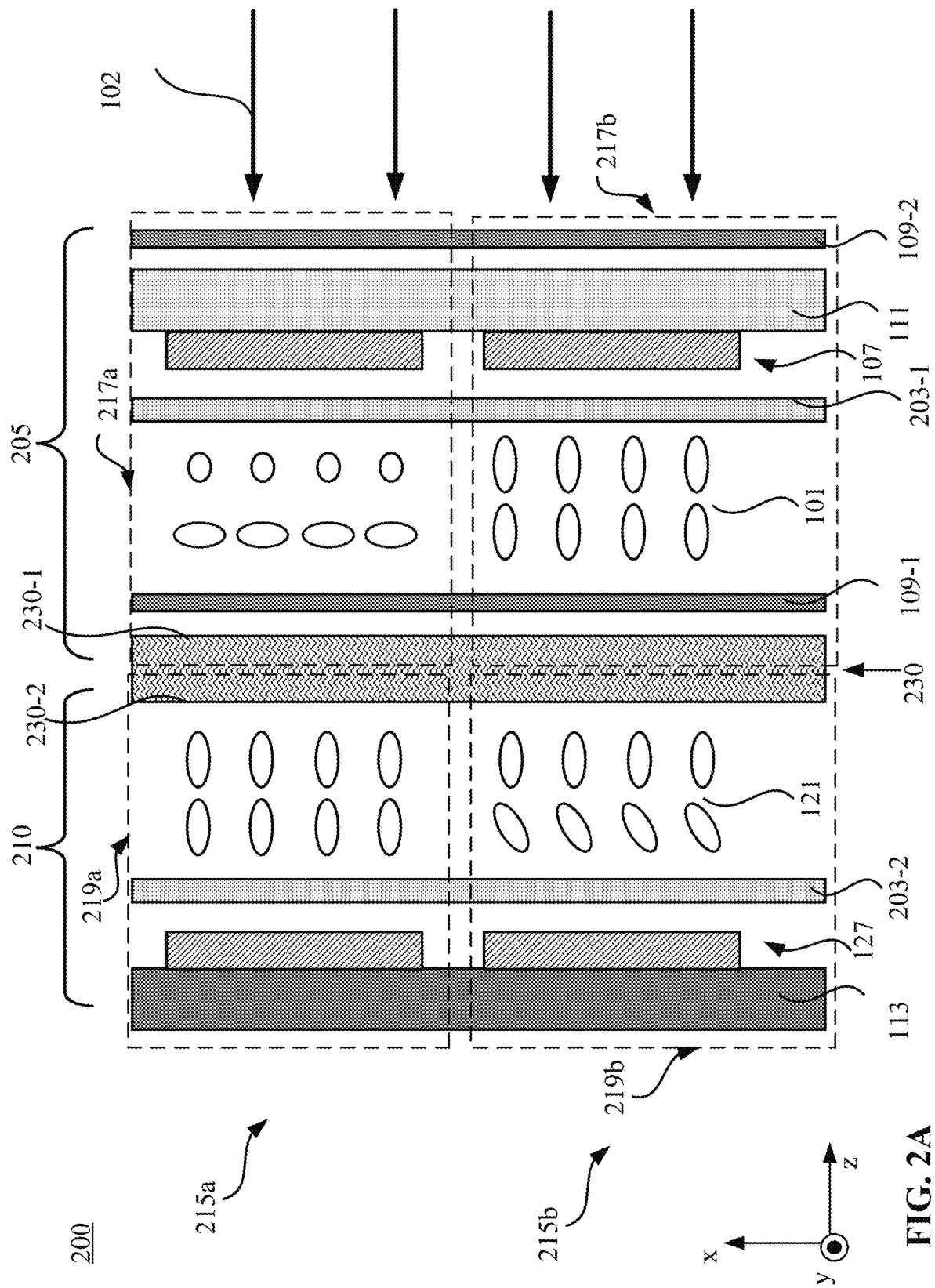
FIGS. 2A and 2B illustrate schematic diagrams of complex wavefront modulators, according to various embodiments of the present disclosure.

FIG. 2A illustrates an x-z sectional view of a complex wavefront modulator 200, according to an embodiment of the present disclosure. The complex wavefront modulator 200 shown in FIG. 2A may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, or the complex wavefront modulator 190 shown in FIG. 1D. Detailed descriptions of the same or similar elements, structures, and/or functions may refer to the above descriptions rendered in connection with FIG. 1A, FIG. 1B, FIG. 1C, or FIG. 1D.

As shown in FIG. 2A, the complex wavefront modulator 200 may be a reflective device, a transmissive device, or a transflective device. The complex wavefront modulator 200 may include a first LC cell 205, a sandwiched electrode layer 230, and a second LC cell 210 stacked together, with the sandwiched electrode layer 230 disposed (i.e., sandwiched) between the first LC cell 205 and the second LC cell 210. In some embodiments, the first LC cell 205 and the second LC cell 210 may include an LCoS and a TFT-LCD panel. In some embodiments, each of the first LC cell 205 and the second LC cell 210 may include a TFT-LCD panel. When the first LC cell 205 or the second LC cell 210 includes an LCoS, the first substate 111 or the second substrate 113 may include a silicon backplane that includes electric circuitry for driving the first LC cell 205 or the second LC cell 210. When the first LC cell 205 or the second LC cell 210 includes a TFT-LCD panel, the first substate 111 or the second substrate 113 may include a TFT substate that includes electric circuitry for driving the first LC cell 205 or the second LC cell 210. The complex wavefront modulator 200 may include an array of pixels 215a, 215b. Each of the pixels 215a and 215b may include a plurality of sub-pixels, e.g., a first sub-pixel 217a and a second sub-pixel 219a, or a first sub-pixel 217b and a second sub-pixel 219b. For illustrative purposes, FIG. 2A shows that the upper pixel 215a operates at a non-activating state, and the lower pixel 215b operates at an activating state.

The first LC cell 205 may include the first LC layer 101, a first alignment layer 203-1, the first pixel electrode layer 107, and the first substrate 111. The first substrate 111 may also function as a substate of the complex wavefront modulator 200. The first LC layer 101 may have a first side facing the second LC cell 210, and a second side facing the first substate 111. The first alignment layer 203-1 and the first pixel electrode layer 107 may be disposed at the second side of the first LC layer 101 between the first substrate 111 and the first LC layer 101. The first pixel electrode layer 107 may include a plurality of first pixel electrodes, similar to the configuration shown in FIG. 1A. The first pixel electrode layer 107 may be an ITO electrode layer. The first alignment layer 203-1 may be similar to any alignment layer described above and shown in FIGS. 1A-1D.

The second LC cell 210 may include the second LC layer 121, a second alignment layer 203-2, the second pixel electrode layer 127, and the second substrate 113. The second substrate 113 may also function as a substate of the complex wavefront modulator 200. The second LC layer 121 may have a first side facing the first LC cell 210, and a second side facing the second substrate 113. The second alignment layer 203-2 and the second pixel electrode layer 127 may be disposed at the second side of the second LC layer 121 between the second substrate 113 and the second LC layer 121. The second pixel electrode layer 127 may include a plurality of second pixel electrodes, similar to the configuration shown in FIG. 1A. The second pixel electrode layer 127 may be an ITO electrode layer. The second alignment layer 203-2 may be similar to any alignment layer described above and shown in FIGS. 1A-1D.

The sandwiched electrode layer 230 may include a conductive polymer layer that is a liquid crystal polymer ("LCP") layer or film, which that provides both electrode function and alignment function (also referred to as 230). The thickness of the sandwiched electrode layer 230 may be any value or in any range described herein for a sandwiched electrode layer. The LCP film 230 may be optically transparent in an operation wavelength range of the complex wavefront modulator 200. The LCP film 230 may function as a shared alignment layer that provides respective alignments to the first LC layer 101 and the second LC layer 121. For example, a first surface 230-1 of the LCP film 230 facing the first LC layer 101 may provide an alignment to the first LC layer 101, and a second surface 230-2 of the LCP film 230 facing the second LC layer 121 may provide an alignment to the second LC layer 121. The LCP film 230 and the first alignment layer 203-1 together may be configured to provide any suitable alignments to the LC molecules in the first LC layer 101 for the amplitude modulation, and the LCP film 230 and the second alignment layer 203-2 together may be configured to provide any suitable alignments to the LC molecules in the second LC layer 121 for the phase modulation. In some embodiments, the LCP film 230 may also be configured with predetermined electrical conductivity, such that the LCP film 230 may also function as a common electrode layer shared by the first LC cell 205 and the second LC cell 210. In some embodiments, the LCP film 230 may also function as a cover layer shared by the first LC cell 205 and the second LC cell 210, for protection purposes.

In some embodiments, the first LC cell 205 configured for amplitude modulation may also include two polarizers 109-1 and 109-2 disposed at the first side and the second side of the first LC layer 101, respectively. In some embodiments, the polarizer 109-1 may be omitted. The polarizer 109-1 or 109-2 may include any suitable polarizer. In some embodiments, the polarizer 109-1 or 109-2 may include a metal wire grid polarizer. In some embodiments, as shown in FIG. 2A, the polarizer 109-1 may be disposed between the LCP film 230 and the first LC layer 101. In some embodiments, although not shown, the polarizer 109-1 may be disposed between the LCP film 230 and the second LC layer 121.

The LCP film 230 may include polymerized LCs, e.g., reactive mesogens ("RMs"). The LC molecules (e.g., RM molecules) located in a first region that is in close proximity to or at the first surface 230-1 of the LCP film 230 may be configured to have a first predetermined orientation, such that the first surface 230-1 may provide a first predetermined alignment to the first LC layer 101. The LC molecules (e.g., RM molecules) located in a second region that is in close proximity to or at the second surface 230-2 of the LCP film 230 may be configured to have a second predetermined orientation, such that the second surface 230-2 may provide a second predetermined alignment to the second LC layer 121. The LC molecules (e.g., RM molecules) located in the bulk of the LCP film 230 (e.g., a third region between the first region and the second region) may be configured to have a third predetermined orientation, such that the bulk of the LCP film 230 may be optically isotropic, e.g., at least for a normally incident light beam. For example, the third predetermined orientation may be along the thickness direction of the LCP film 230, and the LC molecules in the bulk region of the LCP film 230 may be substantially aligned in a direction along the thickness direction of the LCP film 230.

The first predetermined alignment provided by the first surface 230-1 and the second predetermined alignment provided by the second surface 230-2 may be substantially the same or may be different. In some embodiments, the first and second predetermined alignments may include parallel alignments (e.g., planar or homogeneous alignments with parallel alignment directions), anti-parallel alignments e.g., planar or homogeneous alignments with anti-parallel alignment directions), twisted nematic alignments (e.g., planar or homogeneous alignments with twisted alignment directions), orthogonal alignments (e.g., planar or homogeneous alignments with orthogonal alignment directions), vertical alignments, or hybrid alignments (e.g., a homogeneous alignment and a vertical alignment), etc.

For discussion purposes, in the embodiment shown in FIG. 2A, the first predetermined alignment and the second predetermined alignment may include hybrid alignments. For example, the first predetermined alignment provided by the first surface 230-1 of the LCP film 230 to the first LC layer 101 may be a homogeneous alignment (e.g., along the x-axis direction in FIG. 2A), and the second predetermined alignment provided by the second surface 230-1 of the LCP film 230 to the second LC layer 121 may be a vertical alignment (e.g., along the z-axis direction in FIG. 2). Thus, the first surface 230-1 of the LCP film 230 and the first alignment layer 203-1 together may provide twisted nematic alignments to the LC molecules in the first LC layer 101. In some embodiments, the twisted nematic alignments may be configured with orthogonal alignment directions, through which the LC molecules in the first LC layer 101 may be twisted by about 90° from one surface of the first LC layer 101 to the other surface of the first LC layer 101. For discussion purposes, FIG. 2A shows that the sub-pixel 217a is at the non-activating state. In the sub-pixel 217a, the LC molecules located in close proximity to or at one surface of the first LC layer 101 are substantially aligned in the x-axis direction, and the LC molecules located in close proximity to or at the other surface of the first LC layer 101 are substantially aligned in the y-axis direction. In some embodiments, the first surface 230-1 of the LCP film 230 and the first alignment layer 203-1 together may be configured to provide other suitable alignments to the LC molecules in the first LC layer 101 for amplitude modulation.

The second surface 230-2 of the LCP film 230 and the second alignment layer 203-2 together may provide vertical alignments to the LC molecules in the second LC layer 121. For discussion purposes, FIG. 2A shows that at the sub-pixel 219a is at the non-activating state. In the sub-pixel 219a, the LC molecules in the second LC layer 121 are substantially aligned in the z-axis direction. In some embodiments, the second surface 230-2 of the LCP film 230 and the second alignment layer 203-2 together may be configured to provide other suitable alignments to the LC molecules in the second LC layer 121 for phase modulation.

In some embodiments, the LCP film 230 may be configured with a predetermined electrical conductivity, such that the LCP film 230 may also function as a common electrode layer shared by the first LC cell 205 and the second LC cell 210. For example, the LCP film 230 may include a conductive material, such as a conductive polymer (e.g., nonathiophene), carbon nanotubes, silver nanowires, etc., or a combination thereof. During an operation of the complex wavefront modulator 200, the LCP film 230 may be applied with a uniform voltage, while the voltages applied to the respective first pixel electrodes in the first pixel electrode layer 107 and the voltages applied to the respective second pixel electrodes in the second pixel electrode layer 127 may be individually configured. Thus, the complex wavefront modulator 200 may provide the spatially varying amplitude modulation and the spatially varying phase modulation to the input light beam 102. In some embodiments, the LCP film 230 may also function as the cover layer shared by the first LC cell 205 and the second LC cell 210, for protection purposes. For discussion purposes, similar to the sandwiched electrode layer 130, the LCP film 230 may also be referred to as a sandwiched electrode layer between the first LC cell 205 (or the first LC layer 101) and the second LC cell 210 (or the second LC layer 121).

In some embodiments, the LCP film 230 may have a thickness less than 100 micrometers ("µm"), e.g., 10 µm, 20 µm, etc. The single LCP film 230 that functions as the shared alignment layer, the sandwiched electrode layer, and the shared cover or protection layer may replace the combination of two common ITO electrode layers, and one or two substrates (e.g., one or more cover glasses) in a conventional complex wavefront modulator. Compared to the conventional complex wavefront modulator, the thickness and the weight of the complex wavefront modulator 200 may be significantly reduced. In addition, the aspect ratio of the pixel (i.e., the ratio between the pixel pitch and the thickness of the pixel) in the complex wavefront modulator 200 may be increased, thereby broadening the acceptance angle and enhancing the optical performance of the complex wavefront modulator 200.

In some embodiments, as the birefringence of an LC material included in the first LC layer 101 and/or second LC layer 121 is increased, the thickness of the first LC layer 101 and/or second LC layer 121 may be reduced. A thinner first LC layer 101 and/or second LC layer 121 may entail a weaker alignment power from the LCP film 230 disposed between the first LC layer 101 and the second LC layer 121. Thus, a thinner LCP film 230 may be used, further reducing the thickness of the complex wavefront modulator 200.

In some embodiments, the complex wavefront modulator 200 may function as a reflective device. For example, the first LC cell 205 may include a transmissive TFT-LCD panel for amplitude modulation (functioning as an amplitude SLM), and the second LC cell 210 may include a reflective LCoS for phase modulation (functioning as a phase SLM). The second substrate 113 of the second LC cell 210 (or the complex wavefront modulator 200) may include a silicon backplane that includes electric circuitry for driving second sub-pixels 219a, 219b included in the second LC cell 210. The first sub state 111 of the first LC cell 205 (or the complex wavefront modulator 200) may include a TFT substate that includes electric circuitry for driving first sub-pixels 217a, 217b included in the first LC cell 205. In some embodiments, although not shown, the first LC cell 205 may include a transmissive TFT-LCD panel for amplitude modulation, and the second LC cell 210 may include a transmissive or reflective TFT-LCD panel for phase modulation. In some embodiments, the first LC cell 205 may include a reflective LCoS for amplitude modulation, and the second LC cell 210 may include a transmissive TFT-LCD panel for phase modulation.

For discussion purposes, FIG. 2A shows that the disclosed complex wavefront modulator 200 includes two LC cells 205 and 210 configured to provide the spatially varying modulations of the amplitude and phase of the input light beam 102, and the LCP film 230 is disposed between the two LC cells 205 and 210. In some embodiments, the complex wavefront modulator may include more than two LC cells, each of which may be configured to provide a spatially varying modulation of the phase, the amplitude, or the polarization, etc. of the input light beam 102, and more than one LCP films 230.

Figure 2B:
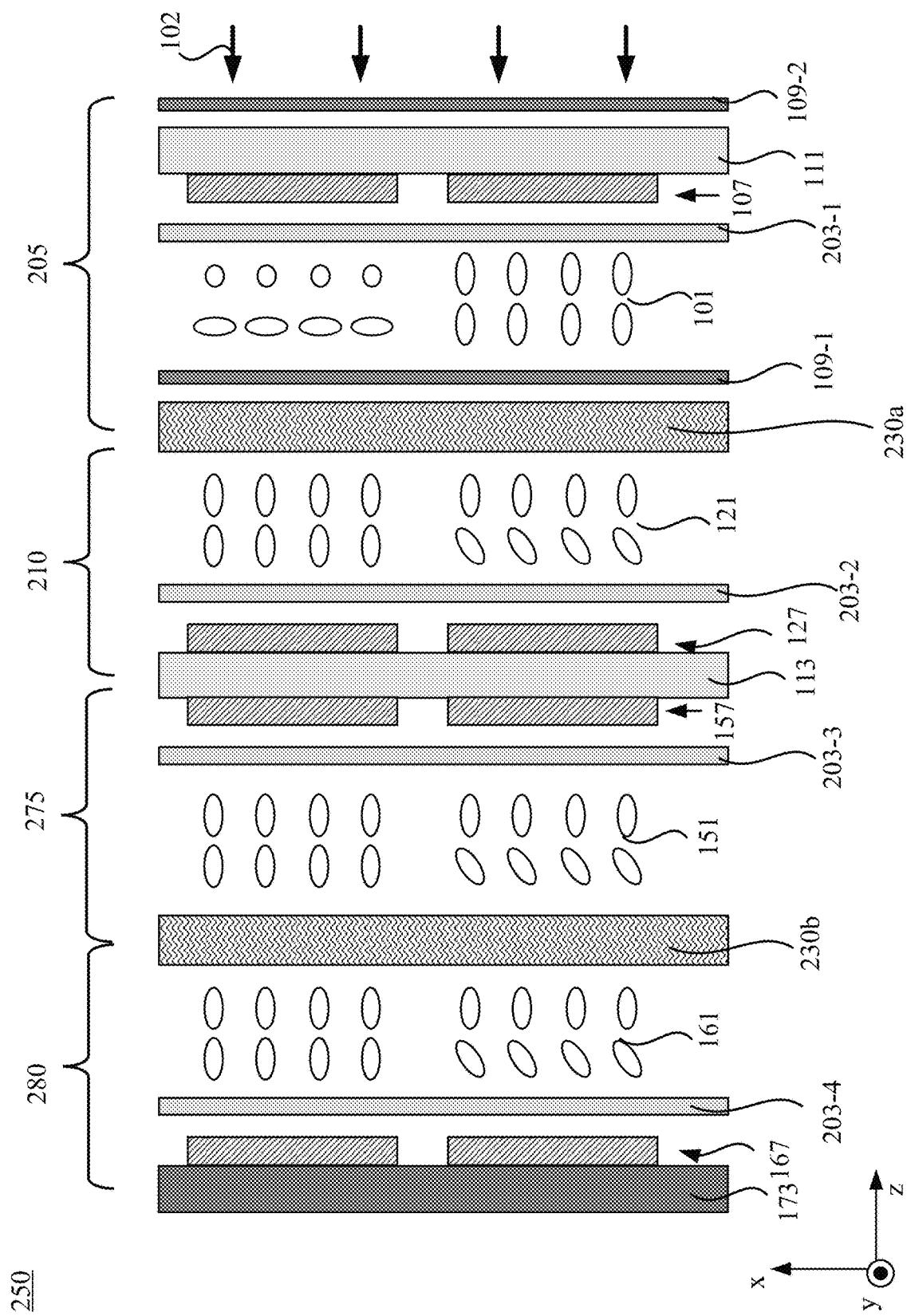

For example, FIG. 2B illustrates an x-z sectional view of a complex wavefront modulator 250, according to an embodiment of the present disclosure. The complex wavefront modulator 250 shown in FIG. 2B may include elements, structures, and/or functions that are the same as or similar to those included in the complex wavefront modulator 100 shown in FIG. 1A the complex wavefront modulator 150 shown in FIG. 1B, the complex wavefront modulator 170 shown in FIG. 1C, the complex wavefront modulator 190 shown in FIG. 1D, or the complex wavefront modulator 200 shown in FIG. 2A. Detailed descriptions of the same or similar elements, structures, and/or functions may refer to the above descriptions rendered in connection with FIG. 1A, FIG. 1B, FIG. 1C, FIG. 1D, or FIG. 2A.

As shown in FIG. 2B, the complex wavefront modulator 250 may include four LC cells 205, 210, 275, and 280, and two LCP films 230a, 230b, arranged in a stack configuration. The LCP film 230a is disposed between the LC cells 205 and 210, and the LCP film 230b is disposed between the LC cells 275 and 280. Each of the LCP films 230a, 230b may be similar to the LCP film 230 described above. Each of the LC cells 205, 210, 275, and 280 may be configured to provide a spatially varying modulation of the phase, the amplitude, or the polarization, etc., of the input light beam 102. The respective LC cell 205, 210, 275, or 280 may include an active LC layer 101, 121, 151, or 161 that is coupled with a pixel electrode layer 107, 127, 157, or 167, and an alignment layer 203-1, 203-2, 203-3, 203-4. In some embodiments, the active LC layer 101, 121, 151, or 161 in at least one of the LC cells 205, 210, 275, and 280 may also be coupled to one or two polarizers, e.g., 109-1 and 109-2.

In some embodiments, opposite surfaces of the LCP film 230a may provide respective alignments to the LC layer 101 and the LC layer 121, and may be electrically conductive to function as a sandwiched electrode layer for driving the LC layer 101 and the LC layer 121. The LCP film 230a may also function as the cover layer shared by the LC cells 205 and 210, for protection purposes. Opposite surfaces of the LCP film 230b may provide respective alignments to the LC layer 151 and the LC layer 161, and may be electrically conductive to function as a sandwiched electrode layer for driving the LC layer 151 and the LC layer 161. The LCP film 230b may also function as the cover layer shared by the LC cells 275 and 280, for protection purposes.

In some embodiments, the complex wavefront modulator 250 may include three substrates 111, 113, and 173 that include the electric circuitries for driving the complex wavefront modulator 250. For example, the substate 111 may include a silicon backplane or a TFT substate that includes the electric circuitry for driving the LC cell 205, the substate 113 may include a TFT substrate that includes the respective electric circuitry for driving the LC cell 210 and the LC cell 275, and the substate 173 may include a silicon backplane or a TFT substate that includes the electric circuitry for driving the LC cell 280. In some embodiments, the pixel electrode layer 107 may be disposed at a surface of the substate 111 facing the LC layer 201. In some embodiments, the pixel electrode layer 167 may be disposed at a surface of the substate 173 facing the LC layer 161. In some embodiments, the pixel electrode layer 127 and the pixel electrode layer 157 may be disposed at opposite surfaces of the substate 113 for driving the LC layer 121 and the LC layer 151, respectively.

Figure 2C:
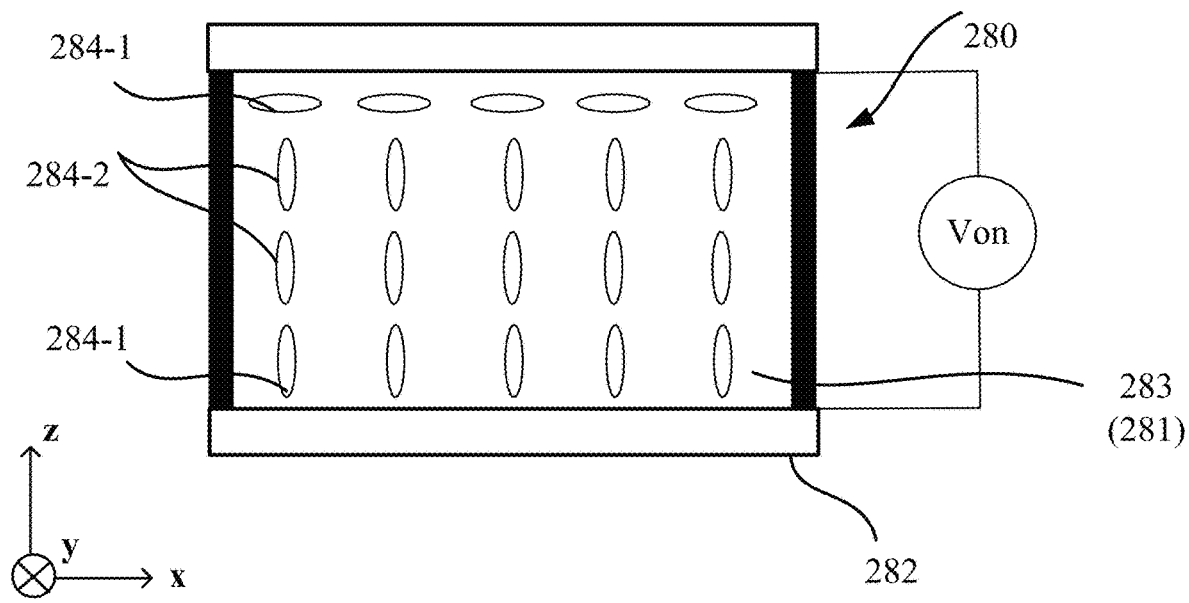
FIGS. 2C and 2D illustrate schematic diagrams of fabrication processes of a liquid crystal polymer ("LCP") film included in the complex wavefront modulator shown in FIG. 2A or the complex wavefront modulator shown in FIG. 2B, according to an embodiment of the present disclosure.
Figure 2D:
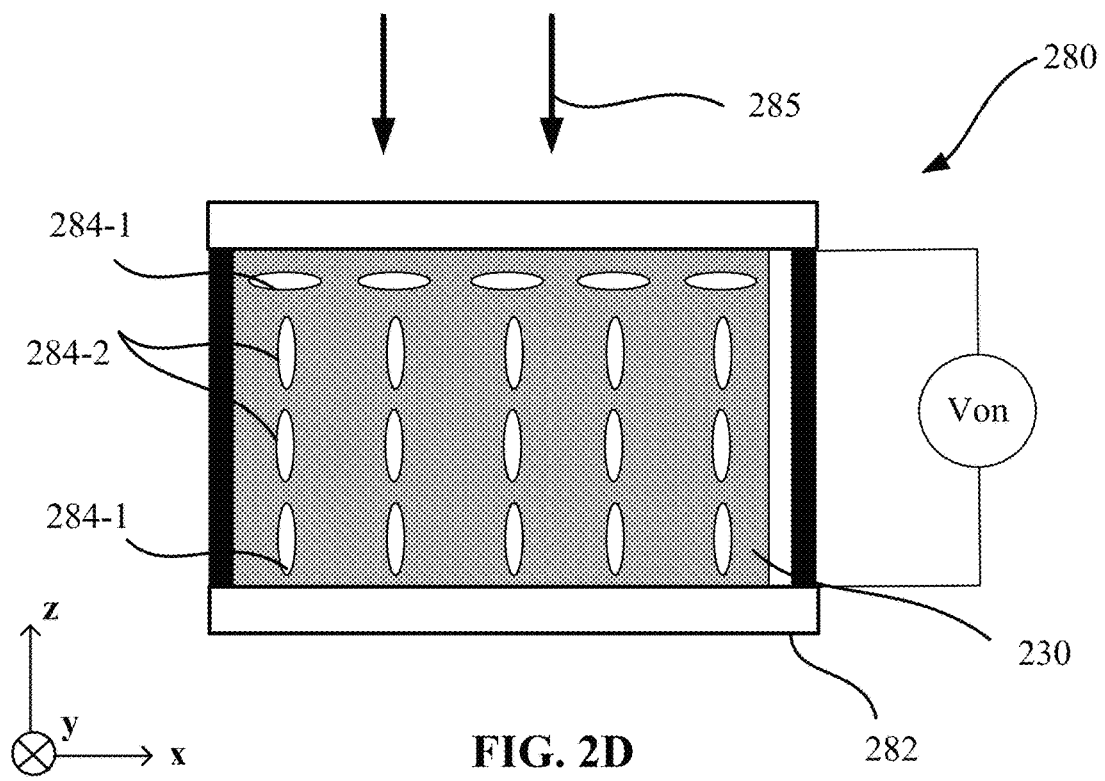

FIGS. 2C and 2D illustrate schematic diagrams of fabrication processes of the LCP film 230 (or 230a, 230b) included in the complex wavefront modulator shown in FIG. 2A or the complex wavefront modulator shown in FIG. 2B, according to an embodiment of the present disclosure. In some embodiments, the fabrication of the LCP film 230 (or 230a, 230b) may include filling an LC mixture 281 into an LC cell 280 with a predetermined cell gap, and applying a voltage (e.g., an AC voltage) to the LC cell 280 filled with the LC mixture 281, as shown in FIG. 2C. The fabrication of the LCP film 230 may also include polymerizing the LC mixture 281 in the LC cell 280 applied with the voltage to form the LCP film 230, as shown in FIG. 2D. The fabrication of the LCP film 230 may also include separating the LCP film 230 from the LC cell 280 (not shown). Referring to FIGS. 2C and 2D, the LC mixture 281 may include polymerizable (e.g., photo-polymerizable or thermal-polymerizable) monomers. For example, the LC mixture 281 may include nematic LCs, reactive mesogens ("RMs"), and photo-initiators. RMs may also be referred to as a polymerizable mesogenic or liquid-crystalline compound, or polymerizable LCs. For discussion purposes, the term "liquid crystal molecules" or "LC molecules" may encompass both polymerizable LC molecules (e.g., RM molecules) and non-polymerizable LC molecules. In some embodiments, the LC mixture 281 may also include a suitable amount of a conductive material, e.g., a conductive polymer (e.g., nonathiophene), carbon nanotubes, or silver nanowires, etc., for realizing a predetermined polymer matrix conductivity. Thus, the LC mixture 281 may be electrically conductive.

The LC cell 280 may be formed by two substrates 282 spaced apart from one another by the predetermined cell gap. An inner surface of each substrate 282 may be provided with an electrode (e.g., a planar continuous ITO electrode, not shown) and an alignment layer (not shown). The two alignment layers may be configured to provide predetermined alignments, such as parallel alignments (e.g., planar or homogeneous alignments with parallel alignment directions), anti-parallel alignments e.g., planar or homogeneous alignments with anti-parallel alignment directions), twisted nematic alignments (e.g., planar or homogeneous alignments with twisted alignment directions), orthogonal alignments (e.g., planar or homogeneous alignments with orthogonal alignment directions), vertical alignments, or hybrid alignments (e.g., a homogeneous alignment and a vertical alignment), etc. After the LC mixture 281 is filled into the LC cell 280, an LC mixture layer 283 may be formed in the space between the two substrates 282. At least LC molecules 284-1 located in close proximity to or at the surfaces of the LC mixture layer 283 may be aligned by the respective alignment layers. Thus, the alignments provided by the respective alignment layers may be transferred to the corresponding surfaces of the LC mixture layer 283.

Then the voltage (e.g., the AC voltage) may be applied to the electrodes of the LC cell 280, to generate a vertical electric field in the volume of the LC mixture layer 283. The direction of the vertical electric field may be along the thickness direction of the LC mixture layer 283. The magnitude of the voltage may be configured, such that LC molecules 284-2 in the bulk LC mixture layer 283 may be aligned by the vertical electric field, with the directors of the LC molecules 284-2 being substantially parallel to the direction of the vertical electric field. Then the LC mixture layer 283 in the LC cell 280 applied with the voltage may be polymerized to stabilize the orientations of the LC molecules 284-1 and 284-2 in the LC mixture layer 283. For example, the LC cell 280 applied with the voltage may be irradiated with, e.g., a UV light 285. Under a sufficient UV light irradiation, the RM monomers in the LC mixture layer 283 may be polymerized or crosslinked to stabilize the orientations of the LC molecules 284-1 and 284-2. In some embodiments, the polymerization of the LC mixture layer 283 under the UV light irradiation may be carried out in air, or in an inert atmosphere formed, for example, by nitrogen, argon, carbon-dioxide, or in vacuum. After the polymerization, the LC mixture layer 283 may become the LCP film 230. The LCP film 230 may be separated from the LC cell 280 via any suitable approach, e.g., the substrates 282 may be peeled off from the LCP film 230 via a thermal releasing process.

Figure 3A:
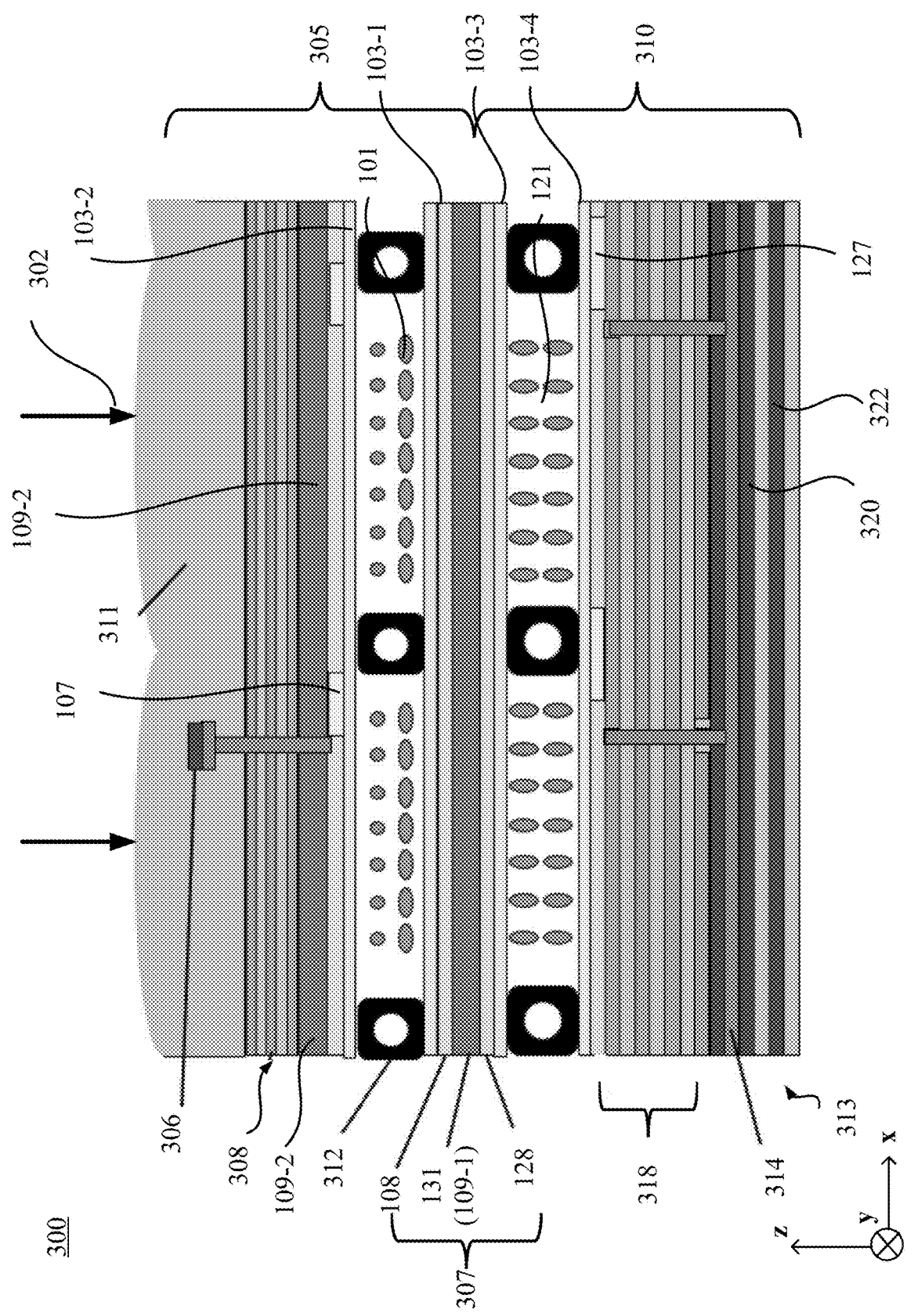
FIGS. 3A and 3B illustrate schematic diagrams of complex wavefront modulators, according to various embodiments of the present disclosure.

FIG. 3A illustrates an x-z sectional view of a complex wavefront modulator 300, according to an embodiment of the present disclosure. The complex wavefront modulator 300 shown in FIG. 3A may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, or the complex wavefront modulator 250 shown in FIG. 2B. Detailed descriptions of the same or similar elements, structures, and/or functions may refer to the above descriptions rendered in connection with FIG. 1A, FIG. 1B, FIG. 1C, FIG. 1D, FIG. 2A, or FIG. 2B.

As shown in FIG. 3A, the complex wavefront modulator 300 may include a first LC cell 305 and a second LC cell 310 arranged in a stack configuration. The complex wavefront modulator 300 may also include a sandwiched electrode layer 307 disposed between the first LC cell 305 and the second LC cell 310, and shared by the first LC cell 305 and the second LC cell 310. For discussion purposes, FIG. 3A shows that the first LC cell 305 includes a TFT-LCD panel, the second LC cell 310 includes an LCoS, and the complex wavefront modulator 300 function as a reflective device.

In some embodiments, the first LC cell 305 and the second LC cell 310 may be suitable LC cells that provide spatially varying modulations of respective DOFs of a light beam 302, such as the first LC cell 105 and the second LC cell 110 shown in FIGS. 1A-1D, respectively, or the first LC cell 205 and the second LC cell 220 shown in FIGS. 2A and 2B, respectively. The sandwiched electrode layer 307 may be an embodiment of the sandwiched electrode layer disclosed herein, such as the sandwiched electrode layer 130 shown in FIGS. 1A-1C, the sandwiched electrode layer 130*a* or 130*b* shown in FIG. 1D, the LCP film 230 shown in FIG. 2A (which functions as both an alignment layer and a shared common electrode layer), or the LCP film 230*a* or 230*b* shown in FIG. 2B (each of which functions as both an alignment layer and shared common electrode layer).

The sandwiched electrode layer 307 may provide various functions to the first LC cell 205 and the second LC cell 220. For example, the sandwiched electrode layer 307 may function as the shared, common electrode layer for driving the first LC cell 205 and the second LC cell 210. The sandwiched electrode layer 307 may also provide protection to both of the first LC cell 205 and the second LC cell 220. In some embodiments, the sandwiched electrode layer 307 may also function as the alignment layer for both of the first LC cell 205 and the second LC cell 220. For example, a surface of the sandwiched electrode layer 307 facing the first LC cell 205 may have an alignment material for aligning the LC molecules in the first LC cell 205, and a surface of the sandwiched electrode layer 307 facing the second LC cell 220 may include an alignment material for aligning the LC molecules in the second LC cell 220. In some embodiments, the sandwiched electrode layer 307 may also function as a polarizer. For example, the sandwiched electrode layer 307 may include a polarizer film. For discussion purposes, FIG. 3A shows that the sandwiched electrode layer 307 includes the first common electrode layer 108 (as part of the first LC cell 305), the second common electrode layer 128 (as part of the second LC cell 310), and the protection layer 131 disposed between the first common electrode layer 108 and the second common electrode layer 128. In some embodiments, the sandwiched electrode layer 307 may also include the polarizer 109-1 that may be a metal wire grid polarizer disposed at the protection layer 131. In some embodiments, the protection layer 131 may be omitted.

In some embodiments, the first common electrode layer 108 and the second common electrode layer 128 may be electrically connected. For example, the protection layer 131 may be electrically conductive and may connect the first common electrode layer 108 and the second common electrode layer 128. In these embodiments, the first common electrode layer 108 and the second common electrode layer 128 becomes two different portions of a same common electrode layer shared by the first LC cell 205 and the second LC cell 220. In some embodiments, the protection layer 131 may be an electrically insulation layer, and may electrically insulate the first common electrode layer 108 and the second common electrode layer 128 may. The first common electrode layer 108 may supply a voltage to the first LC cell 205, and the second common electrode layer 128 may supply a voltage to the second LC cell 220.

For discussion purposes, in the embodiment shown in FIG. 3A, the first LC cell 305 may also include a first substrate 311 that includes a microlens array, a TFT electric circuitry 306, an antireflective coating (or anti-reflection layer) 308, the polarizer 109-2, the first pixel electrode layer 107, the alignment layers 103-1 and 103-2, and the first LC layer 101 that includes an LC material and spacers 312. The second LC cell 310 may also include a second substate 313, which may be a silicon backplane that includes an LCoS electric circuitry 314, a highly-reflective coating (or high-reflection layer) 318, the second pixel electrode layer 127, the alignment layers 103-3 and 103-4, and the second LC layer 121 that includes an LC material and the spacers 312. In some embodiments, the second substate 313 may also include additional electric circuitry layers 320 and 322.

Figure 3B:
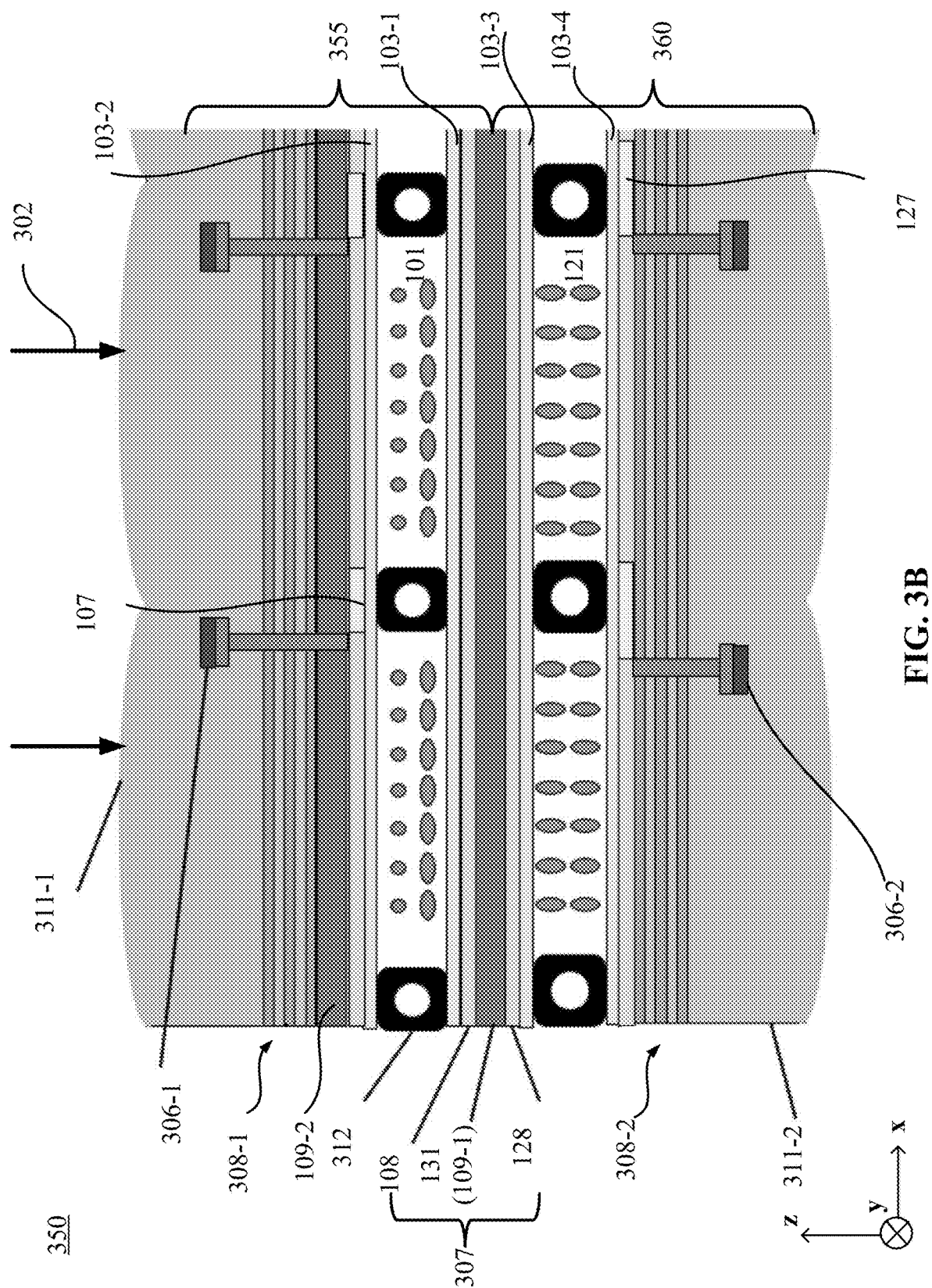

FIG. 3B illustrates an x-z sectional view of a complex wavefront modulator 350, according to an embodiment of the present disclosure. The complex wavefront modulator 350 shown in FIG. 3B may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, or the complex wavefront modulator 300 shown in FIG. 3A. Detailed descriptions of the same or similar elements, structures, and/or functions may refer to the above descriptions rendered in connection with FIG. 1A, FIG. 1B, FIG. 1C, FIG. 1D, FIG. 2A, FIG. 2B, or FIG. 3A.

As shown in FIG. 3B, the complex wavefront modulator 350 may include a first LC cell 355, the sandwiched electrode layer 307, and a second LC cell 360 arranged in a stack configuration, with the sandwiched electrode layer 307 disposed (i.e., sandwiched) between the first LC cell 355 and the second LC cell 360. The sandwiched electrode layer 307 may be shared by the first LC cell 355 and the second LC cell 360 for the purpose of driving the first LC cell 355 and the second LC cell 360. For discussion purposes, FIG. 3B shows that the first LC cell 355 includes a TFT-LCD panel, the second LC cell 360 includes a TFT-LCD panel, and the complex wavefront modulator 350 function as a transmissive device. In some embodiments, the complex wavefront modulator 350 may function as a transflective device.

In some embodiments, the first LC cell 355 and the second LC cell 360 may be suitable LC cells that provide spatially varying modulations of respective DOFs of the light beam 302, such as the first LC cell 105 and the second LC cell 110 shown in FIGS. 1A-1D, respectively, or the first LC cell 205 and the second LC cell 220 shown in FIGS. 2A and 2B, respectively. The sandwiched electrode layer 307 may be an embodiment of the sandwiched electrode layer disclosed herein, such as the sandwiched electrode layer 130 shown in FIGS. 1A-1C, the sandwiched electrode layer 130a or 130b shown in FIG. 1D, the LCP film 230 shown in FIG. 2A (which functions as both an alignment layer and a shared common electrode layer), or the LCP film 230a or 230b shown in FIG. 2B (each of which functions as both an alignment layer and shared common electrode layer). For discussion purposes, FIG. 3B shows that the sandwiched electrode layer 307 includes the first common electrode layer 108 (as part of the first LC cell 355), the second common electrode layer 128 (as part of the second LC cell 360), and the protection layer 131 disposed between the first common electrode layer 108 and the second common electrode layer 128. In some embodiments, the sandwiched electrode layer 307 may also include the polarizer 109-1 that may be a metal wire grid polarizer disposed at the protection layer 131. In some embodiments, the protection layer 131 may be omitted.

In some embodiments, the first LC cell 355 may also include a first substrate 311-1 that includes a microlens array, a first TFT electric circuitry 306-1, a first antireflective coating (or anti-reflection layer) 308-1, the polarizer 109-2, the first pixel electrode layer 107, the alignment layers 103-1 and 103-2, and the first LC layer 101. The second LC cell 360 may also include a second substrate 311-2 that includes a microlens array, a second TFT electric circuitry 306-2, a second antireflective coating (or anti-reflection layer) 308-1, the second pixel electrode layer 127, the alignment layers 103-3 and 103-4, and the second LC layer 121.

In the following, various methods and fabrication processes of a complex wavefront modulator disclosed herein will be explained. In some embodiments, both the electric and the photonics components of a complex wavefront modulator disclosed herein may be fabricated using a suitable micro-fabrication processes that is scalable at the wafer level. The micro-fabrication processes may include depositing, coating, drying, patterning, etching, and/or polishing, etc. For discussion purposes, complex wavefront modulators that include two TFT LCD panels are used as examples to explain the methods and fabrication processes. Complex wavefront modulators having other configurations may be fabricated in a similar manner.

FIGS. 4A-4F schematically illustrate fabrication processes of a complex wavefront modulator 400, according to an embodiment of the present disclosure. The fabricated complex wavefront modulator 400 may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, or the complex wavefront modulator 350 shown in FIG. 3B. Detailed descriptions of the same or similar elements, structures, and/or functions may refer to the above descriptions rendered in connection with FIG. 1A, FIG. 1B, FIG. 1C, FIG. 1D, FIG. 2A, FIG. 2B, FIG. 3A, or FIG. 3B.

Figure 4A:
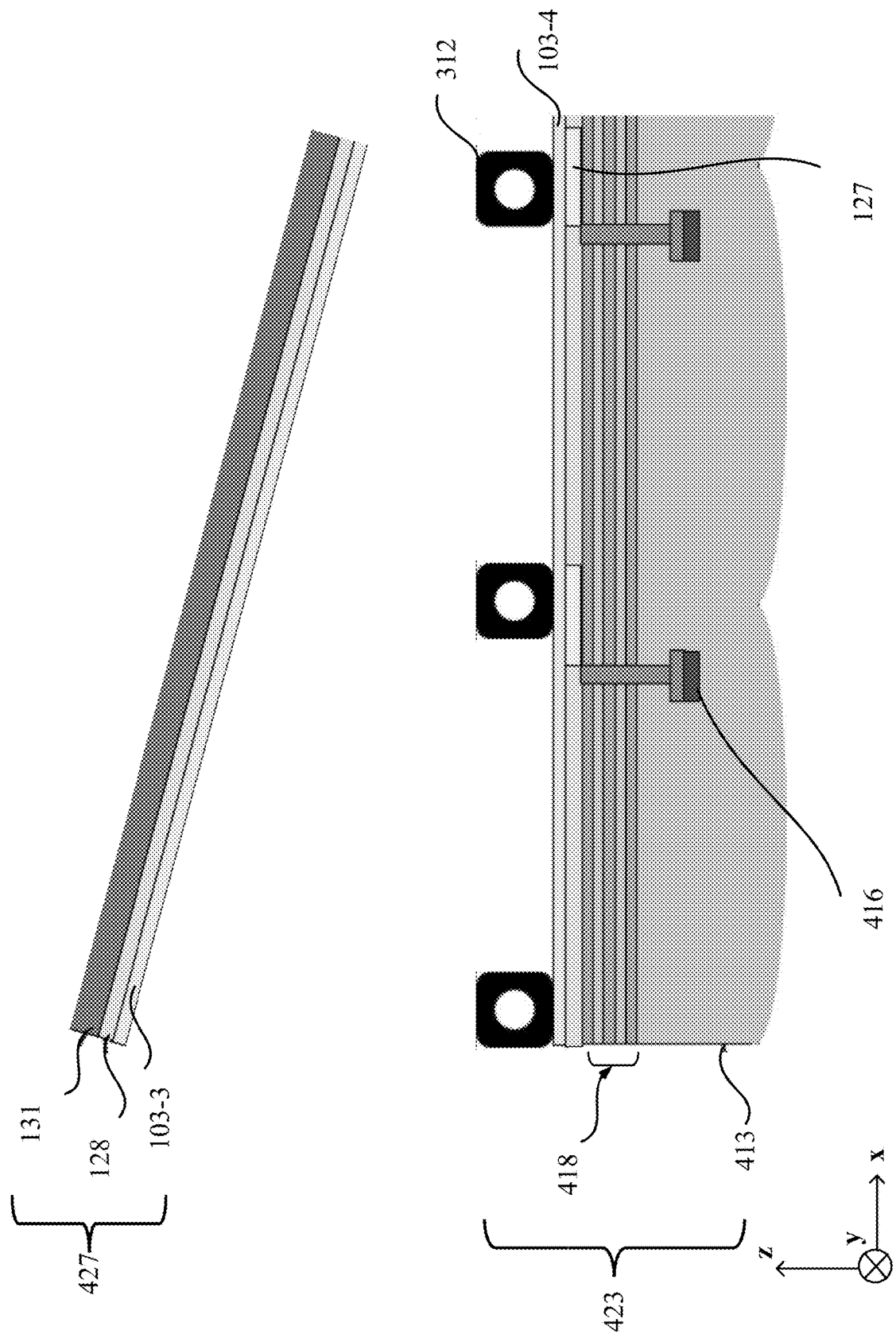
FIGS. 4A-4F schematically illustrate fabrication processes of a complex wavefront modulator, according to an embodiment of the present disclosure.

As shown in FIG. 4A, a backplane 423 may be fabricated via suitable fabrication techniques. In some embodiments, the backplane 423 may be a silicon backplane that includes electric circuitry for driving an LCoS. In some embodiments, the backplane 423 may be a TFT backplane that includes electric circuitry for driving a TFT LCD panel. The backplane 423 may include a substrate 413, a pixel driving circuitry 416, the pixel electrode layer 127, and the alignment layer 103-4. The substrate 413 may be a wafer, a glass, a plastic, a sapphire, a polymer, or a combination thereof, etc. In some embodiments, the substrate 413 may include silicon, a silicon substrate coated with a metal surface, a silicon wafer coated with copper, copper, aluminum, a polymeric resin, silicon dioxide, a metal, doped silicon dioxide, silicon nitride, silicon carbide, tantalum, polysilicon, ceramics, an aluminum-copper mixture, glass, coated glass, gallium arsenide, other Group III/V compounds, etc. In some embodiments, the substrate 413 may be rigid, semi-rigid, flexible, or semi-flexible. In some embodiments, the substrate 413 may include a flat surface or a curved surface, on which the various layers, films, and/or structures may be formed. In some embodiments, the substrate 413 may be a part of another element or device (e.g., another opto-electrical element or device, another electrical element or device). For example, the substrate 413 may be a solid optical lens or lens array, a part of a solid optical lens, or a light guide, etc. The pixel driving circuitry 416 may include a TFT electric circuitry or an LCoS electric circuitry. In some embodiments, the backplane 423 may also include an antireflective coating, a highly-reflective coating, or a partially reflective partially transmissive coating 418. In some embodiments, the backplane 423 may also include the spacers 312 disposed at the alignment layer 103-4.

In addition, a first assembly 427 may be fabricated. In some embodiments, the first assembly 427 may include the alignment layer 103-3, the common electrode layer 128, and the protection layer 131. For example, the common electrode layer 128 may be disposed at a surface of the protection layer 131, and the alignment layer 103-3 may be disposed at a surface of the common electrode layer 128. In some embodiments, the first assembly 427 may also include the polarizer 109-1 (e.g., metal wire grid polarizer) (not shown) disposed between the common electrode layer 128 and the protection layer 131.

Figure 4B:
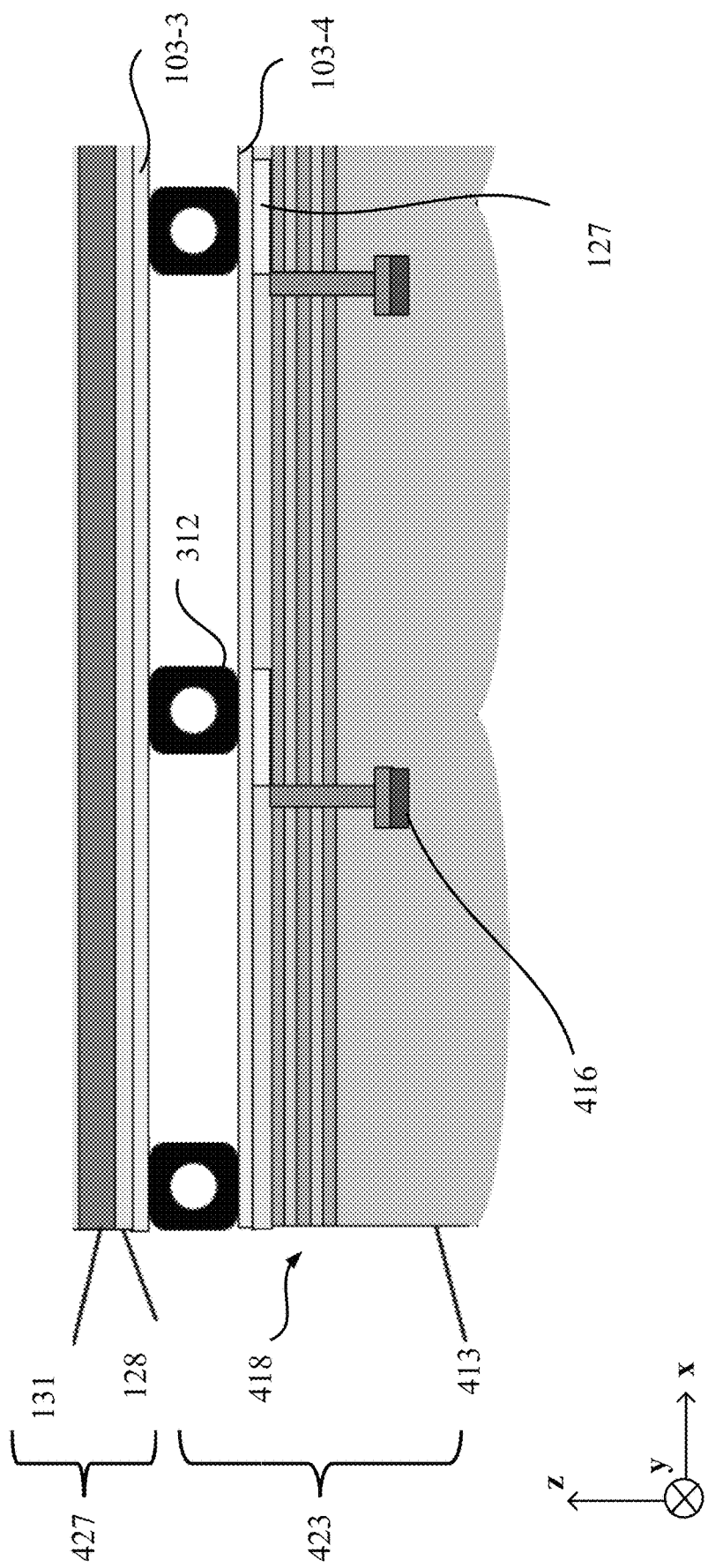

In some embodiments, the first assembly 427 and the backplane 423 may be fabricated as individual components. Although not shown in FIG. 4A, when fabricating the first assembly 427, the common electrode layer 128 may be formed (e.g., deposited, coated, etc.) on a surface of the protection layer 131, and the alignment layer 103-3 may be formed (e.g., deposited, coated, etc.) on a surface of the common electrode layer 128. Then the first assembly 427 may be flipped to the position shown in FIG. 4A with the alignment layer 103-3 at the bottom and the protection layer 131 at the top. After the first assembly 427 and the backplane 423 are separately fabricated, as shown in FIG. 4B, the first assembly 427 may be disposed onto (e.g., laminated onto) the backplane 423 via a suitable method. The alignment layer 103-3 may be placed on top of the spacers 312 included in the backplane 423. In some embodiments, after the first assembly 427 is attached or bonded to the backplane 423, the first assembly 427 and the backplane 423 may be subjected to a curing process (e.g., via UV light) to enhance the linkage between the alignment layer 103-3 and the spacers 312.

Figure 4C:
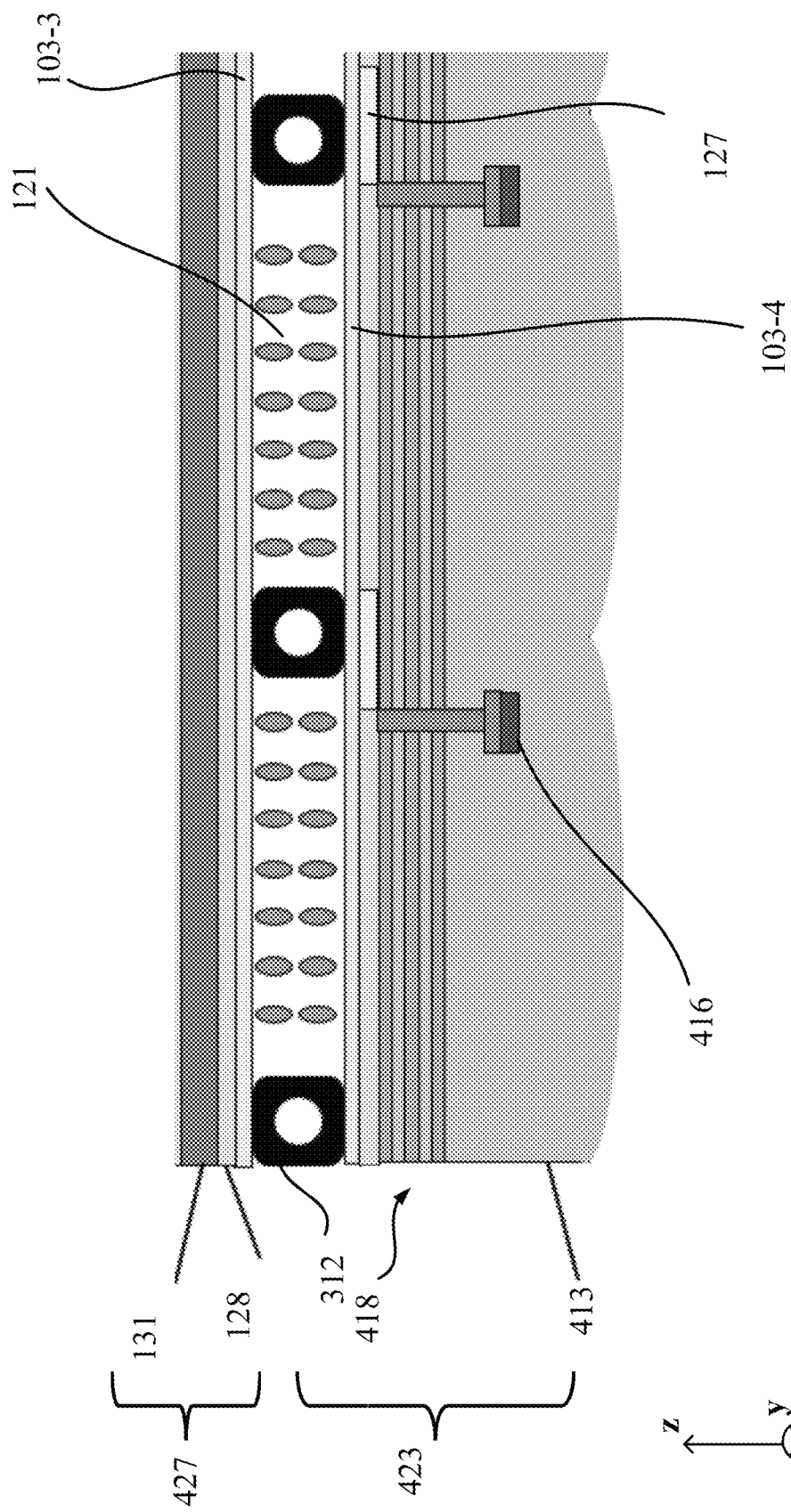

After the first assembly 427 is attached or bonded to the backplane 423, as shown in FIG. 4B, a first space may be formed between the first assembly 427 and the backplane 423. The thickness of the space may be controlled by the spacers 312. As shown in FIG. 4C, a first LC material may be filled (e.g., infused, injected) into the first space formed between the first assembly 427 and the backplane 423 via a suitable method. The LC material may form the LC layer 121 between the first assembly 427 and the backplane 423.

Figure 4D:
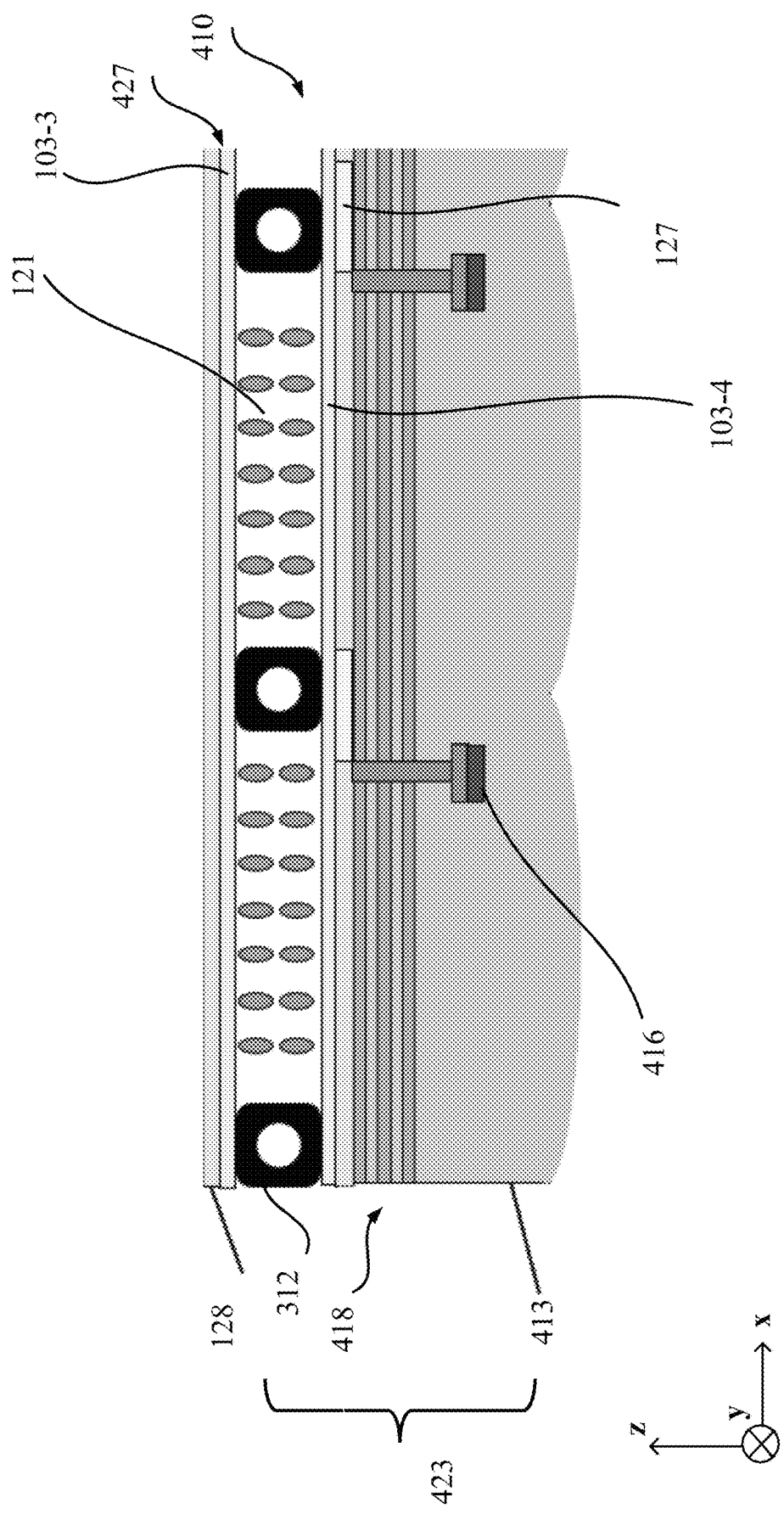

In some embodiments, after the first LC material is filled into the first space formed between the first assembly 427 and the backplane 423, as shown in FIG. 4D, the protection layer 131 may be removed from the first assembly 427 via a suitable method. An LC cell or panel (a first LC cell or panel) 410 configured to provide a spatially varying modulation of a first DOF of a light beam may be obtained.

Figure 4E:
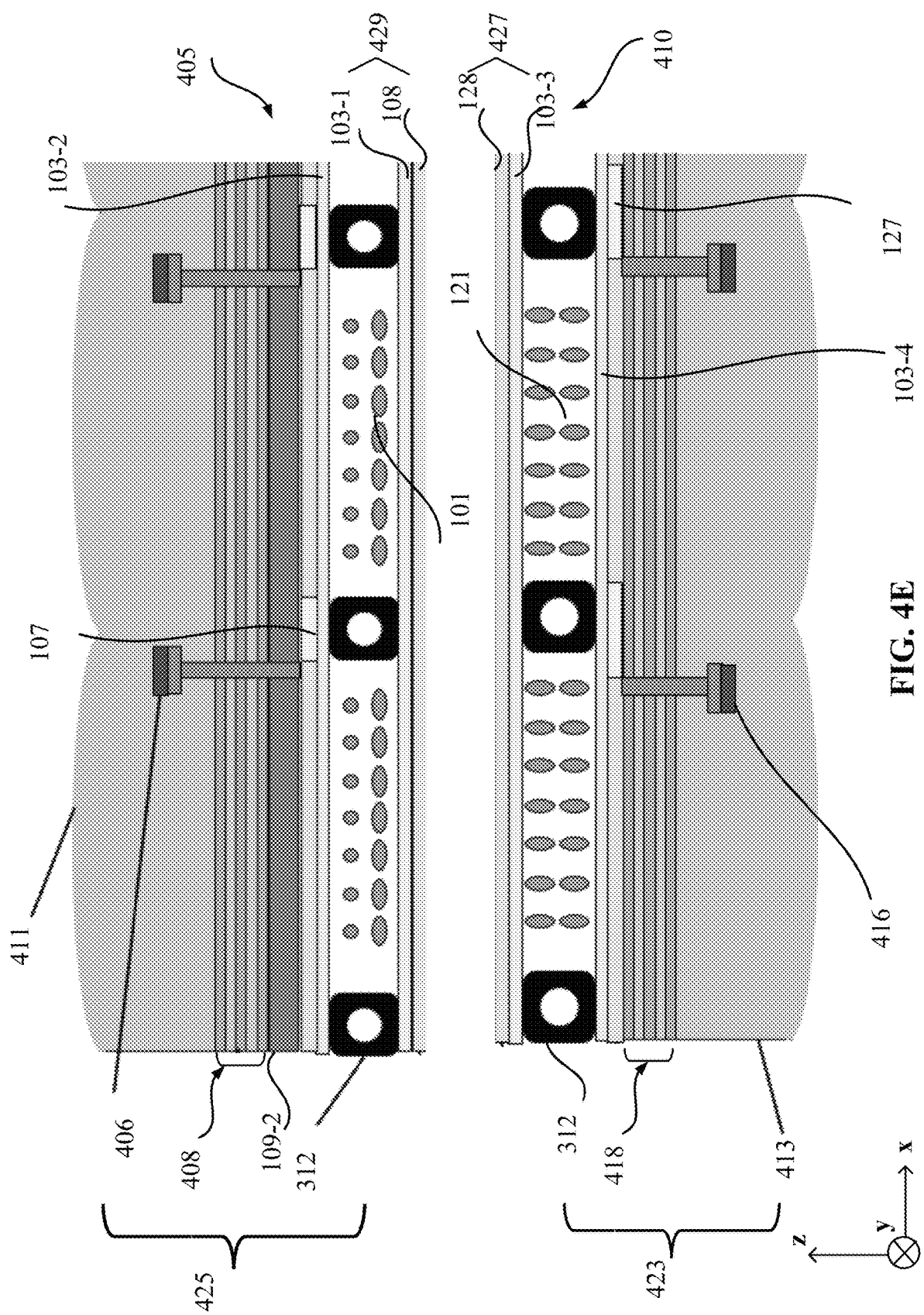
Figure 4F:
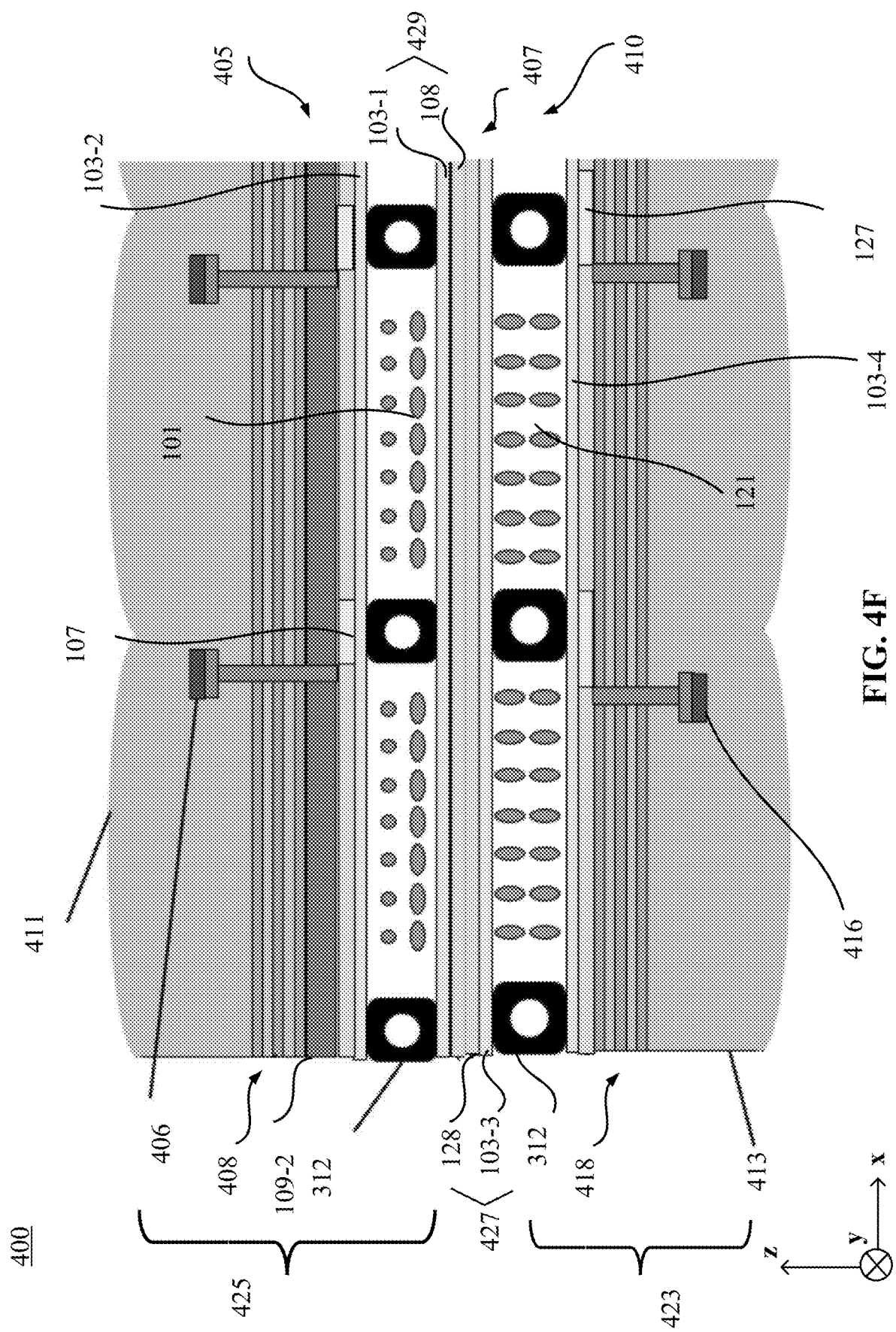

In some embodiments, as shown in FIGS. 4E and 4F, an LC cell or panel (a second LC cell or panel) 405 configured to provide a spatially varying modulation of a second DOF of a light beam may be fabricated. The LC cell 405 may be disposed over the fabricated LC cell 410, or the LC cell 410 may be disposed over the LC cell 405. For example, the LC cell 405 may be aligned with the LC cell 410, and bonded to the LC cell 410 to form the complex wavefront modulator 400. The LC cell 405 may be fabricated via the fabrication processes that are similar to the fabrication processes for fabricating the LC cell 410, as shown in FIGS. 4A-4D. For example, the fabrication processes of the LC cell 405 may include fabricating a backplane 425, fabricating a second assembly 429, and filling a second LC material into a second space formed between the second assembly 429 and the backplane 425. In some embodiments, the backplane 425 may be a silicon backplane that includes electric circuitry for driving an LCoS. In some embodiments, the backplane 425 may be a TFT backplane that includes electric circuitry for driving a TFT LCD panel. The second assembly 429 may initially be fabricated by forming the alignment layer 103-1 on a protection layer 131, and forming the common electrode layer 108 on the alignment layer 103-1, similar to the processes shown in FIG. 4A. The second assembly 429 may be flipped over with the alignment layer 103-1 facing the backplane 425, and may be disposed onto the backplane 425. For example, the alignment layer 103-1 may be bonded to the spacers 312 included in the backplane 425. Alternatively, the backplane 425 may be disposed onto the second assembly 429. A curing process may be performed to enhance the bonding and link between the spacers 312 and the alignment layer 103-1. Then the second LC material may be filled into the second space formed between the alignment layer 103-1 and the backplane 425 (or between the second assembly 429 and the backplane 425). The protection layer 131 may be removed afterwards. Then the LC cell (the second LC cell) 405 is obtained.

The LC cell 405 may then be disposed over the LC cell 410, or the LC cell 410 may be disposed over the LC cell 405. The common electrode layer 108 and the common electrode layer 128 may face and directly contact one another. The common electrode layer 108 and the common electrode layer 128 together form a sandwiched electrode layer 407. Although not shown in FIG. 4F, the sandwiched electrode layer 407 may include the polarizer 109-1, which may be located between the common electrode layer 108 and the alignment layer 103-1, or between the common electrode layer 128 and the alignment layer 103-3. For example, in some embodiments, when fabricating the first assembly 427 in the processes shown in FIG. 4A, the polarizer 109-1 may be formed between the protection layer 131 and the common electrode layer 128, or between the common electrode layer 128 and the alignment layer 103-3. In some embodiments, when fabricating the second assembly 429 in the processes shown in FIG. 4A, the polarizer 109-1 may be formed between the protection layer 131 and the common electrode layer 108, or between the common electrode layer 108 and the alignment layer 103-1.

The backplane 425 may include a substrate 411, a pixel driving circuitry 406, the pixel electrode layer 107, and the alignment layer 103-2. The substrate 411 may be similar to the substrate 413. The pixel driving circuitry 406 may include a TFT electric circuitry or an LCoS electric circuitry. In some embodiments, the backplane 425 may also include the polarizer 109-2 disposed between the substrate 411 and the pixel electrode layer 107. In some embodiments, the backplane 425 may also include an optical coating 408, which may be an anti-reflective coating, a highly-reflective coating, or a partially reflective and partially transmissive coating. In some embodiments, the polarizer 109-2 may be disposed between the coating 408 and the pixel electrode layer 107. In some embodiments, the spacers 312 of the backplane 425 may be bonded with the alignment layer 103-2.

Figure 5A:
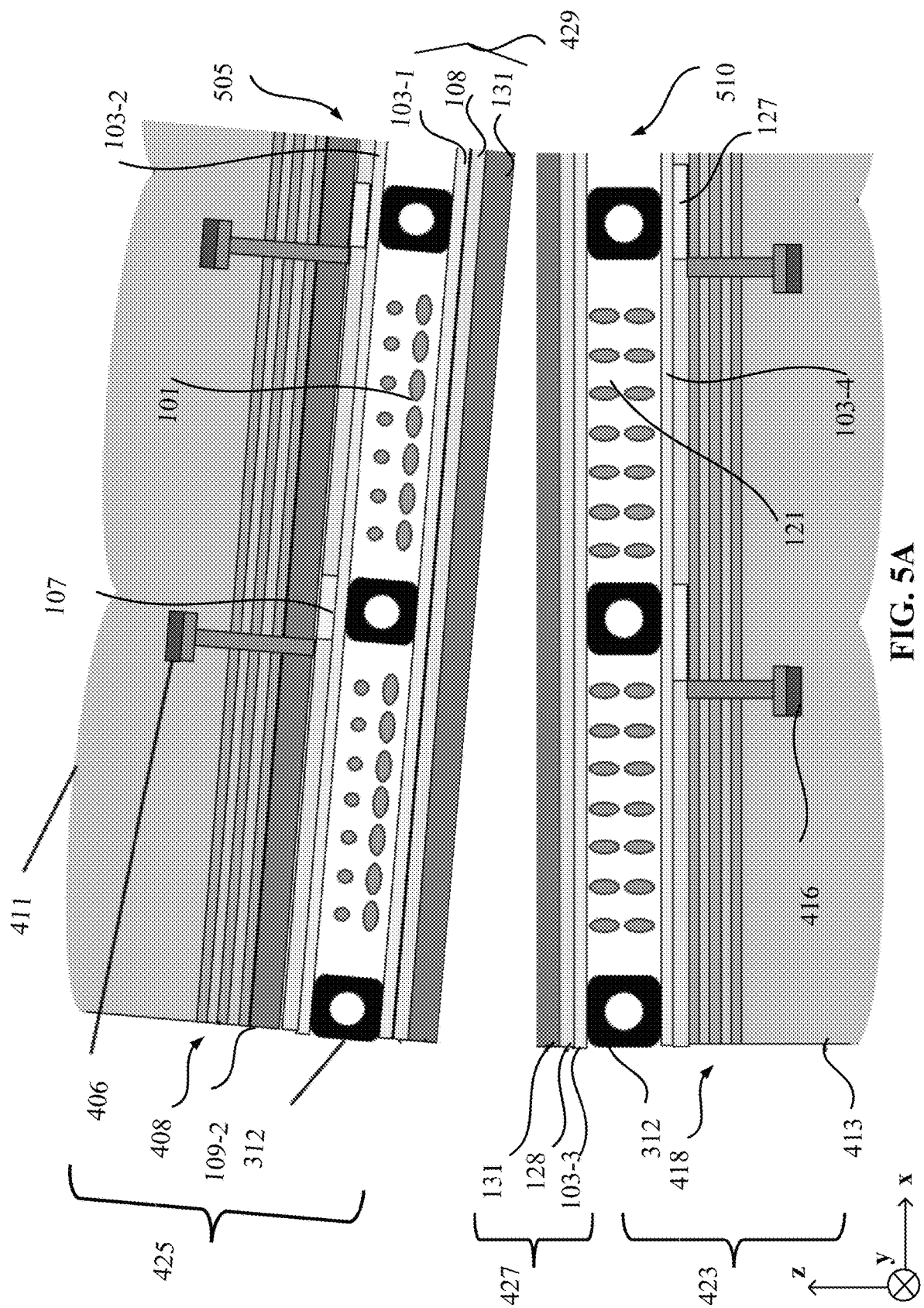
FIGS. 5A and 5B schematically illustrate fabrication processes of a complex wavefront modulator, according to an embodiment of the present disclosure.
Figure 5B:
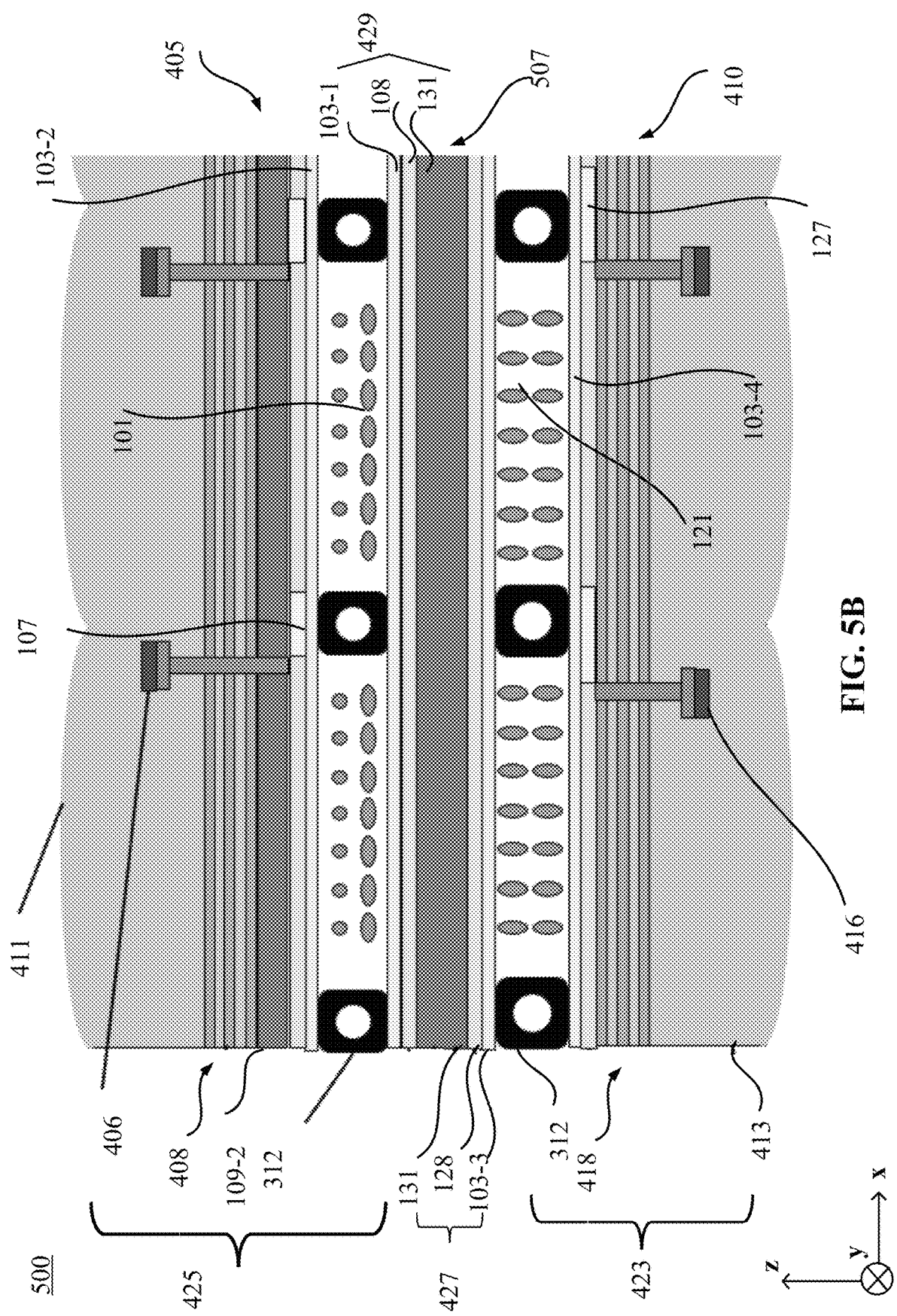

In some embodiments, the protection layer 131 may not be removed during the fabrication process, and may be included in the final product, i.e., the complex wavefront modulator. FIGS. 5A and 5B schematically illustrate fabrication processes of a complex wavefront modulator 500, according to an embodiment of the present disclosure. The fabrication processes shown in FIGS. 5A and 5B may include steps and processes that are the same as or similar to those included in the fabrication processes shown in FIGS. 4A-4F. Detailed descriptions of the same or similar steps and processes may refer to the above descriptions rendered in connection with FIGS. 4A-4F. The fabricated complex wavefront modulator 500 may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, or the complex wavefront modulator 400 shown in FIG. 4F. Detailed descriptions of the same or similar elements, structures, and/or functions may refer to the above descriptions rendered in connection with FIG. 1A, FIG. 1B, FIG. 1C, FIG. 1D, FIG. 2A, FIG. 2B, FIG. 3A, FIG. 3B, or FIGS. 4A-4F.

As shown in FIG. 5A, an LC cell 505 and an LC cell 510 may be fabricated via the processes that are the same as or similar to those included in the fabrication processes shown in FIGS. 4A-4C. The protection layers 131 included in the first assembly 427 and the second assembly 429 may be included in the final complex wavefront modulator. FIG. 5A shows that both of the protection layers 131 are included. In some embodiments, one of the protection layers 131 may be removed and the other one may be kept. As shown in FIG. 5B, after the LC cell 505 and the LC cell 510 are fabricated, the LC cell 505 may be aligned with the LC cell 510, and bonded to the LC cell 510 to form the complex wavefront modulator 500. In the fabricated complex wavefront modulator 500, the common electrode layer 108 and the protection layer 131 of the first assembly 427 of the LC cell 510, and common electrode layer 128 and the protection layer 131 of the second assembly 429 of the LC cell 505 together may form a sandwiched electrode layer 507 for the purpose of driving both of the LC cell 505 and the LC cell 510. In some embodiments, the sandwiched electrode layer 507 may also include the polarizer 109-1 (not shown). For example, when fabricating the first assembly 427 and/or the second assembly 429, the polarizer 109-1 may be formed between the alignment layer 103-1 and the common electrode layer 108, between the common electrode layer 108 and the protection layer 131 (in the first assembly 427), between the common electrode layer 128 and the alignment layer 103-3, or between the common electrode layer 128 and the protection layer 131 (in the second assembly 429).

Figure 6A:
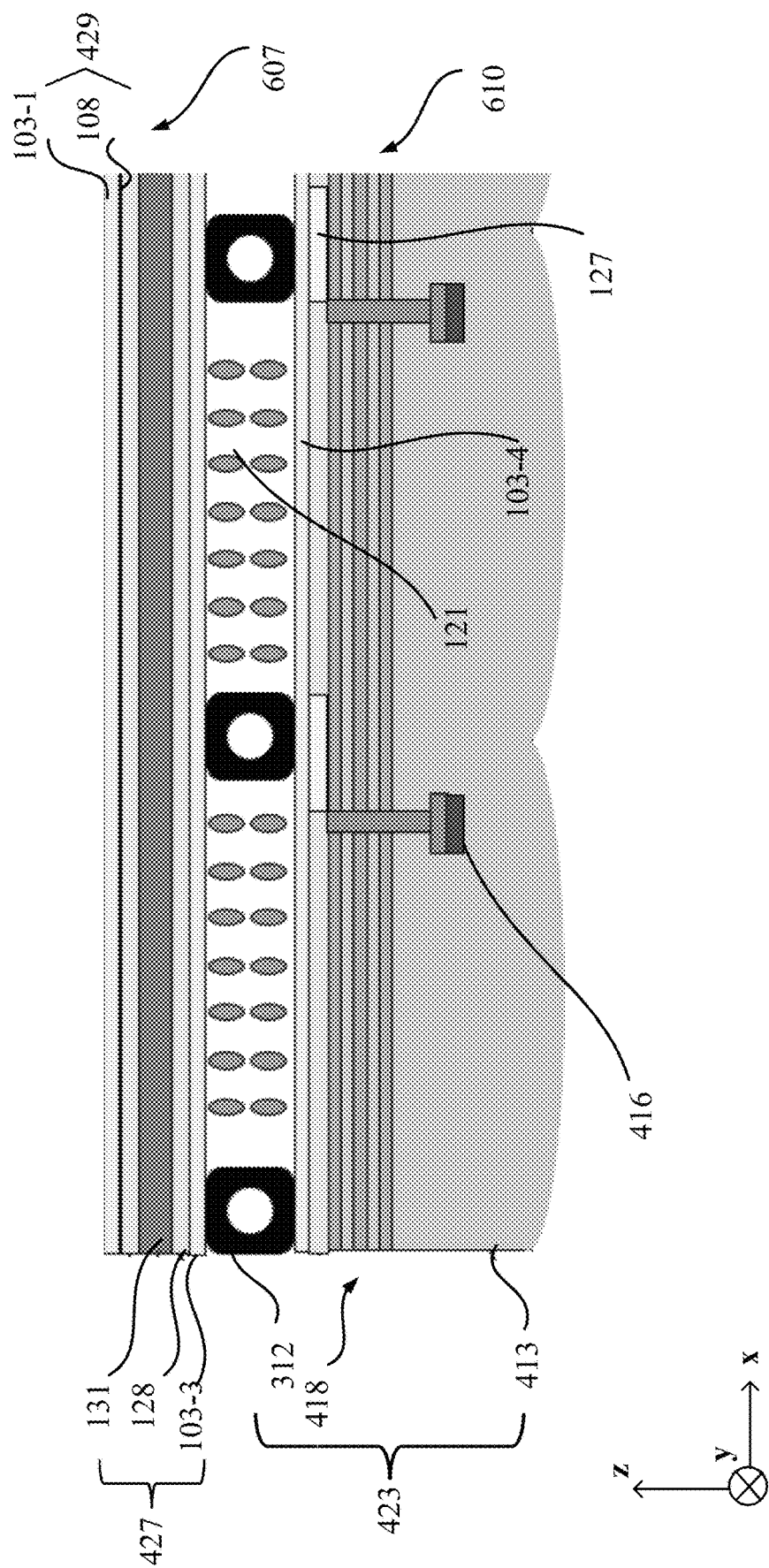
FIGS. 6A-6C schematically illustrate fabrication processes of a complex wavefront modulator, according to an embodiment of the present disclosure.
Figure 6B:
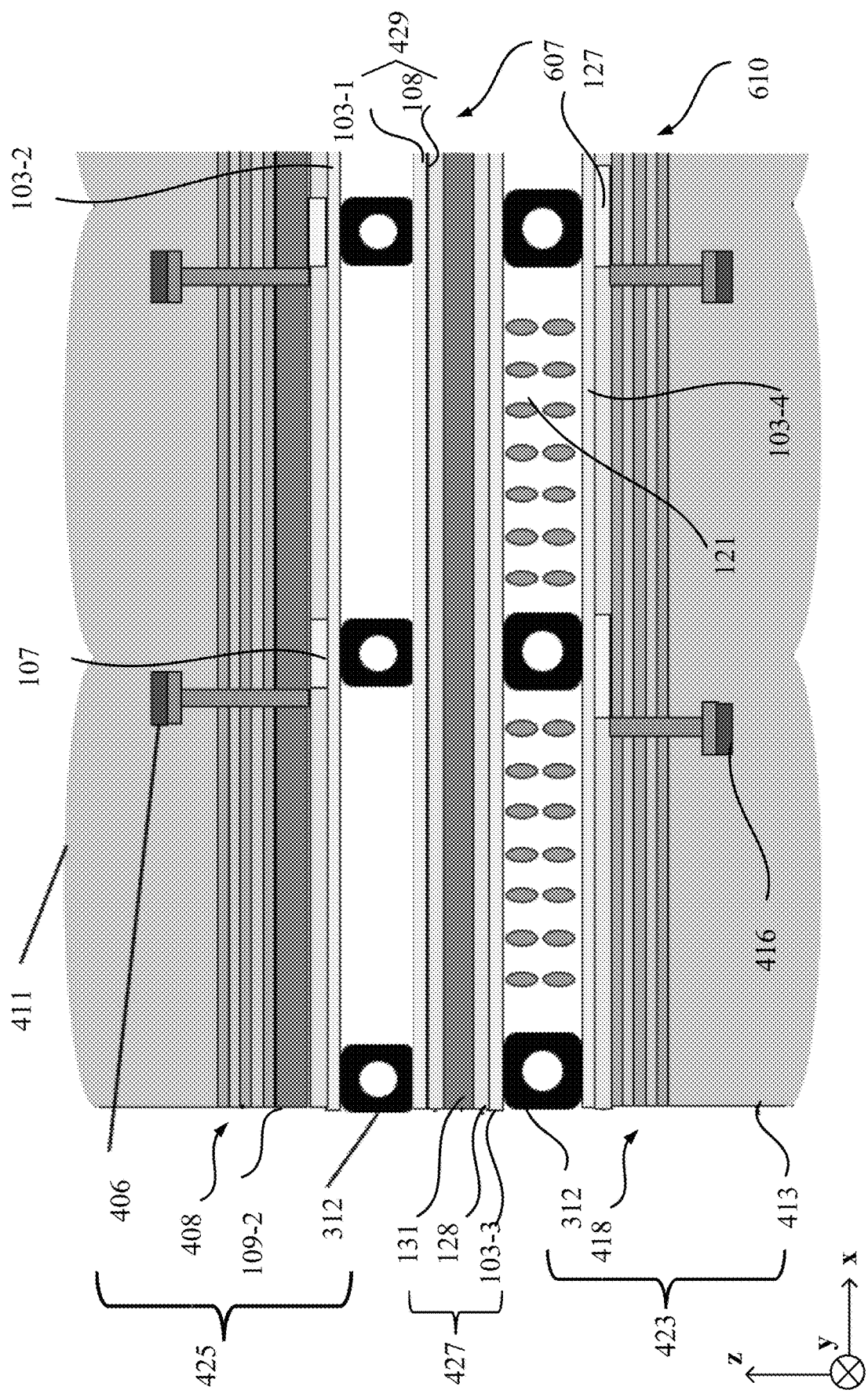
Figure 6C:
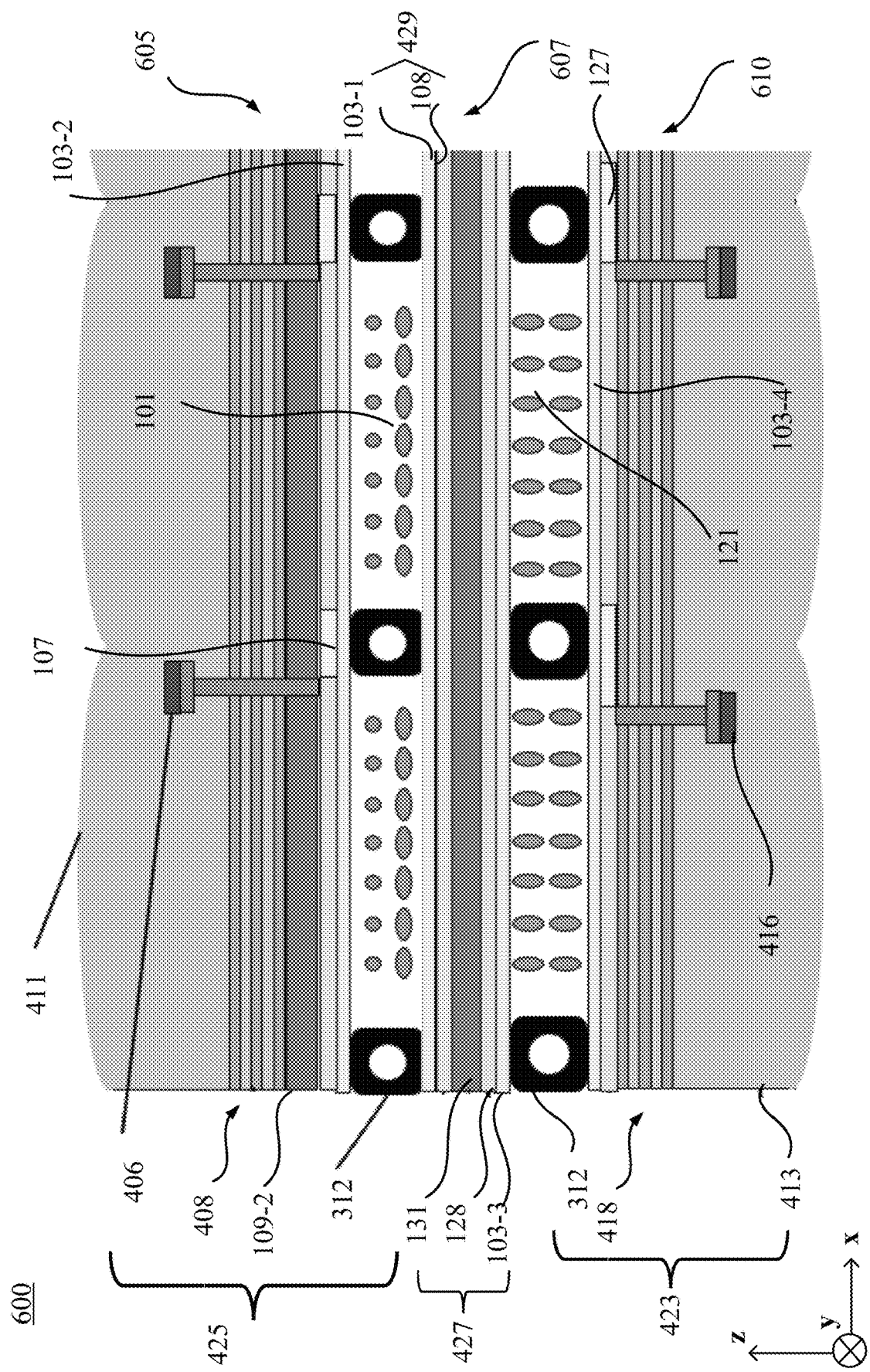

FIGS. 6A-6C schematically illustrate fabrication processes of a complex wavefront modulator 600, according to an embodiment of the present disclosure. The fabrication processes shown in FIGS. 6A-6C may include steps and processes that are the same as or similar to those included in the fabrication processes shown in FIGS. 4A-4F or FIGS. 5A and 5B. Detailed descriptions of the same or similar steps and processes may refer to the above descriptions rendered in connection with FIGS. 4A-4F or FIGS. 5A and 5B. The fabricated complex wavefront modulator 600 may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, the complex wavefront modulator 400 shown in FIG. 4F, or the complex wavefront modulator 500 shown in FIG. 5B. Detailed descriptions of the same or similar elements, structures, and/or functions may refer to the above descriptions rendered in connection with FIG. 1A, FIG. 1B, FIG. 1C, FIG. 1D, FIG. 2A, FIG. 2B, FIG. 3A, FIG. 3B, FIGS. 4A-4F, or FIGS. 5A and 5B.

As shown in FIG. 6A, an LC cell 610 may be fabricated via the processes that are the same as or similar to those included in the fabrication processes shown in FIGS. 4A-4C. The protection layer 131 included in the first assembly 427 of the LC cell 610 may be included in the final product of the complex wavefront modulator 600. After the LC cell 610 is fabricated, the common electrode layer 108 may be directly formed (e.g., deposited) on the protection layer 131 included in the second assembly 429 of the LC cell 610. Then the alignment layer 103-1 may be directly formed (e.g., deposited) on the common electrode layer 108. In other words, the second assembly 429 that includes the common electrode layer 108 and the alignment layer 103-1 may be directly formed (e.g., deposited) on the protection layer 131 included in the first assembly 427 of the LC cell 610 via a layer-by-layer, bottom-up approach. In some embodiments, after the LC cell 610 is fabricated, the protection layer 131 may be removed. The common electrode layer 108 and the alignment layer 103-1 may be directly formed (e.g., deposited) on the common electrode layer 128. The common electrode layer 128, the protection layer 131 (if not removed), and the common electrode layer 108 may form a sandwiched electrode layer 607. In some embodiments, the sandwiched electrode layer 607 may also include the polarizer 109-1. For example, when fabricating the first assembly 427 or the second assembly 429, the polarizer 109-1 may be formed within the first assembly 427 or the second assembly 429.

After the second assembly 429 is formed, as shown in FIG. 6B, the backplane 425 may be aligned with the LC cell 610, and bonded to the LC cell 610. A space may be formed between the second assembly 429 and the backplane 425. As shown in FIG. 6C, an LC material may be filled into the space formed between the second assembly 429 and the backplane 425 to form the LC layer 101, and an LC cell 605 may be obtained. FIG. 6C shows that the protection layer 131 is included in the final product (the fabricated complex wavefront modulator). In some embodiments, the protection layer 131 may be removed after the LC cell 610 is formed, and may not be included in the final product. The LC cell 605 and the LC cell 610 may be configured to provide spatially varying modulations of respective DOFs of a light beam, and the complex wavefront modulator 600 may be obtained.

FIGS. 7A-7E schematically illustrate fabrication processes of a complex wavefront modulator 700, according to an embodiment of the present disclosure. The fabrication processes shown in FIGS. 7A-7E may include steps and processes that are the same as or similar to those included in the fabrication processes shown in FIGS. 4A-4F, FIGS. 5A and 5B, or FIGS. 6A-6C. Detailed descriptions of the same or similar steps and processes may refer to the above descriptions rendered in connection with FIGS. 4A-4F, FIGS. 5A and 5B, or FIGS. 6A-6C. The fabricated complex wavefront modulator 700 may include elements, structures, and/or functions that are the same as or similar to those included in the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, the complex wavefront modulator 400 shown in FIG. 4F, the complex wavefront modulator 500 shown in FIG. 5B, or the complex wavefront modulator 600 shown in FIG. 6C. Detailed descriptions of the same or similar elements, structures, and/or functions may refer to the above descriptions rendered in connection with FIG. 1A, FIG. 1B, FIG. 1C, FIG. 1D, FIG. 2A, FIG. 2B, FIG. 3A, FIG. 3B, FIGS. 4A-4F, FIGS. 5A and 5B, or FIGS. 6A-6C.

Figure 7A:
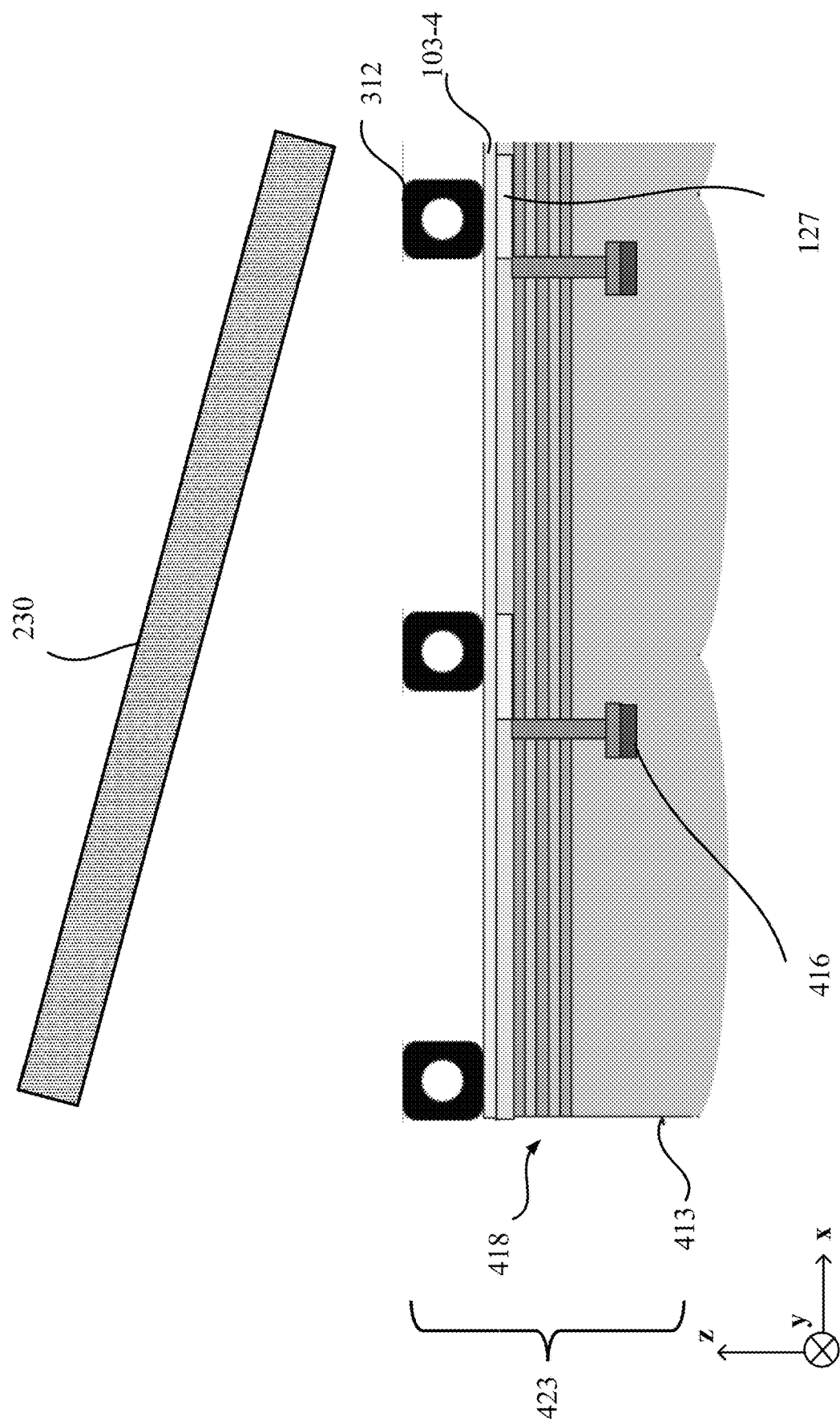
FIGS. 7A-7E schematically illustrate fabrication processes of a complex wavefront modulator, according to an embodiment of the present disclosure.
Figure 7B:
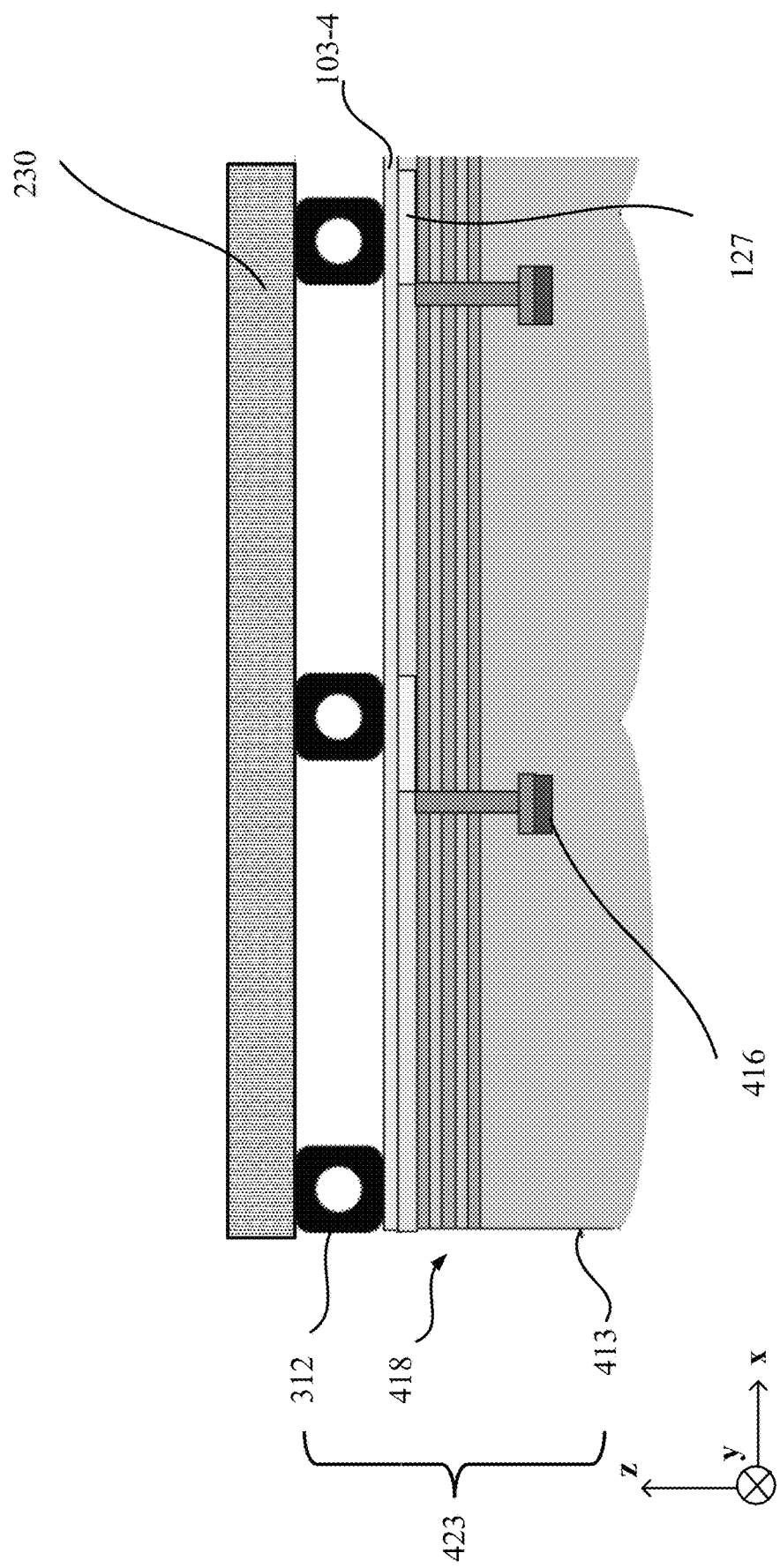
Figure 7C:
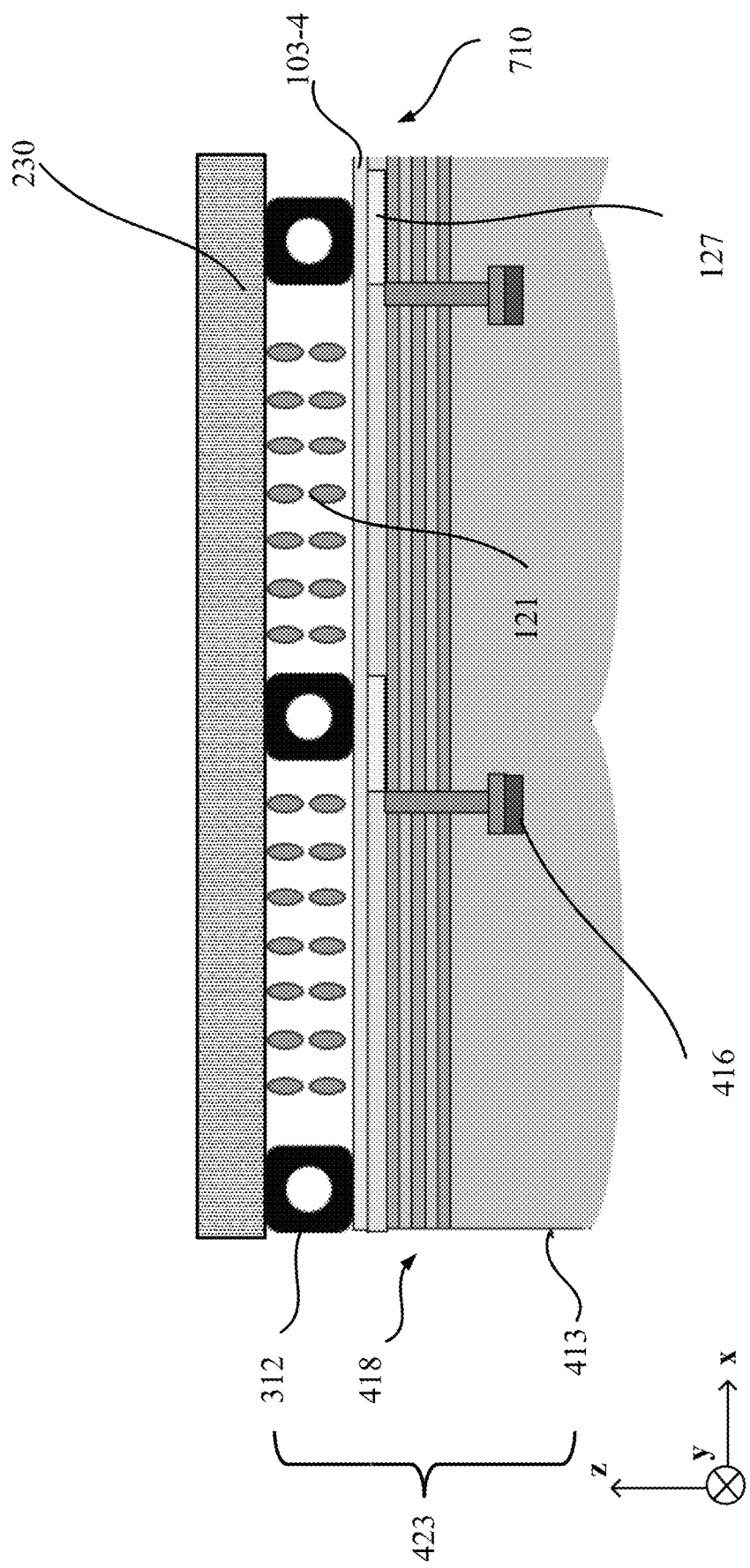

As shown in FIG. 7A, the backplane 423 may be fabricated via suitable fabrication techniques, and the LCP film 230 may be fabricated via the fabrication processes shown in FIGS. 2C and 2D. As described above, the LCP film 230 may function both as a shared alignment layer and a shared common electrode layer for a first LC cell and a second LC cell to be fabricated. As shown in FIG. 7B, the LCP film 230 may be attached or bonded to the backplane 423 via a suitable method, and a space may be formed between the LCP film 230 and the backplane 423. In some embodiments, the LCP film 230 may be laminated to the backplane 423. For example, the backplane 423 may include spacers 312, and the LCP film 230 may be bonded or attached to the spacers 312. In some embodiments, after the LCP film 230 is attached or bonded to the backplane 423, the LCP film 230 and the backplane 423 may be subject to a curing process (e.g., via UV light) to enhance the linkage between the LCP film 230 and the spacers 312. As shown in FIG. 7C, an LC material may be filled into the space formed between the LCP film 230 and the backplane 423 to form the LC layer 121. Thus, an LC cell 710 configured to provide a spatially varying modulation of a first DOF of a light beam may be obtained.

In some embodiments, the LCP film 230 may be first formed in an LC cell with two opposite substates (as shown in FIGS. 2C and 2D), and then one substate may be removed from the rest of the LC cell via a suitable process (e.g., thermal releasing). The stack of the other substrate and the LCP film 230 may be disposed over the backplane 423, with the LCP film 230 facing and in contact with the backplane 423, in the process of FIG. 7A. In the process of FIG. 7C, the other substate may be removed before the process of FIG. 7D is performed.

Figure 7D:
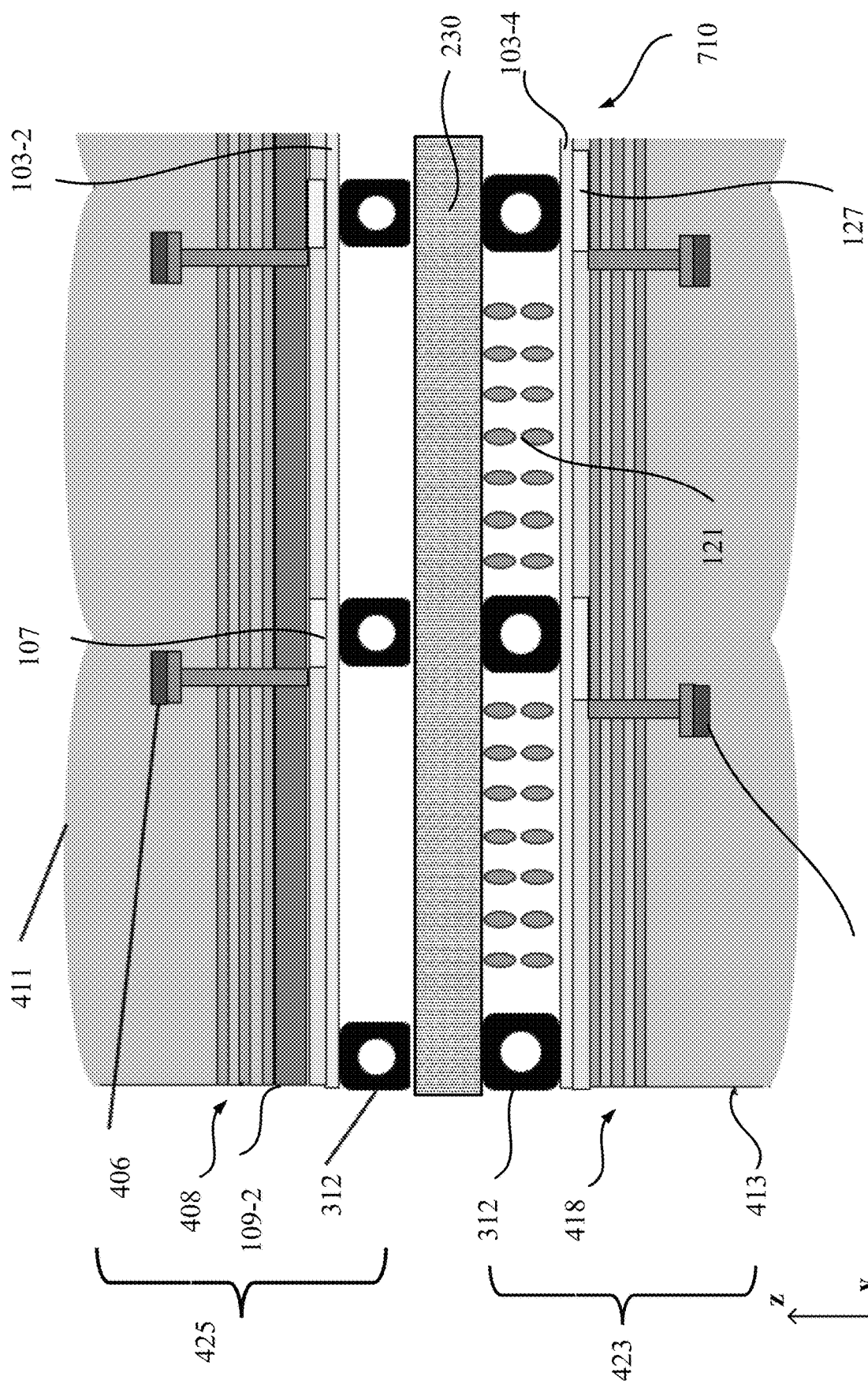
Figure 7E:
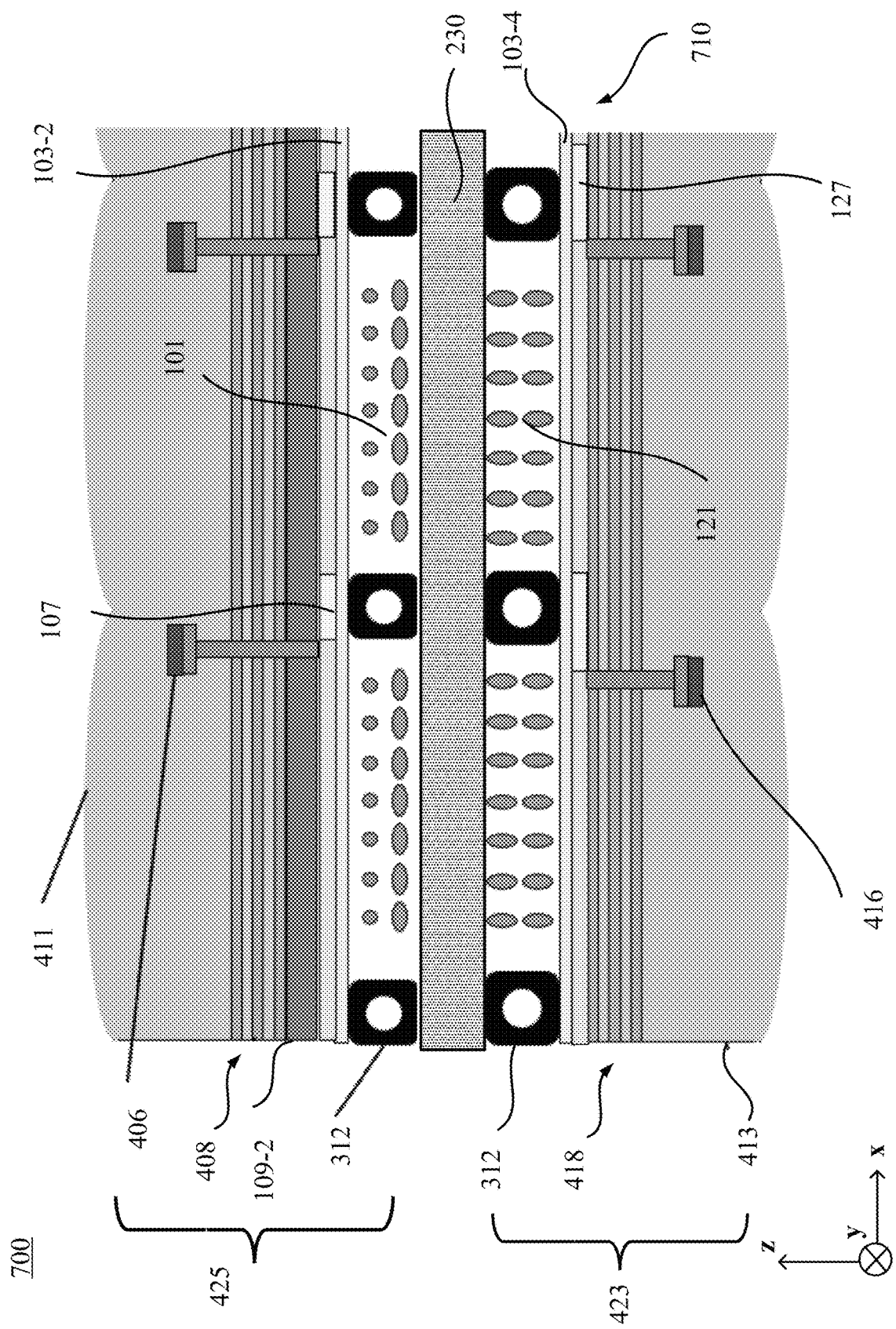

After the LC cell 710 is formed, as shown in FIG. 7D, the backplane 425 may be aligned with the LC cell 710, and bonded to the LC cell 710. A space may be formed between the LCP film 230 and the backplane 425. As shown in FIG. 7E, an LC material may be filled into the space formed between the LCP film 230 and the backplane 425 to form the LC layer 101. An LC cell 705 configured to provide a spatially varying modulation of a second DOF of a light beam may be obtained. The LC cell 705 and the LC cell 710 may be configured to provide spatially varying modulations of different DOFs of a light beam, and the complex wavefront modulator 700 may be obtained.

Figure 8A:
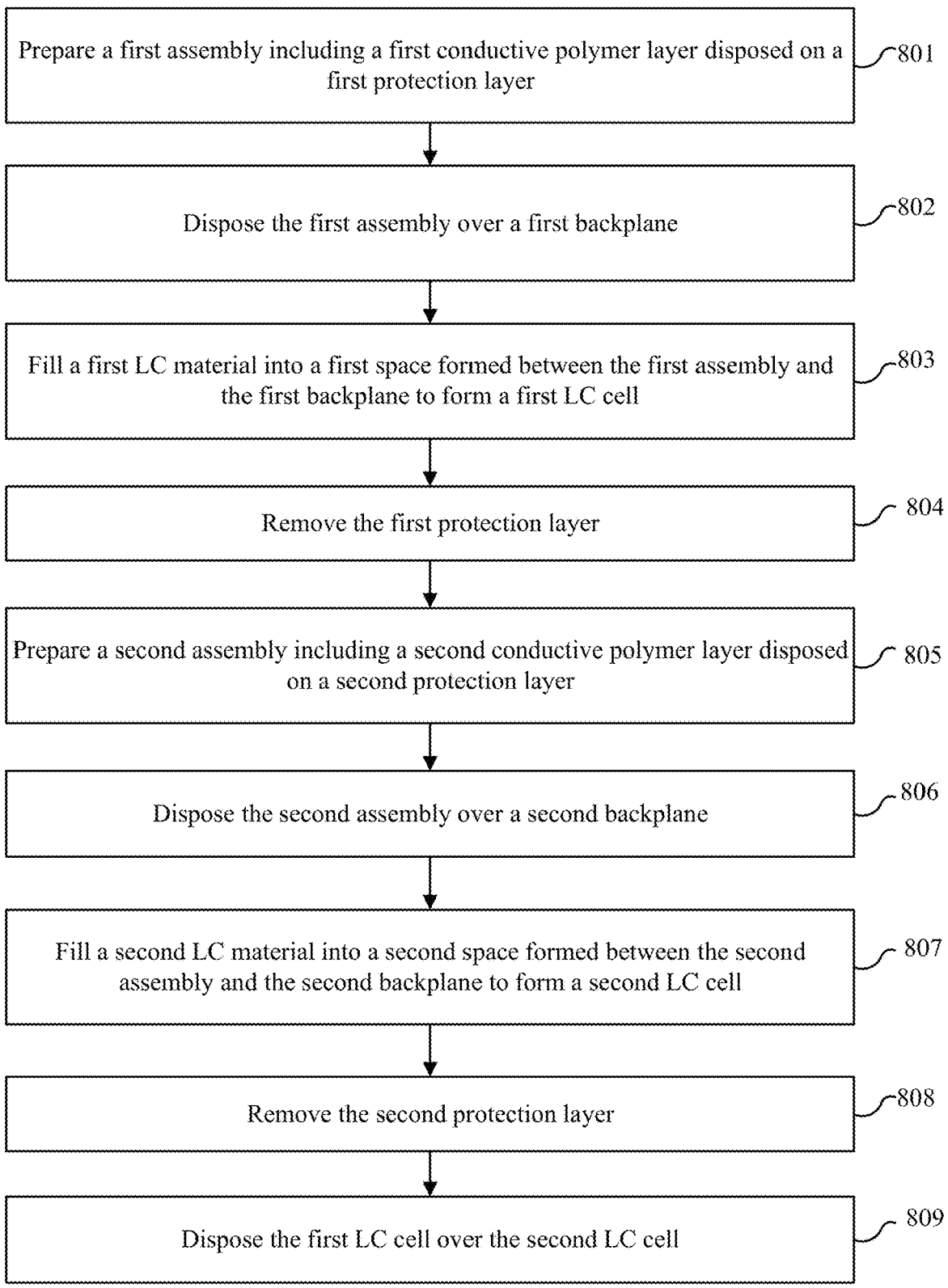
FIGS. 8A-8C are flowcharts illustrating methods for fabricating a complex wavefront modulator, according to various embodiments of the present disclosure.

FIG. 8A is a flowchart illustrating a method 800 for fabricating a complex wavefront modulator, according to an embodiment of the present disclosure. The method 800 may describe the processes shown in FIGS. 4A-4F. The method 800 may include preparing a first assembly including a first conductive polymer layer disposed on a first protection layer (step 801). In some embodiments, the first assembly may also include a first alignment layer disposed at a surface of the first conductive polymer layer, with the first conductive polymer layer disposed between the first alignment layer and the first protection layer. The method 800 may also include disposing the first assembly over a first backplane (step 802). In some embodiments, the first backplane may be a silicon backplane that includes electric circuitry for driving an LCoS. In some embodiments, the first backplane may be a TFT backplane that includes electric circuitry for driving a TFT LCD panel. The first backplane may include spacers (e.g., spacers 312) disposed on a surface of the first backplane. When the first assembly is disposed over the first backplane, the first assembly and the first backplane with the spacers may form a first space (the first space may be divided into a plurality of zones by the spacers). The method 800 may also include filling a first LC material into the first space formed between the first assembly and the first backplane to form a first LC cell or first LC panel (step 803). The method 800 may also include removing the first protection layer (step 804).

The method 800 may include preparing a second assembly including a second conductive polymer layer disposed on a second protection layer (step 805). This step may be similar to step 801. The second conductive polymer layer may be similar to the first conductive polymer layer in terms of material, structure, and functionality. In some embodiments, the second assembly may also include a second alignment layer disposed at a surface of the second conductive polymer layer, with the second conductive polymer layer disposed between the second alignment layer and the second protection layer. The method 800 may include disposing the second assembly over a second backplane (step 806). In some embodiments, the second backplane may be a silicon backplane that includes electric circuitry for driving an LCoS. In some embodiments, the second backplane may be a TFT backplane that includes electric circuitry for driving a TFT LCD panel. The method 800 may include filling a second LC material into a second space formed between the second assembly and the second backplane to form a second LC cell or second LC panel (step 807). The second backplane may include a plurality of spacers disposed at a surface of the second backplane. The method 800 may include removing the second protection layer (step 808). The method 800 may include disposing the first LC cell over the second LC cell (step 809). The first LC cell may be disposed over the second LC cell such that the first conductive polymer layer may face and contact the second conductive polymer layer. The first conductive polymer layer and the second conductive polymer layer may form a sandwiched electrode layer described above. The first LC cell and the second LC cell may be bonded and aligned together. For example, the first conductive polymer layer and the second conductive polymer layer may be bonded together.

In some embodiments, the method 800 may include additional steps not shown in FIG. 8A, but are disclosed herein in the above descriptions related to other figures. In some embodiments, certain steps may be omitted from method 800. For example, the steps 804 and 808 may be removed. That is, both of the first and second protection layers may be included in the final fabricated product, and the processes are similar to the processes shown in FIGS. 5A and 5B.

Figure 8B:
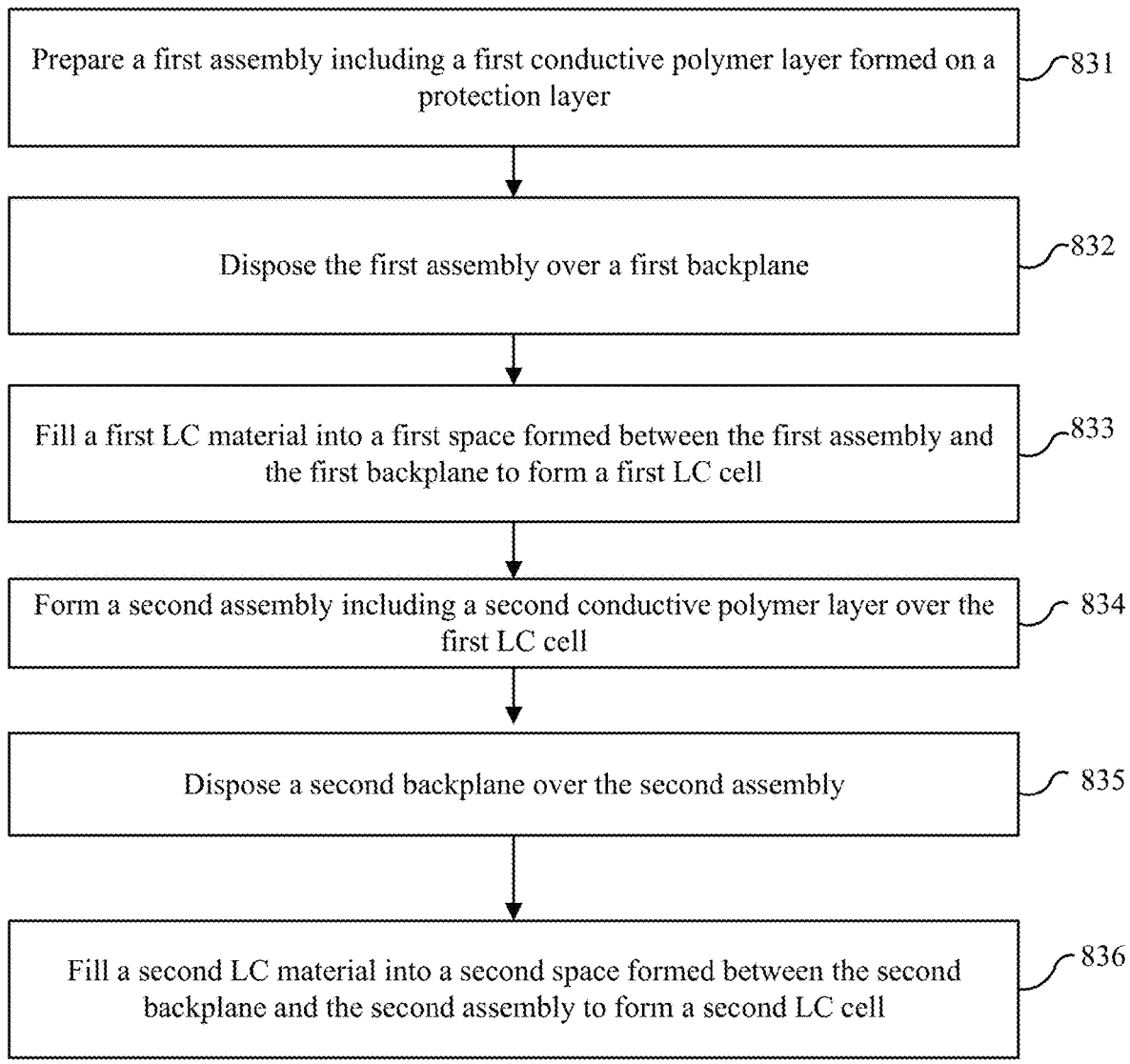

FIG. 8B is a flowchart illustrating a method 830 for fabricating a complex wavefront modulator, according to an embodiment of the present disclosure. The processes in the method 830 may be similar to those described in FIGS. 6A-6C. The method 830 may include preparing a first assembly including a first conductive polymer layer formed on a protection layer (step 831). In some embodiments, the first assembly may also include a first alignment layer disposed at a surface of the first conductive polymer layer, with the first conductive polymer layer disposed between the first alignment layer and the protection layer. The method 830 may include disposing the first assembly over a first backplane (step 832). The first backplane may be any backplane disclosed herein. In some embodiments, the first assembly may be disposed on the first backplane with the first alignment layer bonded or attached to a plurality of spacers on the first backplane. The method 830 may include filling a first LC material into a first space formed between the first assembly and the first backplane to form a first LC cell or first LC panel (step 833). The method 830 may include forming a second assembly including a second conductive polymer layer over the first LC cell (step 834).

In some embodiments, when the protection layer is kept, the second conductive polymer layer may be deposited directly over the protection layer. In some embodiments, the protection layer may be removed after the first LC cell is formed, and the step 834 may include forming (e.g., depositing, or coating, etc.) the second conductive polymer layer directly over the first conductive polymer layer.

In some embodiments, the second assembly may also include a second alignment layer, and the step 834 may further include forming (e.g., depositing, or coating, etc.) the second alignment layer on the second conductive polymer layer. The method 830 may include disposing a second backplane over the second assembly (step 835). The method 830 may include filling a second LC material into a second space formed between the second backplane and the second assembly to form a second LC cell or second LC panel (step 836). The method 830 may include other steps or processes described above in connection with FIGS. 6A-6C, and not shown in FIG. 8B. In some embodiments, one or more steps may be omitted from the method 830.

Figure 8C:
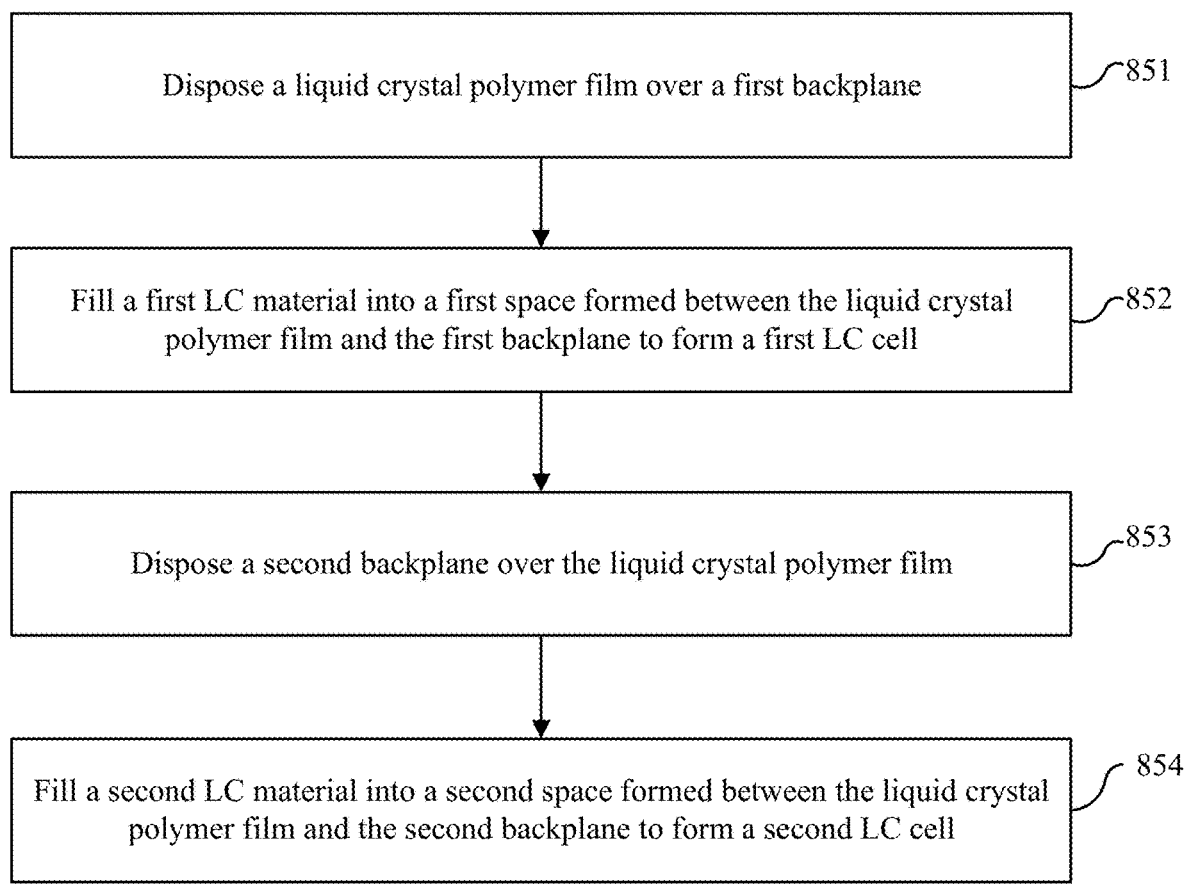

FIG. 8C is a flowchart illustrating a method 850 for fabricating a complex wavefront modulator, according to an embodiment of the present disclosure. The processes in the method 850 may be similar to those described in FIGS. 7A-7E. The method 850 may include disposing an LCP film (e.g., 230) over a first backplane (step 851). In some embodiments, the LCP film may be disposed over spacers included in the first backplane. The conductive polymer layer may be bonded or attached to the spacers, such that the LCP film is laminated over the first backplane. In some embodiments, the LCP film may be first formed in an LC cell with two opposite substates (as shown in FIGS. 2C and 2D), and then one substate may be removed from the rest of the LC cell via a suitable process (e.g., thermal releasing). The stack of the other substrate (referred to as a protection layer) and the LCP film may be disposed over the first backplane.

In some embodiments, after the LCP film is disposed over the first backplane, a curing process may be performed to provide a strong link or bond between the LCP film and the spacers. The method 850 may include filling a first LC material into a first space formed between the LCP film and the first backplane to form a first LC cell or first LC panel (step 852).

In some embodiments, when the protection layer is used in step 851 for forming the LCP film, the protection layer may be removed, and the method 850 may include a step of removing the protection layer after step 852. In some embodiments, when the protection layer is used in step 851, the protection layer may be kept, and no additional step of removing the protection layer is performed. The method 850 may include disposing a second backplane over the first LC cell (step 853). In some embodiments, the second backplane may be aligned and bonded to the LCP film or the protection layer (if included in the first LC cell). For example, spacers included in the second backplane may be bonded or attached to the LCP film or the protection layer (if included in the first LC cell). The method 850 may include filling a second LC material into a second space formed between the LCP film and the second backplane to form a second LC cell or second LC panel (step 854). The LCP film may be a conductive polymer layer with an alignment function. The LCP film may function as alignment layers of the first LC cell and the second LC cell. The LCP film may also function as a sandwiched electrode layer for the first LC cell and the second LC cell. In some embodiments, the first LC material may be the same as or similar to the second LC material. In some embodiments, the first LC material may be different from the second LC material. When the protection layer is included, the protection layer may also be treated as a part of the sandwiched electrode layer.

Figure 9:
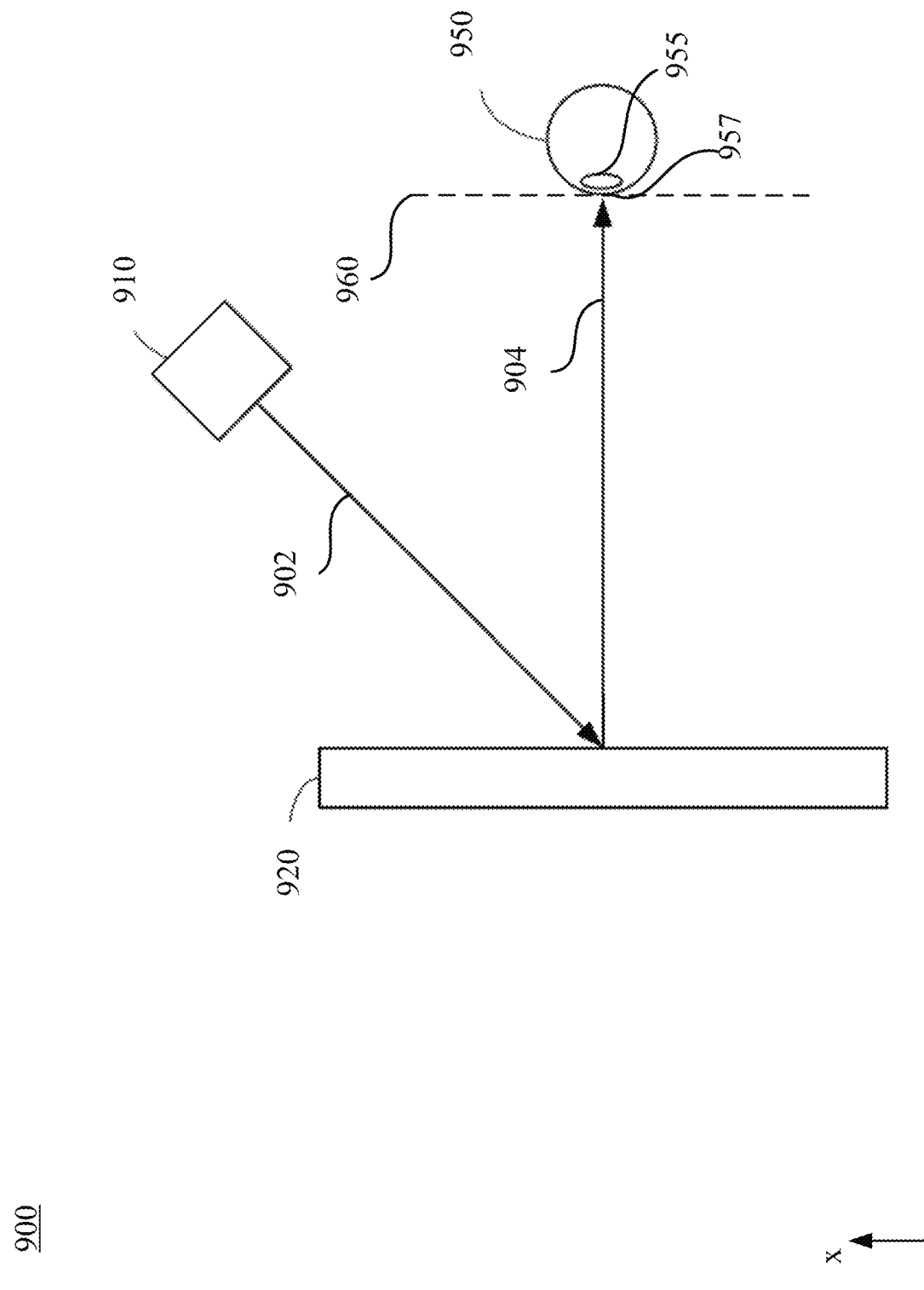
FIG. 9 illustrates a schematic diagram of an optical system including a complex wavefront modulator, according to an embodiment of the present disclosure.
Figure 10:
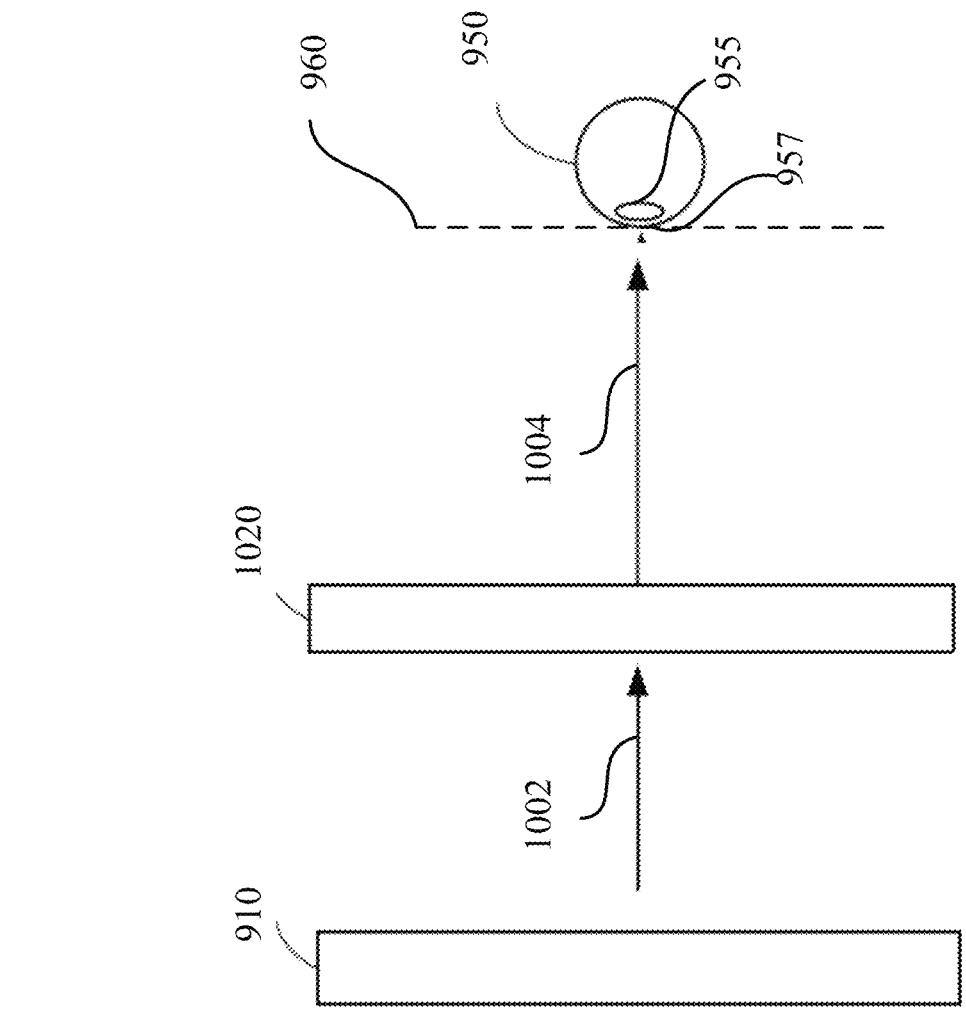
FIG. 10 illustrates a schematic diagram of an optical system including a complex wavefront modulator, according to an embodiment of the present disclosure.
Figure 11:
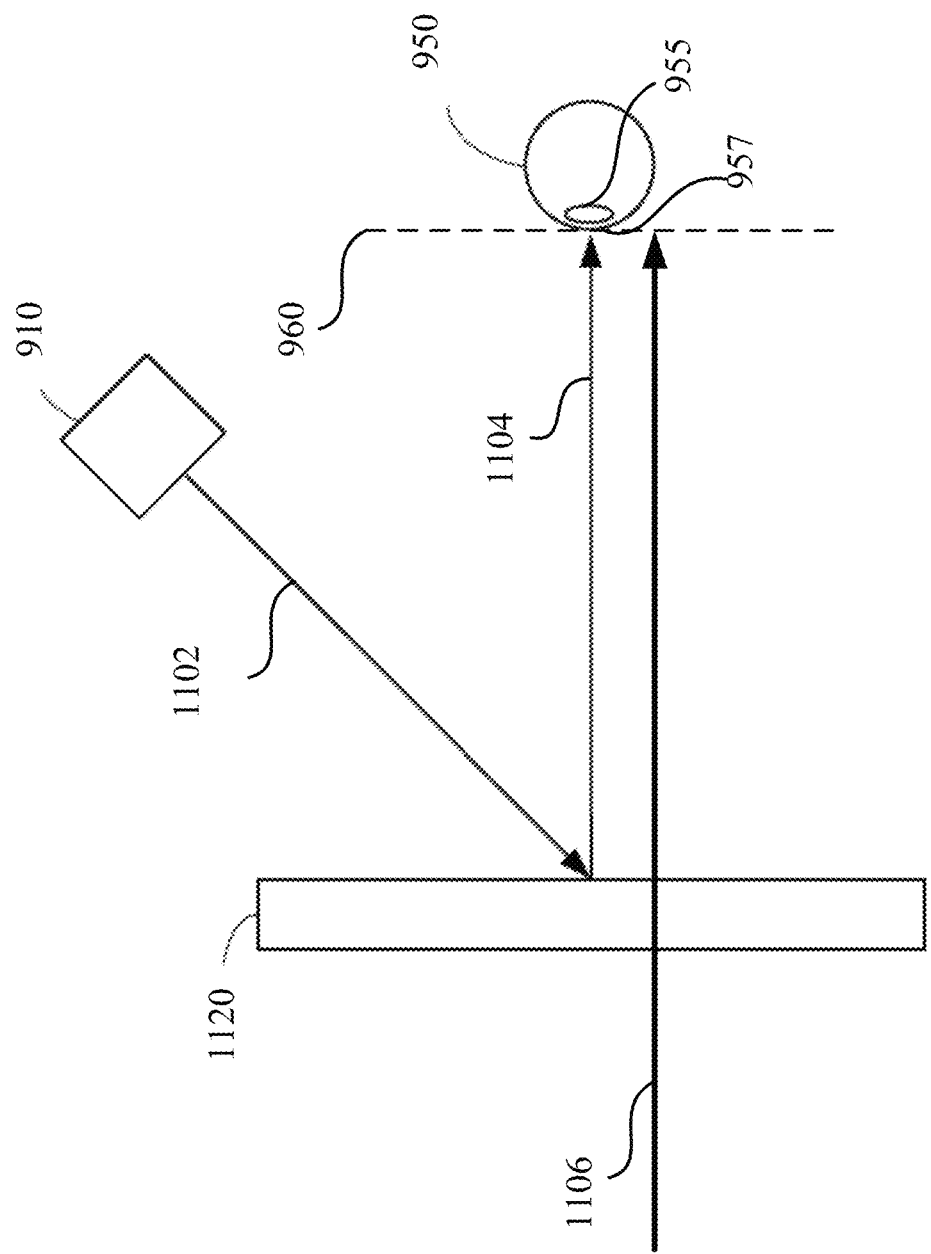
FIG. 11 illustrates a schematic diagram of an optical system including a complex wavefront modulator, according to an embodiment of the present disclosure.

FIG. 9 to FIG. 11 illustrate various optical system configurations that include one or more complex wavefront modulators disclosed herein, according to various embodiments of the present disclosure. Such optical systems may be implemented in various devices or systems, e.g., head-up displays ("HUDs"), head-mounted displays ("HMDs"), near-eye displays ("NEDs"), smart phones, laptops, televisions, vehicles, etc., for virtual reality ("VR"), augmented reality ("AR"), and/or mixed reality ("MR") applications. The optical systems shown in FIG. 9 to FIG. 11 are for illustrative purposes, the complex wavefront modulators disclosed herein may generally be included in any suitable optical systems.

FIG. 9 illustrates a schematic diagram of an optical system 900 including a complex wavefront modulator, according to an embodiment of the present disclosure. For example, the optical system 900 may be included in a virtual reality NED. As shown in FIG. 9, the optical system 900 may include a light source 910 and a complex wavefront modulator 920. The complex wavefront modulator 920 may be an embodiment of the complex wavefront modulator disclosed herein, such as such as the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, the complex wavefront modulator 400 shown in FIG. 4F, the complex wavefront modulator 500 shown in FIG. 5B, the complex wavefront modulator 600 shown in FIG. 6C, or the complex wavefront modulator 700 shown in FIG. 7E.

The light source 910 may be configured to project a light beam 902 onto the complex wavefront modulator 920. In some embodiments, the light source 910 may include a coherent light source, such as a light-emitting diode ("LED"), a micro light-emitting diode ("micro-LED"), a superluminescent LED, or a combination thereof, etc. In some embodiments, the complex wavefront modulator 920 may be a reflective complex wavefront modulator. The complex wavefront modulator 920 may be configured to modulate the light beam 902 emitted by the light source 910 into a light beam 904. In some embodiments, the light beam 904 may represent a virtual image, e.g., a hologram. In other embodiments, the complex wavefront modulator 920 may be used in other suitable applications, such as video or image projection.

In some embodiments, the optical system 900 may also include additional components that are not shown in FIG. 9. For example, the optical system 900 may include a lens assembly configured to focus the light beam 904 modulated by the complex wavefront modulator 920 to one or more exit pupils 957 in an eye-box region 960. The exit pupil 957 may be a location where an eye pupil 955 of the eye 950 may be positioned in the eye-box region 960 of the system 900. Thus, the eye 950 located at the exit pupil 957 may perceive the hologram generated by the complex wavefront modulator 920. In some embodiments, the optical system 900 may also include an eye tracking module configured to provide eye position information to a controller, and a pupil-steering assembly configured to steer the exit pupil 930 to different locations according to an eye gaze angle, etc.

FIG. 10 illustrates a schematic diagram of an optical system 1000 including a complex wavefront modulator, according to an embodiment of the present disclosure. For example, the optical system 1000 may be included in a virtual reality NED. As shown in FIG. 10, the optical system 1000 may include the light source 910 and a complex wavefront modulator 1020. The complex wavefront modulator 1020 may be an embodiment of the complex wavefront modulator disclosed herein, such as such as the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, the complex wavefront modulator 400 shown in FIG. 4F, the complex wavefront modulator 500 shown in FIG. 5B, the complex wavefront modulator 600 shown in FIG. 6C, or the complex wavefront modulator 700 shown in FIG. 7E.

As shown in FIG. 10, the light source 910 may be configured to project a light beam 1002 onto the complex wavefront modulator 1020. In the embodiment shown in FIG. 10, the complex wavefront modulator 1020 may be a transmissive complex wavefront modulator. The complex wavefront modulator 920 may be configured to modulate the light beam 902 emitted by the light source 910 into a light beam 1004. In some embodiments, the light beam 1004 may represent a virtual image, e.g., a hologram. In other embodiments, the complex wavefront modulator 920 may be used in other suitable applications, such as video or image projection.

In some embodiments, the optical system 1000 may also include additional components that are not shown in FIG. 10. For example, the optical system 1000 may include a lens assembly configured to focus the light beam 1004 modulated by the complex wavefront modulator 1020 to one or more exit pupils 957 in an eye-box region 960. Thus, the eye 950 located at the exit pupil 957 may perceive the hologram generated by the complex wavefront modulator 1020. In some embodiments, the optical system 900 may also include an eye tracking device configured to provide eye position information to a controller, and a pupil-steering assembly configured to steer the exit pupil 930 to different locations according to an eye gaze angle, etc.

FIG. 11 illustrates a schematic diagram of an optical system 1100 including a complex wavefront modulator, according to an embodiment of the present disclosure. For example, the optical system 1100 may be included in an augmented reality NED or a mixed reality NED. As shown in FIG. 11, the optical system 1100 may include the light source 910 and a complex wavefront modulator 1120. The complex wavefront modulator 1120 may be an embodiment of the complex wavefront modulator disclosed herein, such as such as the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, the complex wavefront modulator 400 shown in FIG. 4F, the complex wavefront modulator 500 shown in FIG. 5B, the complex wavefront modulator 600 shown in FIG. 6C, or the complex wavefront modulator 700 shown in FIG. 7E.

As shown in FIG. 11, the light source 910 may be configured to project a light beam 1102 onto the complex wavefront modulator 1120. In the embodiment shown in FIG. 11, the complex wavefront modulator 1120 may be a transflective complex wavefront modulator. For example, the complex wavefront modulator 1120 may modulate the light beam 1102, partially reflect the light beam 1102 into a light beam 1104 propagating toward the eye-box region 960. In some embodiments, the light beam 1104 may represent a virtual image, e.g., a hologram. In addition, the complex wavefront modulator 1120 may transmit a light 1106 from a real world environment (referred to as a real world light 1106) toward the eye-box region 960. The complex wavefront modulator 1120 may not modulate the real world light 1106. Thus, the eye 950 may perceive optically combined virtual scene and real world scene.

Figure 12A:
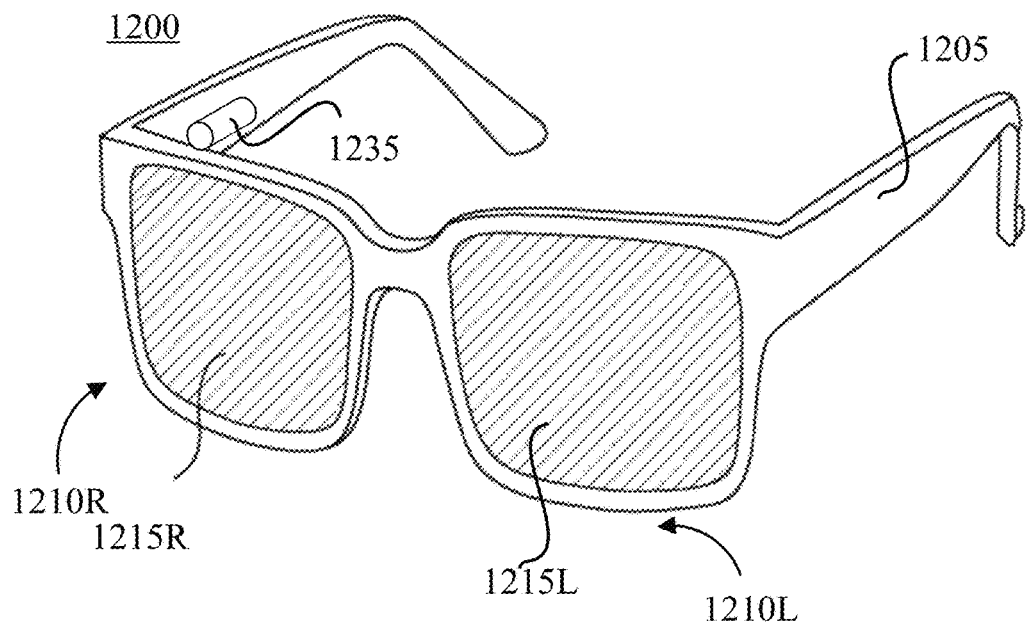
FIG. 12A schematically illustrates a diagram of a near-eye display ("NED"), according to an embodiment of the present disclosure.
Figure 12B:
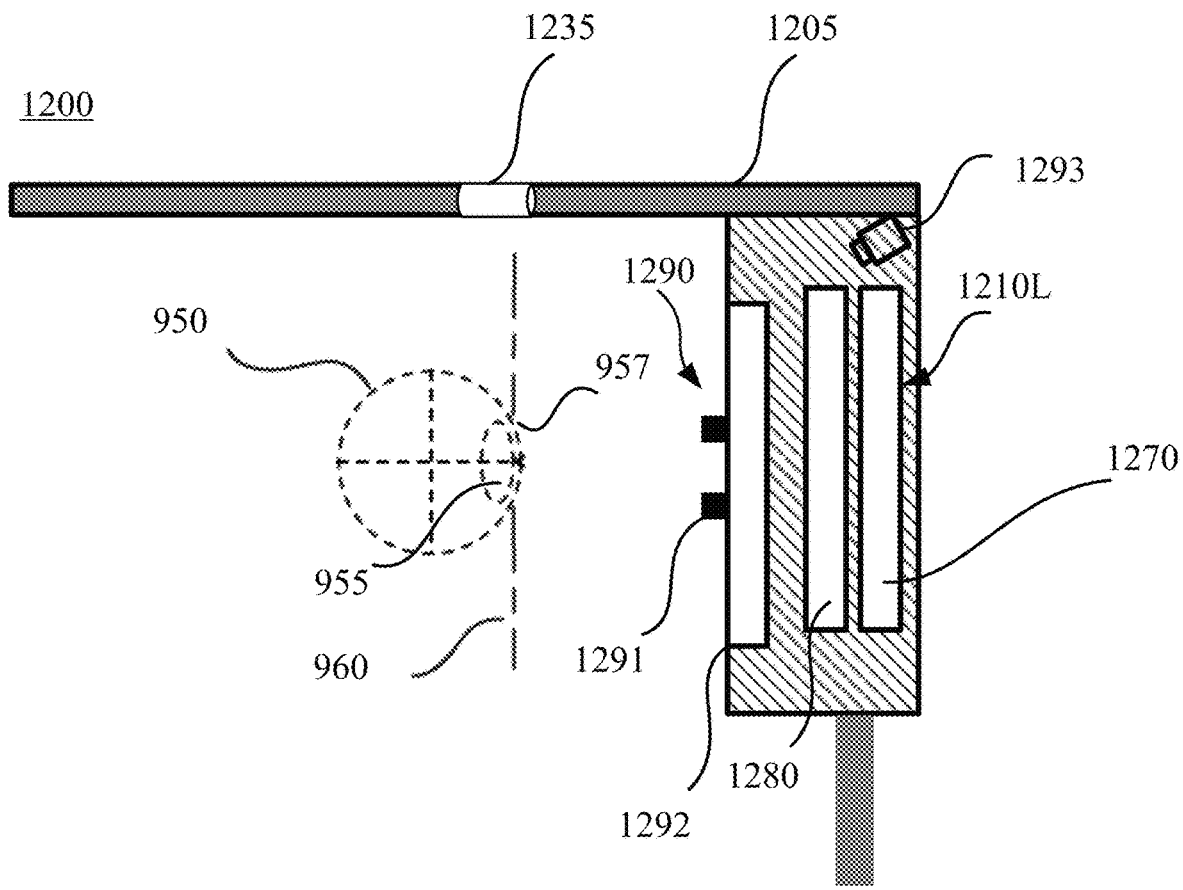
FIG. 12B schematically illustrates a cross-sectional view of half of the NED shown in FIG. 12A, according to an embodiment of the present disclosure.

FIG. 12A illustrates a schematic diagram of a near-eye display ("NED") 1200 according to an embodiment of the present disclosure. FIG. 12B is a cross-sectional view of half of the NED 1200 shown in FIG. 12A according to an embodiment of the present disclosure. For purposes of illustration, FIG. 12B shows the cross-sectional view associated with a left-eye display system 1210L. The NED 1200 may include a controller (not shown). The NED 1200 may include a frame 1205 configured to mount to a user's head. The frame 1205 is merely an example structure to which various components of the NED 1200 may be mounted. Other suitable type of fixtures may be used in place of or in combination with the frame 1205. The NED 1200 may include right-eye and left-eye display systems 1210R and 1210L mounted to the frame 1205. The NED 1200 may function as a VR device, an AR device, an MR device, or any combination thereof. In some embodiments, when the NED 1200 functions as an AR or an MR device, the right-eye and left-eye display systems 1210R and 1210L may be fully or partially transparent from the perspective of the user, which may provide the user with a view of a surrounding real-world environment. In some embodiments, when the NED 1200 functions as a VR device, the right-eye and left-eye display systems 1210R and 1210L may be opaque to block the light from the real-world environment, such that the user may be immersed in the VR imagery based on computer-generated images.

The left-eye and right-eye display systems 1210L and 1210R may include image display components configured to project computer-generated virtual images into left and right display windows 1215L and 1215R in a field of view ("FOV"). The left-eye and right-eye display systems 1210L and 1210R may be any suitable display systems. In some embodiments, the left-eye and right-eye display systems 1210L and 1210R may include one or more light sources 1235 and one or more complex wavefront modulators 1270. The complex wavefront modulator 1270 may be any complex wavefront modulator disclosed herein, such as the complex wavefront modulator 100 shown in FIG. 1A, the complex wavefront modulator 150 shown in FIG. 1B, the complex wavefront modulator 170 shown in FIG. 1C, the complex wavefront modulator 190 shown in FIG. 1D, the complex wavefront modulator 200 shown in FIG. 2A, the complex wavefront modulator 250 shown in FIG. 2B, the complex wavefront modulator 300 shown in FIG. 3A, the complex wavefront modulator 350 shown in FIG. 3B, the complex wavefront modulator 400 shown in FIG. 4F, the complex wavefront modulator 500 shown in FIG. 5B, the complex wavefront modulator 600 shown in FIG. 6C, or the complex wavefront modulator 700 shown in FIG. 7E. For illustrative purposes, FIG. 12A shows that the left-eye display systems 1210L may include the light source 1235 (e.g., similar to the light source 910 shown in FIG. 9 to FIG. 11) coupled to the frame 1205. The light source 1235 may project a light beam onto the complex wavefront modulator 1270. The light source 1235 may be similar to the light source 910 shown in FIGS. 9-11. The complex wavefront modulator 1270 may modulate the light beam emitted by the light source 1235 into an image light beam representing a virtual image, e.g., a hologram.

In some embodiments, as shown in FIG. 12B, the NED 1200 may also include a viewing optical system 1280 and an object tracking system 1290 (e.g., eye tracking system and/or face tracking system). The viewing optical system 1280 may be configured to guide the image light output from the complex wavefront modulator 1270 to the exit pupil 957. The exit pupil 957 may be a location where the eye pupil 955 of the eye 950 of the user may be positioned in the eye-box region 960 of the NED 1200. In some embodiments, the eye-box region 960 may be a full eye-box region. In some embodiments, the eye-box region 960 may be an active eye-box. For example, the viewing optical system 1280 may include one or more optical elements configured to, e.g., correct aberrations in an image light output from the left-eye display system 1210L or perform another type of optical adjustment of an image light output from the left-eye display system 1210L.

The object tracking system 1290 may include an IR light source 1291 configured to illuminate the eye 950 and/or the face, a deflecting element 1292 (such as a grating), and an optical sensor 1293 (such as a camera). The deflecting element 1292 may deflect (e.g., diffract) the IR light reflected by the eye 950 toward the optical sensor 1293. The optical sensor 1293 may generate a tracking signal relating to the eye 950. The tracking signal may be an image of the eye 950. A controller (not shown), such as the controller 181, may control various optical elements, such as an active in-coupling element, an active out-coupling element, an active dimming element, etc., based on eye-tracking information obtained from analysis of the image of the eye 950.

In some embodiments, the NED 1200 may include an adaptive or active dimming device (not shown) configured to dynamically adjust the transmittance of lights reflected by real-world objects, thereby switching the NED 1200 between a VR device and an AR device or between a VR device and an MR device. In some embodiments, along with switching between the AR/MR device and the VR device, the adaptive dimming element may be used in the AR and/MR device to mitigate differences in brightness of lights reflected by real-world objects and virtual image lights.

In some embodiments, the present disclosure provides a device. The device includes a first liquid crystal ("LC") cell configured to modulate an amplitude of a light beam. The device also includes a second LC cell stacked with the first LC cell and configured to modulate a phase of the light beam. The device includes a conductive polymer layer or film disposed between the first LC cell and the second LC cell, the conductive polymer layer being configured to function as a shared common electrode layer for driving the first LC cell and the second LC cell.

In some embodiments, the present disclosure provides a device including a first liquid crystal ("LC") cell configured to modulate an amplitude of a light beam. The device also includes a second LC cell stacked with the first LC cell and configured to modulate a phase of the light beam. The device further includes a sandwiched electrode layer disposed between the first LC cell and the second LC cell. The sandwiched electrode layer includes a conductive polymer film configured to function as a common electrode layer for driving at least one of the first LC cell or the second LC cell.

In some embodiments, the conductive polymer film includes at least one of a poly(3,4-ethylenedioxythiophene) polystyrene sulfonate (PEDOT:PSS) film, a graphene film, or a graphene composite film. In some embodiments, the conductive polymer film includes poly(3,4-ethylenedioxythiophene) polystyrene sulfonate (PEDOT:PSS), graphene, a graphene composite, or a mixture thereof. In some embodiments, the device further includes a polarizer disposed between the sandwiched electrode layer and the first LC cell.

In some embodiments, the conductive polymer film is a first conductive polymer film configured to function as a first common electrode layer for driving the first LC cell. The sandwiched electrode layer further includes a second conductive polymer film configured to function as a second common electrode layer for driving the second LC cell, and a protection layer disposed between the first conductive polymer film and the second conductive polymer film. In some embodiments, the device further includes a polarizer disposed between the first conductive polymer film and the second conductive polymer film. In some embodiments, the polarizer is a wire grid polarizer. The protection layer is electrically conductive or electrically insulated.

In some embodiments, each of the first LC cell and the second LC cell includes a substate including a driving circuitry, a first alignment layer disposed on the substate, a pixel electrode layer disposed between the substrate and the first alignment layer, a second alignment layer, and an LC layer disposed between the first alignment layer and the second alignment layer. In some embodiments, the second alignment layer is disposed between the LC layer and the sandwiched electrode layer.

In some embodiments, the conductive polymer film includes a liquid crystal polymer ("LCP") film configured to function as a shared common electrode layer of the first LC cell and the second LC cell. In some embodiments, each of the first LC cell and the second LC cell includes a substate including a driving circuitry, a first alignment layer disposed on the substate, a pixel electrode layer disposed between the substate and the first alignment layer, and an LC layer disposed between the first alignment layer and the LCP film. In some embodiments, the LCP film is configured to provide anti-parallel alignments, orthogonal alignments, vertical alignments, or hybrid alignments to the respective LC layers of the first LC cell and the second LC cell. In some embodiments, the LCP film includes a conductive material. In some embodiments, the LCP film includes carbon nanotubes or silver nanowires.

In some embodiments, the present disclosure provides a device. The device includes a first LC cell, a second LC cell stacked with the first LC cell, and a shared common electrode layer disposed between the first LC cell and the second LC cell for driving the first LC cell and the second LC cell. The first LC cell and the second LC cell are configured to modulate different degrees of freedom of a light beam. The shared common electrode layer includes at least one conductive polymer layer. In some embodiments, the at least one conductive polymer layer includes a poly(3,4-ethylenedioxythiophene) polystyrene sulfonate (PEDOT:PSS) film. In some embodiments, the at least one conductive polymer layer includes a graphene film or a graphene composite film. In some embodiments, the at least one conductive polymer layer includes an LCP film. In some embodiments, the at least one conductive polymer layer includes carbon nanotubes or silver nanowires. In some embodiments, the shared common electrode layer also includes two alignment layers disposed at opposite sides of the at least one conductive polymer layer. In some embodiments, the shared common electrode layer also includes a polarizer disposed between the at least one conductive polymer layer and the first LC cell.

In some embodiments, the at least one conductive polymer layer includes a first conductive polymer layer and a second conductive polymer layer. In some embodiments, the shared common electrode layer also includes a protection layer disposed between the first conductive polymer layer and the second conductive polymer layer. In some embodiments, the shared common electrode layer also includes a polarizer disposed between the first conductive polymer layer and the second conductive polymer layer. In some embodiments, the shared common electrode layer also includes two alignment layers disposed at opposite sides of the first conductive polymer layer and the second conductive polymer layer.

In some embodiments, the present disclosure provides a method. The method includes disposing a first assembly over a first backplane, the first assembly including a first conductive polymer layer disposed on a first protection layer. The method also includes filling a first LC material into a first space formed between the first assembly and the first backplane to form a first LC cell. The method also includes disposing a second assembly over a second backplane, the second assembly including a second conductive polymer layer disposed on a second protection layer. The method also includes filling a second LC material into a second space formed between the second assembly and the second backplane to form a second LC cell. The method also includes disposing the first assembly of the first LC cell over the second assembly of the second LC cell.

In some embodiments, the method also includes at least one of removing the first protection layer after forming the first LC cell, or removing the second protection layer after forming the second LC cell and before disposing the first assembly of the first LC cell over the second assembly of the second LC cell. In some embodiments, the method also includes preparing the first assembly including the first conductive polymer layer disposed on the first protection layer. In some embodiments, preparing the first assembly includes forming the first conductive polymer layer on the first protection layer; and forming a first alignment layer on the first conductive polymer layer. In some embodiments, the method also includes preparing the second assembly including the second conductive polymer layer disposed on the second protection layer. In some embodiments, preparing the second assembly includes forming the second conductive polymer layer on the second protection layer; and forming a second alignment layer on the second conductive polymer layer. In some embodiments, at least one of the first conductive polymer or the second conductive polymer includes a poly(3,4-ethylenedioxythiophene) polystyrene sulfonate (PEDOT:PSS) film, a graphene film, or a graphene composite film.

In some embodiments, the present disclosure provides a method. The method includes disposing a first assembly over a first backplane, the first assembly including a first conductive polymer layer disposed on a protection layer. The method also includes filling a first LC material into a first space formed between the first assembly and the first backplane to form a first LC cell. The method also includes forming a second assembly including a second conductive polymer layer over the first assembly of the first LC cell. The method also includes disposing a second backplane over the second assembly. The method also includes filling a second LC material into a second space formed between the second backplane and the second assembly to form a second LC cell.

In some embodiments, forming the second assembly including the second conductive polymer layer over the first assembly of the first LC cell includes forming the second conductive polymer layer on the protection layer; and forming an alignment layer on the second conductive polymer layer. In some embodiments, the method also includes comprising preparing the first assembly including the first conductive polymer layer disposed on the first protection layer. In some embodiments, preparing the first assembly includes forming the first conductive polymer layer on the protection layer; and forming an alignment layer on the first conductive polymer layer. In some embodiments, the method also includes removing the protection layer after the first LC cell is formed and before disposing the second backplane over the second assembly. In some embodiments, forming the second assembly over the first assembly of the first LC cell includes forming the second conductive polymer layer over the first conductive polymer layer.

In some embodiments, the present disclosure provides a method. The method includes disposing a liquid crystal polymer film over a first backplane, the liquid crystal polymer film and the first backplane forming a first space therebetween. The method also includes filling a first a liquid crystal ("LC") material into the first space to form a first LC cell. The method also includes disposing a second backplane over the liquid crystal polymer film, the liquid crystal polymer film and the second backplane forming a second space therebetween. The method also includes filling a second LC material into the second space to form a second LC cell. The liquid crystal polymer film functions as a shared common electrode layer and a shared alignment layer of the first LC cell and the second LC cell.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a first liquid crystal ("LC") cell configured to modulate an amplitude of a light beam;
a second LC cell stacked with the first LC cell and configured to modulate a phase of the light beam; and
a sandwiched electrode layer disposed between the first LC cell and the second LC cell,
wherein the sandwiched electrode layer includes a conductive polymer film configured to function as a common electrode layer for driving at least one of the first LC cell or the second LC cell.

2. The device of claim 1, wherein the conductive polymer film includes at least one of a poly(3,4-ethylenedioxythiophene) polystyrene sulfonate (PEDOT:PSS) film, a graphene film, or a graphene composite film.

3. The device of claim 1, further comprising a polarizer disposed between the sandwiched electrode layer and the first LC cell.

4. The device of claim 1, wherein
the conductive polymer film is a first conductive polymer film configured to function as a first common electrode layer for driving the first LC cell, and
the sandwiched electrode layer further includes a second conductive polymer film configured to function as a second common electrode layer for driving the second LC cell, and a protection layer disposed between the first conductive polymer film and the second conductive polymer film.

5. The device of claim 4, wherein the sandwiched electrode layer further includes a polarizer disposed between the first conductive polymer film and the second conductive polymer film.

6. The device of claim 5, wherein the polarizer is a wire grid polarizer.

7. The device of claim 4, wherein the protection layer is electrically conductive or electrically insulated.

8. The device of claim 1, wherein
each of the first LC cell and the second LC cell includes a substate including a driving circuitry, a first alignment layer disposed on the substate, a pixel electrode layer disposed between the substate and the first alignment layer, a second alignment layer, and an LC layer disposed between the first alignment layer and the second alignment layer, and
the second alignment layer is disposed between the LC layer and the sandwiched electrode layer.

9. The device of claim 1, wherein the conductive polymer film includes a liquid crystal polymer ("LCP") film configured to function as a shared common electrode layer of the first LC cell and the second LC cell.

10. The device of claim 9, wherein
each of the first LC cell and the second LC cell includes a substate including a driving circuitry, a first alignment layer disposed on the substate, a pixel electrode layer disposed between the substate and the first alignment layer, and an LC layer disposed between the first alignment layer and the LCP film, and
the LCP film is configured to provide anti-parallel alignments, orthogonal alignments, vertical alignments, or hybrid alignments to the respective LC layers of the first LC cell and the second LC cell.

11. The device of claim 9, wherein the LCP film includes a conductive material.

12. The device of claim 9, wherein the LCP film includes carbon nanotubes or silver nanowires.

\* \* \* \* \*